US008589808B1

(12) United States Patent
Alfaro et al.

(10) Patent No.: US 8,589,808 B1
(45) Date of Patent: Nov. 19, 2013

(54) SUGGESTIONS IN A SOCIAL NETWORK

(75) Inventors: Anthony Alfaro, Garden Grove, CA (US); Austen Boyd, New York, NY (US); Robert Palmer, Gateshead (GB)

(73) Assignee: Ribbon Labs, Inc., New York, NY (US)

( * ) Notice: Subject to any disclaimer, the term of this patent is extended or adjusted under 35 U.S.C. 154(b) by 0 days.

(21) Appl. No.: 13/572,934

(22) Filed: Aug. 13, 2012

(51) Int. Cl.
*G06F 3/00* (2006.01)

(52) U.S. Cl.
USPC ........... 715/753; 715/751; 715/752; 715/863; 715/864; 709/204

(58) Field of Classification Search
USPC .................................. 715/751–753, 863, 864
See application file for complete search history.

(56) References Cited

U.S. PATENT DOCUMENTS

| | | | |
|---|---|---|---|
| 5,706,448 | A | 1/1998 | Blades |
| 7,669,123 | B2 | 2/2010 | Zuckerberg et al. |
| 7,707,516 | B2 | 4/2010 | O'Mullan et al. |
| 7,710,394 | B2 | 5/2010 | Robbin et al. |
| 7,769,819 | B2 | 8/2010 | Lerman et al. |
| 7,840,224 | B2 | 11/2010 | Vengroff et al. |
| 7,860,536 | B2 | 12/2010 | Jobs et al. |
| 8,108,501 | B2 | 1/2012 | Birnie et al. |
| 8,150,439 | B2 | 4/2012 | Vengroff et al. |
| 8,171,128 | B2 | 5/2012 | Zuckerberg et al. |
| 2003/0126250 | A1* | 7/2003 | Jhanji ........................... 709/223 |
| 2004/0119732 | A1* | 6/2004 | Grossman et al. ............ 345/708 |
| 2007/0233736 | A1 | 10/2007 | Xiong et al. |
| 2008/0016442 | A1* | 1/2008 | Khoo ........................... 715/700 |
| 2008/0104227 | A1* | 5/2008 | Birnie et al. .................. 709/224 |
| 2008/0186808 | A1 | 8/2008 | Lee |
| 2008/0250332 | A1* | 10/2008 | Farrell et al. .................. 715/753 |
| 2009/0070684 | A1* | 3/2009 | Aldrich et al. ................ 715/743 |
| 2009/0271370 | A1* | 10/2009 | Jagadish et al. .................. 707/3 |
| 2009/0287687 | A1* | 11/2009 | Martire et al. .................... 707/5 |
| 2010/0082357 | A1* | 4/2010 | Follmann et al. ................ 705/1 |
| 2010/0180211 | A1* | 7/2010 | Boyd ............................ 715/751 |
| 2010/0228590 | A1* | 9/2010 | Muller et al. ................... 705/10 |
| 2011/0082747 | A1 | 4/2011 | Khan et al. |
| 2011/0238755 | A1* | 9/2011 | Khan et al. .................... 709/204 |
| 2011/0239158 | A1* | 9/2011 | Barraclough et al. ......... 715/808 |

(Continued)

OTHER PUBLICATIONS

Dahlquist, David, "The Hotlist brings its geo-trending service to the iPhone, Macworld," http://www.macworld.com/article/1153104/hotlist.html Published Online: Aug. 2, 2010.

(Continued)

*Primary Examiner* — Tuyetlien Tran
(74) *Attorney, Agent, or Firm* — Stratus IP Law Group, LLC

(57) ABSTRACT

Methods, systems, and apparatuses are disclosed which include gathering future location information of one or more friends of a user, receiving from a computing device, an indication of a second future date, displaying the future locations that are associated with a first future date that matches the second future date, receiving, at the computing device from the user, a selection of one of the future locations displayed, displaying one or more friends of the user associated with the selected future location, determining that a digital connection does not exist between the first friend and the second friend in a social network, providing an indication on the computing device showing that the digital connection does not exist, receiving an indication from the user to initiate contact between the first friend and the second friend, and providing a first notification to the first friend and the second friend.

18 Claims, 50 Drawing Sheets

(56) References Cited

U.S. PATENT DOCUMENTS

| | | | |
|---|---|---|---|
| 2011/0282700 A1* | 11/2011 | Cockcroft | 705/5 |
| 2011/0320495 A1 | 12/2011 | Levy-Yurista et al. | |
| 2012/0095979 A1* | 4/2012 | Aftab et al. | 707/706 |
| 2012/0130823 A1* | 5/2012 | Levin | 705/14.69 |
| 2012/0158845 A1 | 6/2012 | Baalu et al. | |
| 2012/0233557 A1* | 9/2012 | Wakhlu | 715/753 |
| 2012/0253855 A1* | 10/2012 | Chand et al. | 705/5 |
| 2012/0271883 A1 | 10/2012 | Montoya et al. | |

OTHER PUBLICATIONS

Bencic et al., An Approach to Interactive Social Network Go-Mapping, Apr. 21, 2010, IIT SRC 2010, pp. 162-169.

Alfaro et al. co-pending U.S. Appl. No. 13/572,962, filed Aug. 13, 2012 entitled "Graphical Display of Locations".

Alfaro et al. co-pending U.S. Appl. No. 13/572,903, filed Aug. 13, 2012 entitled "Future Location Feed".

Alfaro et al. co-pending U.S. Appl. No. 13/572,894, filed Aug. 13, 2012 entitled "Location and Time User Interface Dial".

Alfaro et al. Co-pending U.S. Appl. No. 13/572,875, filed Aug. 13, 2012 entitled "Communicating Future Locations in a Social Network".

Warren, Christie "Plan Your Social Calendar with the Hotlist" May 14, 2010 available at http://mashable.com/2010/05/14/the-hotlist/.

Google Earth 5 Plus the Ocean, Feb. 3, 2009 available at: http://googlesystem.blogspot.com/2009/02/google-earth-5-plus-ocean.html.

* cited by examiner

2300

```
┌─────────────────────────────────────────┐
│  Receiving a pin selection from one or  │
│      more pins associated with          │
│   geographical locations, the pin       │
│  associated with a specific geographic  │
│              location                   │
│                                    2310 │
└─────────────────────────────────────────┘
                    ↓
┌─────────────────────────────────────────┐
│ Displaying two or more concentric       │
│ circles, a first concentric circle      │
│ having future location information for  │
│ friends visiting the geographical       │
│ location on the                         │
│                                    2320 │
└─────────────────────────────────────────┘
                    ↓
┌─────────────────────────────────────────┐
│ Receiving a second slide position on a  │
│ timeline circle reflecting a second     │
│ date, wherein geographical location     │
│ representations are displayed with      │
│ information corresponding to each time  │
│ increment between the first date and    │
│ the second date                         │
│                                    2330 │
└─────────────────────────────────────────┘
                    ↓
┌─────────────────────────────────────────┐
│ Displaying geographical location        │
│ representations with information        │
│ corresponding to the second date upon   │
│ arriving at the second date             │
│                                    2340 │
└─────────────────────────────────────────┘
```

Receiving a friend pin selection, wherein the selected friend pin is associated with friend location information for a geographical location representation on a future date
2410

Displaying information for friends indicating a visit to the geographical location on the future date in a first concentric circle
2420

Displaying information for friends that indicated a residential presence at the geographical location on the future date in a second concentric circle
2430

```
Receiving a first message related to a trip or event
from a first friend associated with the trip or event
                                               2510
                      ↓
Receiving a second message related to a trip or event from a
second friend associated with the trip or event
                                               2520
                      ↓
Displaying the first message and the second message
together in a feed view specific to the trip or event
                                               2530
```

FIG. 25

SUGGESTIONS IN A SOCIAL NETWORK

BACKGROUND

This disclosure relates generally to geographical information systems and social and professional networking.

Some web and mobile applications provide information about a current location of a user. This allows a user to share his or her location with friends. However, a user has to ask friends where they will be in the future or ask if they are attending an event. If multiple friends are involved, it can be a hassle for each friend to respond to multiple inquiries about future travel plans. Any data about future plans are fragmented across various applications. A user can also forget what a friend has said about his or her future plans. Plans can change.

Furthermore, some "friends" may be individuals that do not share a close relationship with the user or they may be old friends or brief acquaintances. A user may be interested in meeting up with such a person that happens to be or plans to be in the same city, location, or at the same event. However, the user may be uncomfortable bothering that person with a direct query about whether they plan to be in a city on a certain future day or days.

SUMMARY

In general, one innovative aspect of the subject matter described in this specification may be embodied in methods that include the actions of gathering future location information of one or more friends of a user, the future location information including a respective first future date and a respective future location where the respective friend is going to be physically located on the respective first future date, receiving from a computing device, an indication of a second future date, displaying the future locations that are associated with a first future date that matches the second future date, on the computing device, receiving, at the computing device from the user, a selection of one of the future locations displayed, displaying one or more friends of the user associated with the selected future location; determining that a digital connection does not exist between the first friend and the second friend in a social network, providing an indication on the computing device showing that the digital connection does not exist between the first friend and the second friend in the social network, receiving an indication from the user to initiate contact between the first friend and the second friend, and providing a first notification to a computing device of the first friend and a computing device of the second friend indicating that the user has suggested that the first user and the second user meet at the selected future location.

Other embodiments of these aspects include corresponding systems, apparatus, and computer-readable medium storing software comprising instructions executable by one or more computers which cause the computers to perform the actions of the methods.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements.

FIGS. 20-21A illustrate display views of feeds related to trip or event information.

FIG. 23 illustrates a flowchart of an example process for providing a date selection control.

FIG. 24 illustrates a flowchart of an example process for providing a friendar control.

FIG. 25 illustrates a flowchart of an example process for providing a message feed.

DETAILED DESCRIPTION

Figure 1:
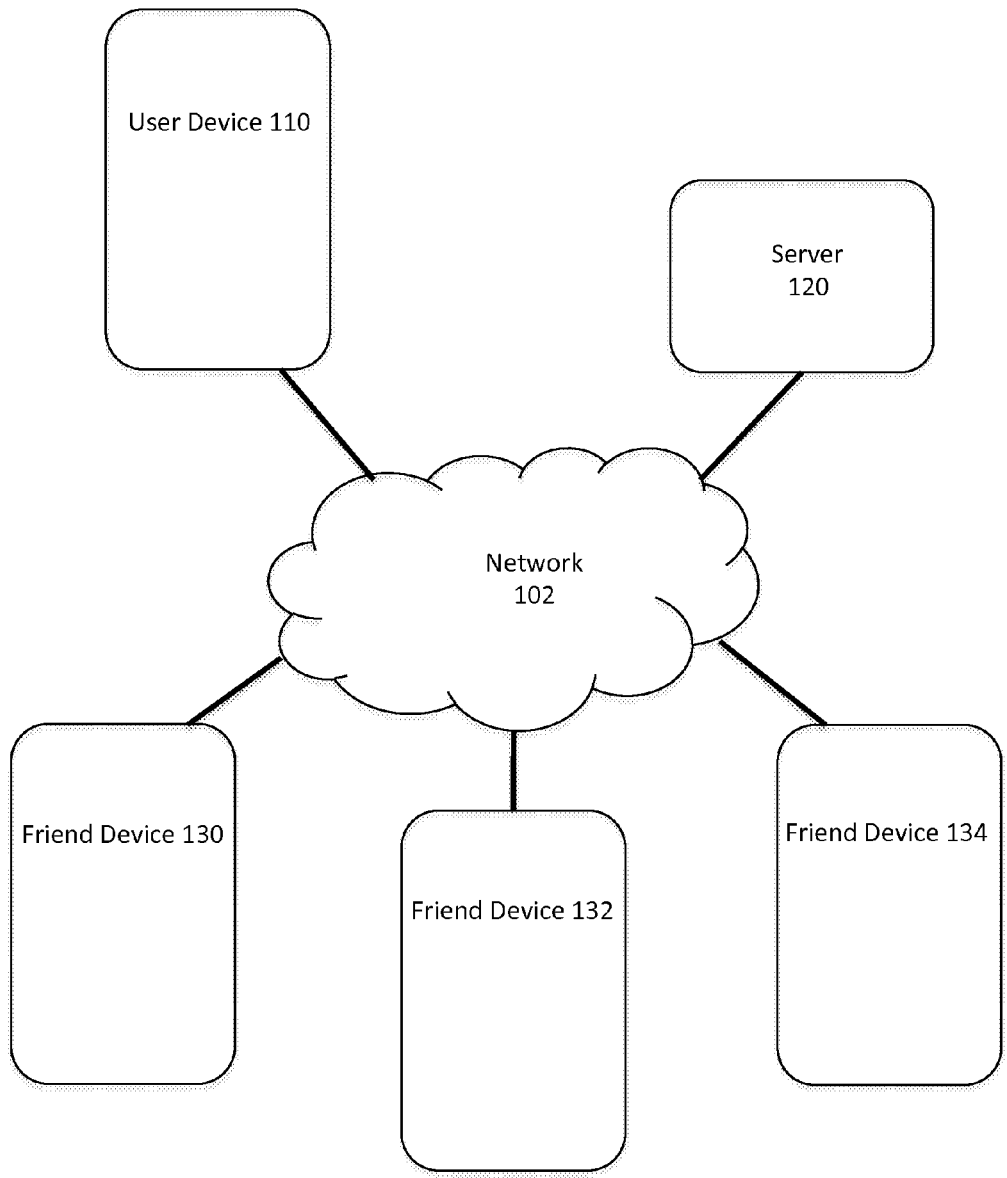
FIG. 1 illustrates a system for communicating future location information.

Current applications do not allow users to share their future locations with their entire friend and professional network all in one place. Currently, in order to know whether a users' friends are planning to be in the same location at the same time, a user must obtain that information from his or her friends by direct communication (e.g., in person, phone, email, or text), or by viewing fragmented information on various applications. A user would then often have to wait for a response, collect that information and store it in a singular place such as a calendar. Only then could the user coherently and visually see if any of his or her friends had coinciding travel plans (or event plans).

A system will be described that allows friends to share where they will be in the future so that other friends can plan to join them. A date sometime in the future may be entered or selected using graphic user interface tools of an application. Geographical locations of friends are then displayed for the chosen future date. The representations of these geographical locations may be displayed on a map, including on a geographical information system (GIS) map. A geographical location may include a city, a section of a city, a suburb of a city, a rural area, a vacation destination, a park, a place of a scheduled event or any other definable location. In some cases, city sections or nearby cities and towns can be associated with a major or larger city, area, or location. These locations may be annotated to show how many friends are either local or visiting or attending event(s) on the future date(s). A geographical location name may be altered to convey that the pin represents a broader metro area (e.g., Minneapolis-St. Paul), or a popular way of referencing the city (e.g., "SF"). Geographical locations of events, such as sports, concerts, conferences, and festivals, are also displayed on the map and associated with both the actual city an event occurs in, and the nearest major city.

A user may create a named trip for a location on a future date. Friends can learn of the trip and join it. Information about upcoming events that friends are attending may be displayed or communicated. Friends can join an event and plan to meet up at the event. Friends can also suggest that other friends join the trip or event.

The term "friend," as used herein, may include authentic friends, family members, acquaintances, social connections, professional connections, coworkers, old classmates or colleagues or anyone else that has some relationship with the user or users. A relationship may exist if there has been some type of digital invitation, connection, and/or digital acceptance.

Event and trip profiles can be created for locations on specific future dates. A trip may be a planned visit or presence at a location on a future specific date. Trip information can be shared with friends. Friends can view trip information, including locations, events, date ranges and which friends are attending. Users and friends can join trips. Users and friends can suggest other friends to join trips or suggest his or her friends become friends with each other. In one embodiment, the trip information can include a user's home location or home base. For example, a user can indicate as trip information that he is going to be in his home location on a date or date range.

FIG. 1 is a block diagram 100 of a networked system of devices, perhaps mobile devices such as mobile phones, tablets or computers. The devices may be networked over network 102. Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

A user may operate a user interface on user device 110 to determine future location information of friends. In a non-limiting embodiment, these friends may have provided such information on a limited or restricted basis through their devices 130-134. Future location information may be stored, accessed, distributed or modified using a system stored on and executed by server 120. Permissions may be configured to limit location information for safety reasons. In some aspects, location information may be provided only at the general level, such as only city information.

Figure 2:
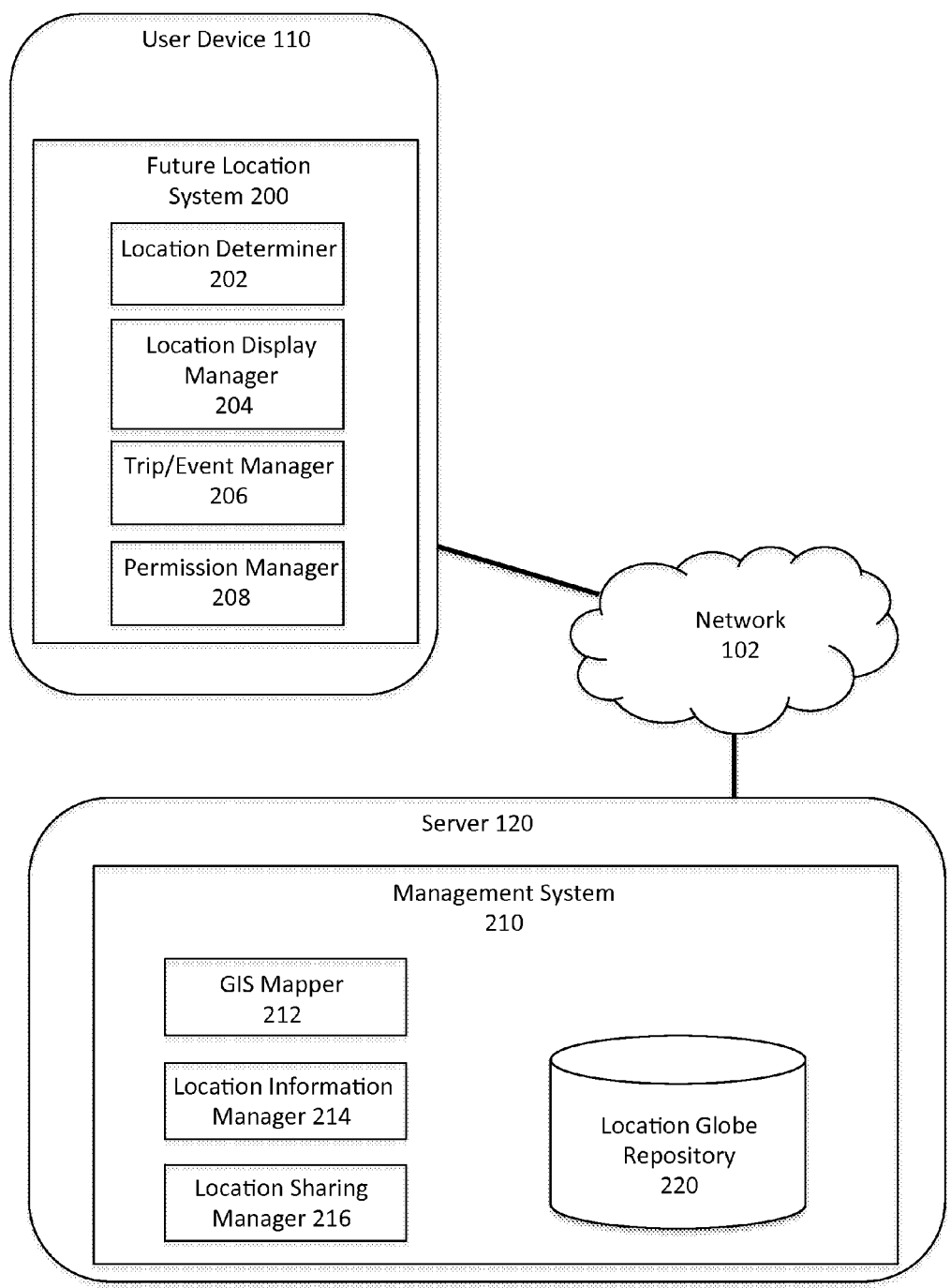
FIG. 2 illustrates a system for communicating future location information.

FIG. 2 illustrates an example system 200 for communicating future location(s). Future location system 200 includes location determiner 202, location display manager 204, trip/event manager 206 and permission manager 208. System 200 may be implemented on or implemented with one or more computing devices, such as user device 110.

Location determiner 202 is configured to identify future location information of friends. Identification may involve verifying a relationship between a user and a friend. The relationship may be an active digital acceptance or recognition as a "friend." In some cases, actual friends may be identified from a general pool of digital "friends." For example, these friends can be from other social networks. Location determiner 202 may check for a most recent status of a friend. Most recent future location information may be obtained or verified with other information about the friend. Permissions and privacy settings will determine what information is identified.

Location determiner 202 determines locations for display. This involves receiving a future date and determining geographical locations to display based on the future date and friend future location information. A future date may be a day in the future. In some cases, a future date may be considered the present date but a future time on the present date. That future time may be a few hours, a few minutes or even in certain cases, one or more seconds in the future. A future date may be specific to a day or specific to a week, month or year. Location determiner 202 determines what friends have submitted or made available information for a future date and what the locations of the friends will be on the date. A future date may also include a future date range, multiple consecutive days, or specific times.

Location display manager 204 is configured to display one or more determined geographical locations. Geographical locations may be displayed graphically on a map, grid, globe or any three dimensional or multi-dimensional representations. Geographical locations may be displayed in a geographical information system (GIS), which may include city information, roads, terrain or any other information common to GIS maps. For example, display view 300 shows geographical location New York City, N.Y. among nearby cities, roads and other geographical features on GIS map 302. Location display manager 204 can display locations selected by the user. For example, if a user selects NYC, NYC and the surrounding area is displayed.

Location display manager 204 also displays indications or representations of friends at or near a location on a particular future date. These indications may be friend representations. In one embodiment, a friend representation can be a FRIENDPIN™ friend representation. Friend representations are any annotation upon a visual map that provide friend location information specific to the pinned location. In an aspect, the friend representation can include a number of friends physically at the location on the future date. The number can include a total of the number of friends that live at the location and the number of friends visiting that location. The number of friends visiting that location can also include a number of friends attending an event at the location. In a non-limiting embodiment, a friend representation can be a number, more than one number, an image or any combination thereof. In an embodiment, when a friend representation is selected (e.g., mouse click), a list of users visiting or local and/or events can originate from the selected friend representation. Any other user profiles and information may be displayed as well. In an embodiment, if a friend representation includes a number, the number can include friends at an event as well (which are included in the visiting or local number), or it can be a total number of events and not people. These examples are purely illustrative and are not intended to limit the embodiments.

In embodiment, two numbers could be provided: friends who call the location home and friends visiting the location from another home city.

For example, in display view 300, on Feb. 26, 2012, friend representation 308 indicates there are 12 friends visiting and 15 friends that are local and present on that date. On that same date, there is an event on Long Island indicated by friend representation 310 with the star on it. There are currently 5 friends scheduled to be at the event on that day.

In one embodiment, a friend representation can include a profile image within the friend representation or a group of friend representations, each with a friend profile image within each friend representation.

In another embodiment, the friend representation 308 can include a single number. The single number can include a total of the number of friends visiting the future location and a number of friends that are local to that location. If for example, the total number was 10, it may be the case that 3 friends live at that location, and 7 are visiting the location. Any number of the 7 friends visiting the location or 3 friends that live at the location may be attending an event (or events) at the location and this number of friends is included in the 7 friends visiting and 3 friends that live at the future location. For example, if 7 are visiting and of those 7, 3 are attending an event, then the 3 is included in the 7 visiting. In another embodiment, these two numbers (number of friends attending events versus number of visiting and local friends) can be distinct so if a friend is at an event at the future location, they are excluded from the visiting list. The visiting list can be for friends visiting the city but not necessarily associated with an event at the city.

In one embodiment, the friend representation 308 can indicate a total number of events on the date or date range. For example, if the number on the friend representation 308 said 9, that would mean a total number of events are associated with that location on a date or within a date range that includes the future date selected. The number of friends at the event may be more than 9. For example, if two friends are each at each event, the total number of friends at the event would be 20, but the friend representation 308 still indicates 9, which is the total number of events, rather than the total number of people.

In one embodiment, clicking on a friend representation with a single number can expand the friend representation into the same number of friend representations as the number on the original friend representation. The new friend representations can include images of each user associated with that friend representation. For example, if a friend representation has the number 3 on it, and a user clicks or taps on the friend representation, that friendship can then be expanded to three distinct friend representations, each with an image of the friend that is associated with the located corresponding to the friend representation.

The geographical locations chosen for display may be chosen because of size, popularity, frequency of events or trips and other factors. Geographical locations and pins for geographical locations may be selected based on event information that was received. Location display manager 204 is configured to display the locations and pins. Location determiner 202 may provide information to location display manager 204.

User device 110 may be coupled to server 120 over network 102. Server 120, shown in FIG. 2, includes management system 210, which may be used to provide accurate information to user device 110 and friend devices 130-134. Management system 210 includes GIS mapper 212, location information manager 214 and location sharing manager 216. Server 120 may also include location globe repository 220 for globe view information. In a non-limiting embodiment, one or more of location determiner 202, location display manager 204, trip/event manager 206 and permission manager 208 may be included in server 120. In another non-limiting embodiment, one or more of GIS mapper 212, location information manager 214 and location sharing manager 216 may be implemented in future location system 200. In yet another non-limiting embodiment, one or more components of future location system 200 and management system 210 may be distributed across a plurality of computing devices using a cloud computing infrastructure.

In some implementations, GIS mapper 212 may develop maps for display, taking into consideration the location information. The maps may be developed from map information or geographical information system (GIS) data. The displayed maps and corresponding features may vary in detail. In some cases, nearby cities, major roads, natural landmarks, bodies of water, man-made landmarks or other features may be included for context.

Location information manager 214 collects friend future location information submitted by friends on various computing devices. These computing devices may also have an implementation of future location system 200, which works in coordination with management system 210. In some cases, future location information may be submitted or obtained through other applications, interfaces or data feeds.

In a non-limiting embodiment, location information manager 214 may poll for regular updates or request or receive information asynchronously on an as needed basis. For example, location information manager may poll location globe repository 220 or any other system or database associated with network 102. Information for all friends or for only certain groups of friends may be received. Information may be limited to certain regions. In most cases, all date ranges for friends can be received. In other cases, only select date ranges will be initially received. These date ranges may be only future dates, a year into the future, a month into the future, or other date ranges. A date range determined for display can also include some or all of a location history in order to help a user determine who attended a certain event or location last year.

In some aspects, systems 200 and 210 can be used to display future locations within a city, such as and including, but not limited to, a building, a park, a vacation resort, a venue, a museum, places or smaller levels of detail besides general city information. This may include smaller increments of time, rather than calendar dates. Permission manager 208 may tightly control such specific information through privacy settings and limit the information to specific groups of friends.

Figure 3:
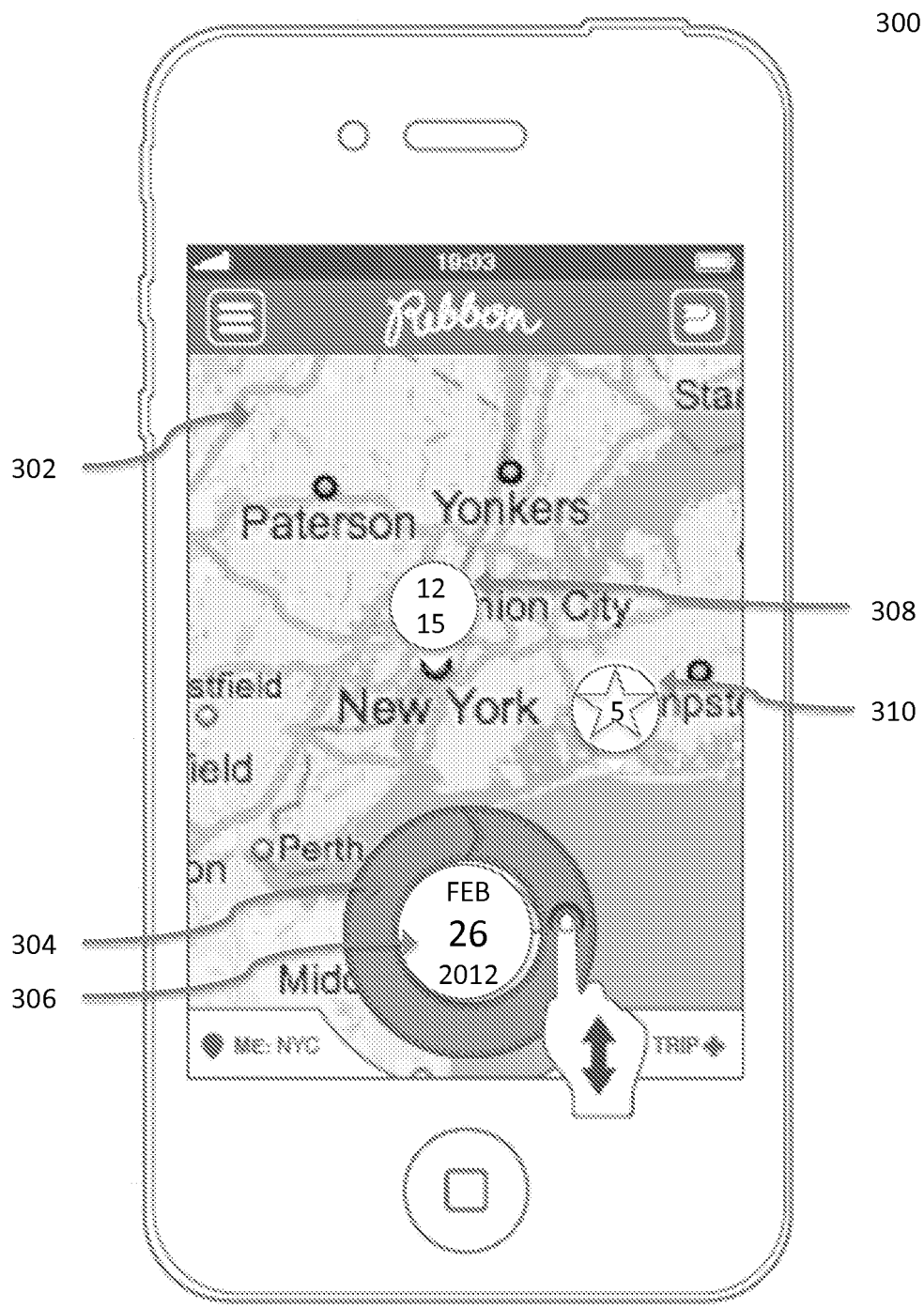
FIG. 3 illustrates a display view communicating future location information.

Example explore view 300 is shown in FIG. 3. Different future dates are selected by sliding a finger around a circular ribbon 304. The date in date display 306 will change as the finger slides around date display 306 on ribbon 304. One direction will go forward in time, while the other direction will go backward in time. For example, a clockwise slide on the ribbon will cause the date in date display 306 to advance to Feb. 28, 2012, as partially shown in the transition from display view 300 to display view 400.

While a sliding gesture is performed along ribbon 304, friend representations and associated friend location numbers may dynamically change to match the dates during the sliding motion. For example, pin 408 now reflects only 6 friends visiting and 13 friends local to New York City. In another non-limiting example, pin 408 can reflect a number representing a total of a number of friends visiting a location, local friends to that location, and friends attending events in that location. Pin 410 shows one friend at the event on or near Long Island. Significant events from news feeds or user search criteria may also appear and disappear according to corresponding future dates or ranges of dates. In some cases, dates in the past may be visited for comparison or historical purposes.

In a non-limiting embodiment, when a sliding gesture is performed along ribbon 304, location determiner 202 utilizes the date selected in date display 306 as a future date. Location determiner 202 determines locations for display based on the future date and determines geographical locations to display based on the future date and friend future location information. As noted above, location determiner 202 determines what friends have submitted or made available information for a future date and what the locations of the friends will be on the date. A future date may also include a future date range, multiple consecutive days, or specific times. In an embodiment, as a sliding gesture is being performed or date display 306 is being updated, one or more requests for future friend locations for the selected dates may be sent to location determiner 210 and/or management system 210. Location display manager 204 causes friend representations and associated friend location numbers to dynamically change to match the dates during the sliding motion along ribbon 304 and displays indications of friends at or near a location at the selected future date.

Map 302, or geographical location representations visible on map 302, may reflect other destinations that can be zoomed in and out based on user preferences and selections. Different filters or time increments may be chosen. Other visual aids can be used for pins 308 and 310.

Figure 5A:
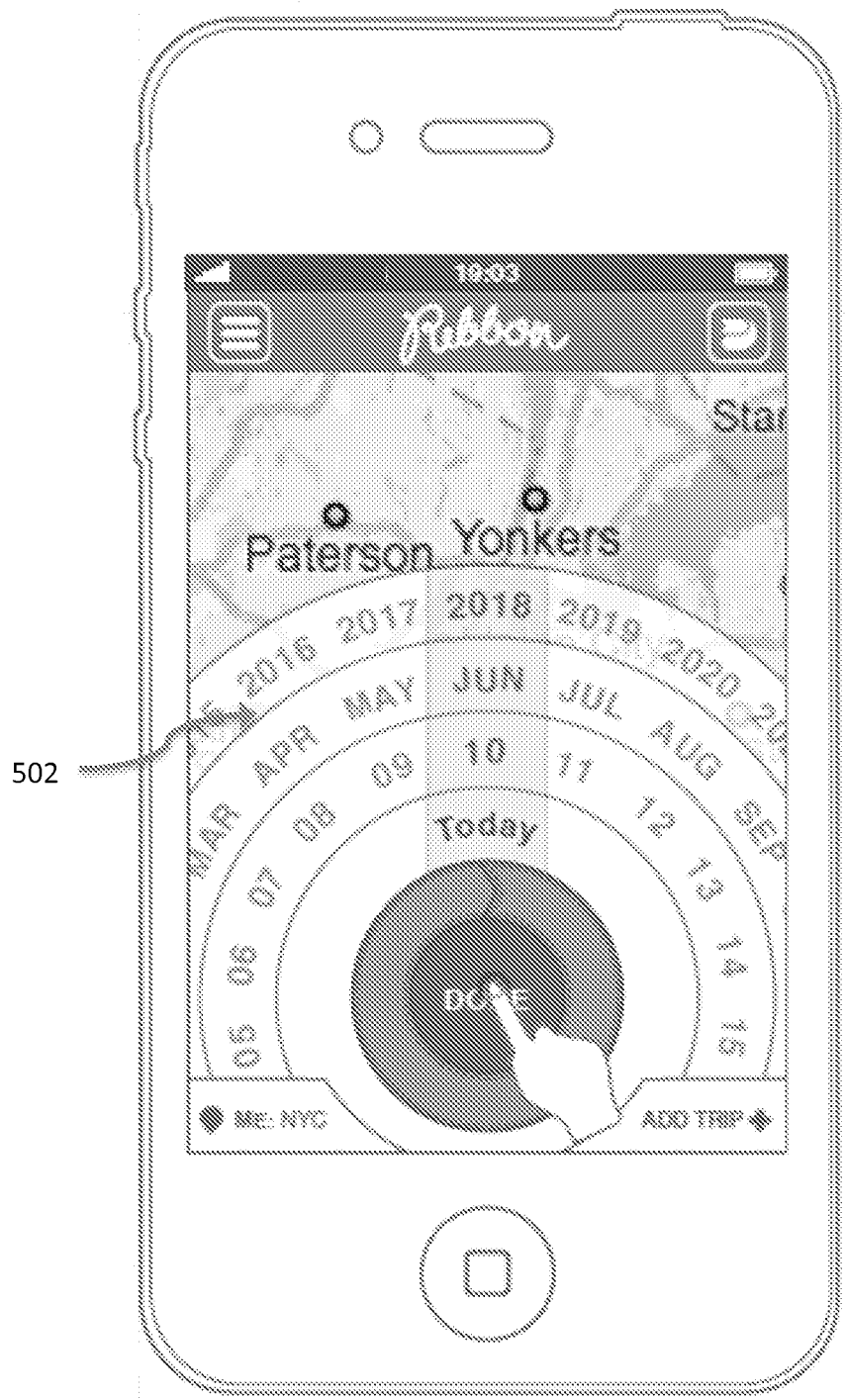
FIG. 5A-5D illustrate display views for selecting a future date.

Date display 306 may be expanded to a series of concentric date wheels on calendar display 502, as shown in display view 500 of FIG. 5A. Each ring is for selecting a year, a month or a date. Each ring may be slid in different directions. Upon confirmation of the correct date, date display 306 may be pressed. This date selection display is a convenient way to select a future date or date range. This selected date or date range can be used for further operations by future location system 200 as discussed above. Location display manager 204 operates to provide ribbon 304 or calendar display 502 for display.

Figure 5B:

FIG. 5B illustrates an example explore view 510 that enables a user to see locations of one or more of their friends on the date selected in date display 514. Explore view also illustrates ribbon 516. In a non-limiting embodiment, when a user selects any area of the display other than the area enclosed by ribbon 516, the area enclosed by ribbon 516 transitions to a mini state as shown by circular region 716 in FIG. 7B. It is to be appreciated that transitions are not limited to minification and any other transitions may be performed. In an embodiment, such transitions are performed by location display manager 204.

Figure 5C:

Referring to FIG. 5C, and according to one embodiment, when a date in date display 514 is selected, a pop-up or scrolling calendar 524 is displayed that enables a user to quickly and conveniently select a date that the user wishes to view in date display 514. Once the user has completed adjusting a date in calendar 524, the "Done" button illustrated in FIG. 5C can be selected to set the adjusted date into date display 514. The "Today" button illustrated in FIG. 5C can be used to adjust today's or a present date into calendar 524.

Figure 5D:
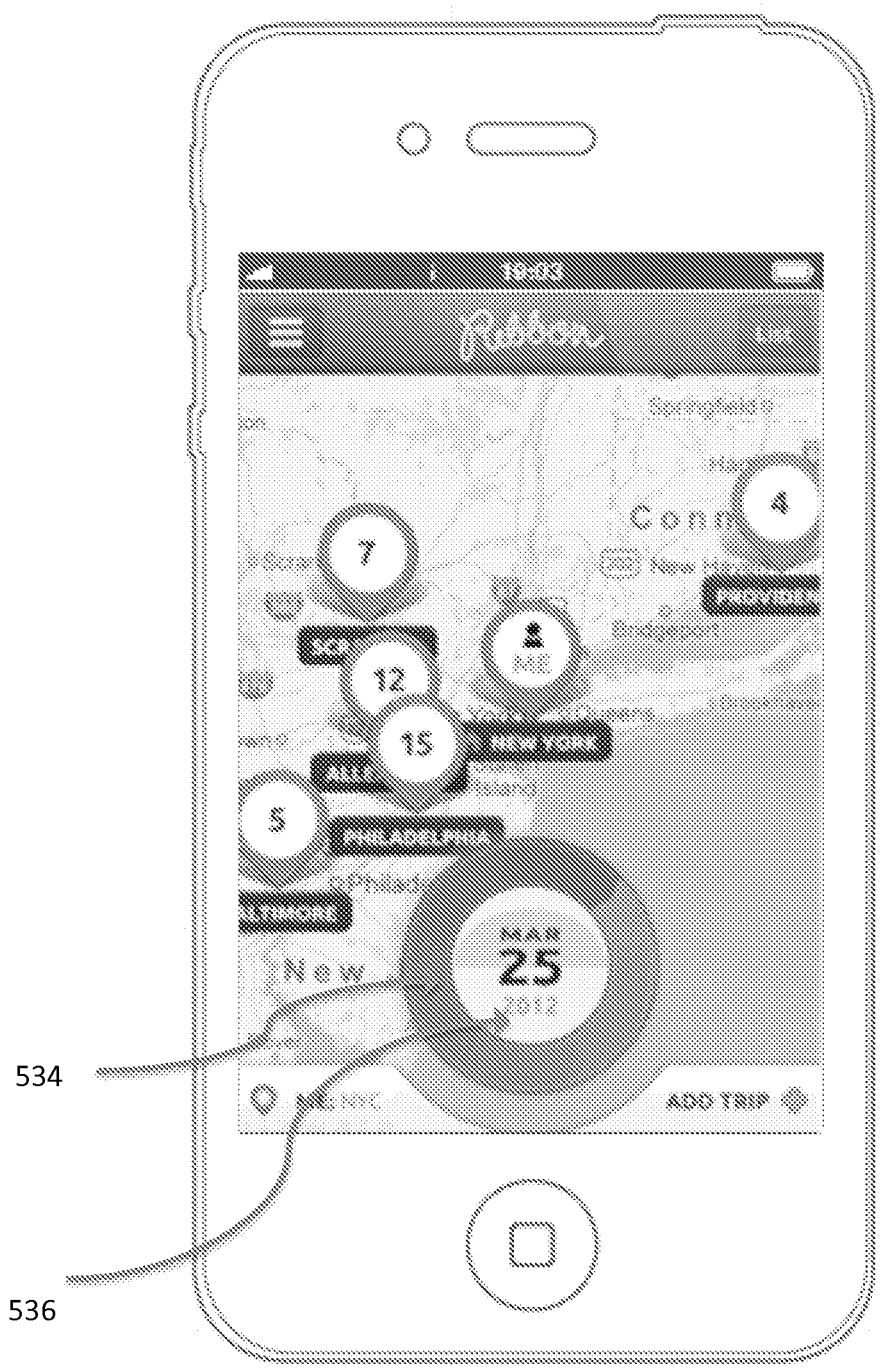

Referring to FIG. 5D, while a sliding gesture is performed along ribbon 534, friend representations and associated friend location numbers may dynamically change to match the dates during the sliding motion. Ribbon 534 can animate to display clockwise or anti-clockwise motion based on the direction of the sliding gesture or whether a user wants date display 536 to progress backwards or forwards in time. Such animation of ribbon 534 can show momentum with easing. In a non-limiting embodiment, date display 536 also updates during the sliding motion and can be animated to display a up or down "flip" motion from one date to another date while a sliding gesture is performed along ribbon 534. Friend representations and associated number of friends (e.g., "7", "12", "15", etc.) at respective locations may dynamically change to match the dates during the sliding motion.

When a sliding gesture is performed along ribbon 534, location determiner 202 utilizes the future date selected in date display 536 as a future date. Location determiner 202 determines locations for display based on the future date and determines geographical locations to display based on the future date and friend future location information.

Figure 6:
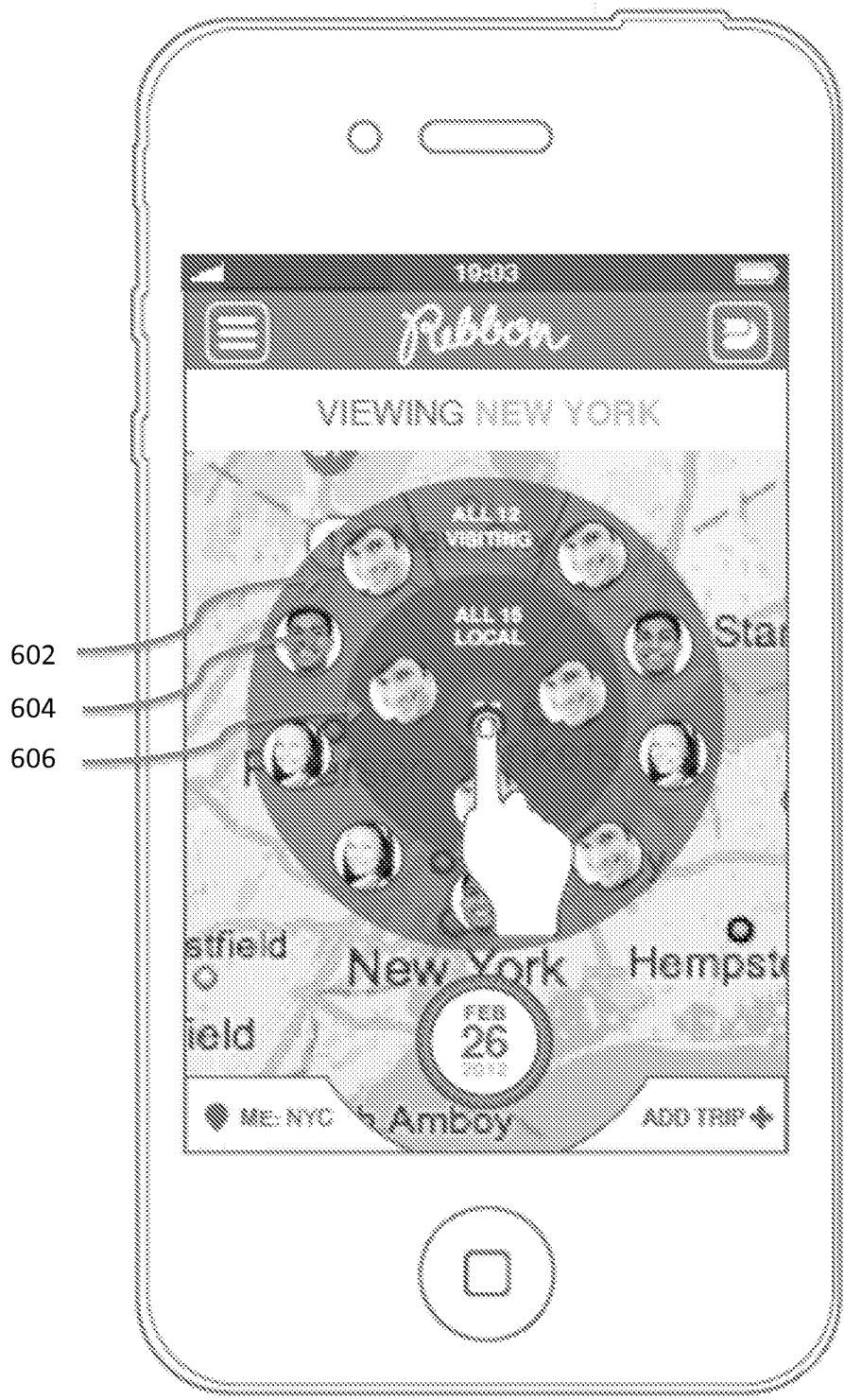
FIGS. 6-9B illustrate display views of friend location information.

FIG. 6 shows example display view 600, which illustrates the expansion of pin 308. Pin 308 may be expanded into two or more concentric rings or shapes based on who is in the geographical location on the future date. These rings display images of friends in small circles or shapes for quick reference. This expanded pin is called a "friendar," as in a radar screen of friends. In an embodiment, such displays are generated by location display manager 204.

Each ring may be associated with a particular group. For example, the outer ring 602 illustrates the 12 visiting friends with an image 604 for each of those friends. Names and friend location information are displayed with or without images. The inner ring 606 shows some or all of the 15 friends that are local to NYC or have indicated that NYC is their current home base. If there are a lot of images to display, images may be reduced in size or prioritized for display.

If space is limited, friends may be chosen for display based on a priority level set by the user or any other method. Friends may be selected for display based on past trip information or the likelihood that a friend will be contacted. Rather than showing who is in NYC or the surrounding area, pin 308 or pin 310 may also be expanded to show who is attending an event.

In another embodiment, when the pin 308 is clicked, a list is displayed. The list represents multiple further lists including the friends visiting the location, the friends local to that location, and the friends attending an event in that location— all during that point of time in the future. This list may display additional information related to the friends or location. In an embodiment, selection or clicking of a pin causes information to be sent to location information manager 214. Location information manager 214 may poll location globe repository 220 or any other system or database associated with network 102 to retrieve information for display in a list. In another embodiment, information to be displayed in a list (or any other format) may be retrieved from user device 110 or any other device.

Figure 7A:
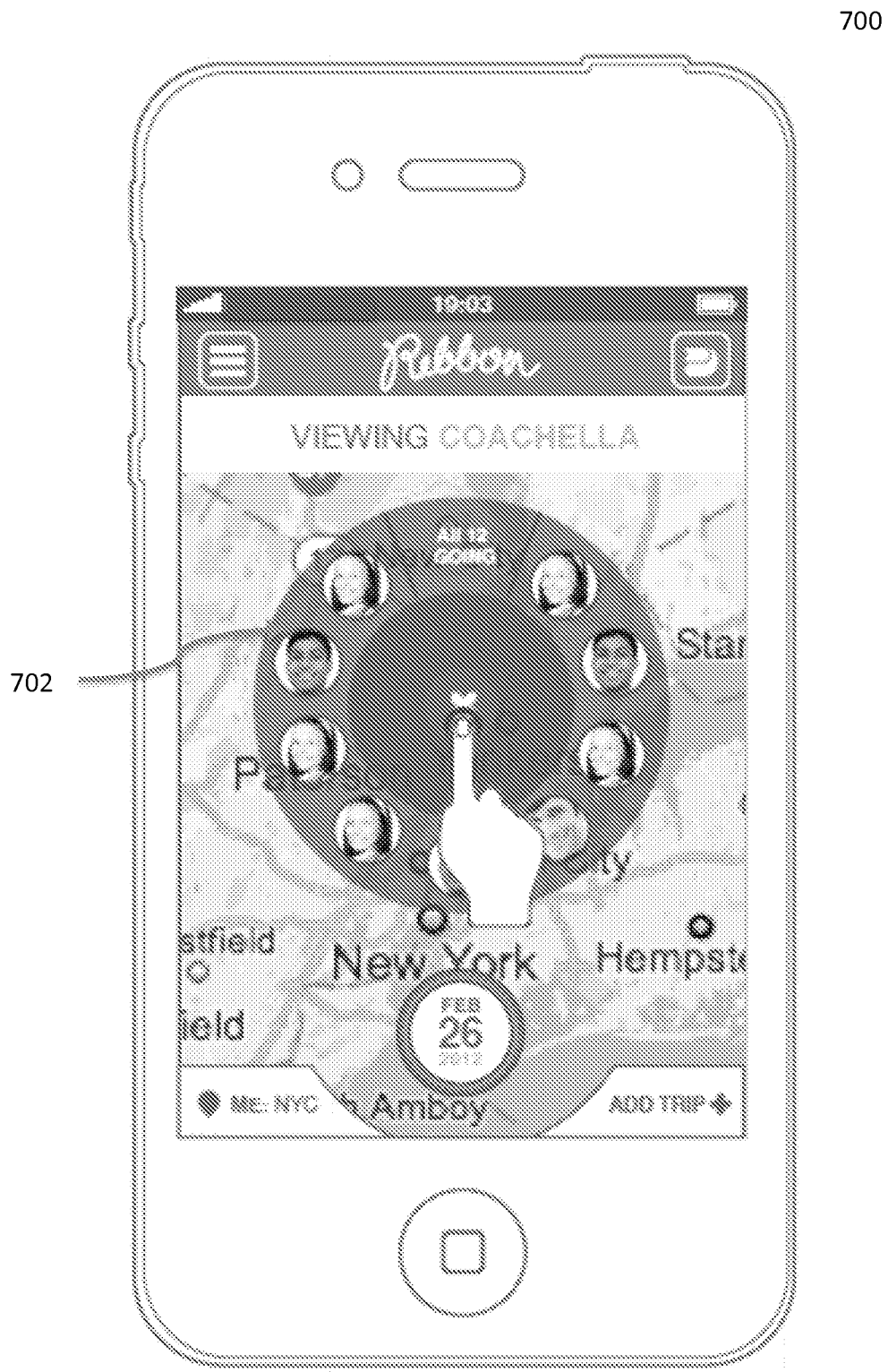

In display view 700 of FIG. 7A, the images of friends attending an event are shown in friendar 702. Location display manager 204 may be used to display friendar 702, in coordination with location determiner 202.

Friendar 702 can change its shape, the number of concentric rings, how friends are displayed, or whether friend images are static or live, dynamic images. These changes may be controlled by user gestures on or around friendar 702. Other display adjustments can be made (e.g., made by location display manager 204) based on user gestures and friend representation information. In an embodiment, user gestures at friendar 702 may cause data to be sent to future location system 200 and/or management system 210 for further operations.

Figure 7B:
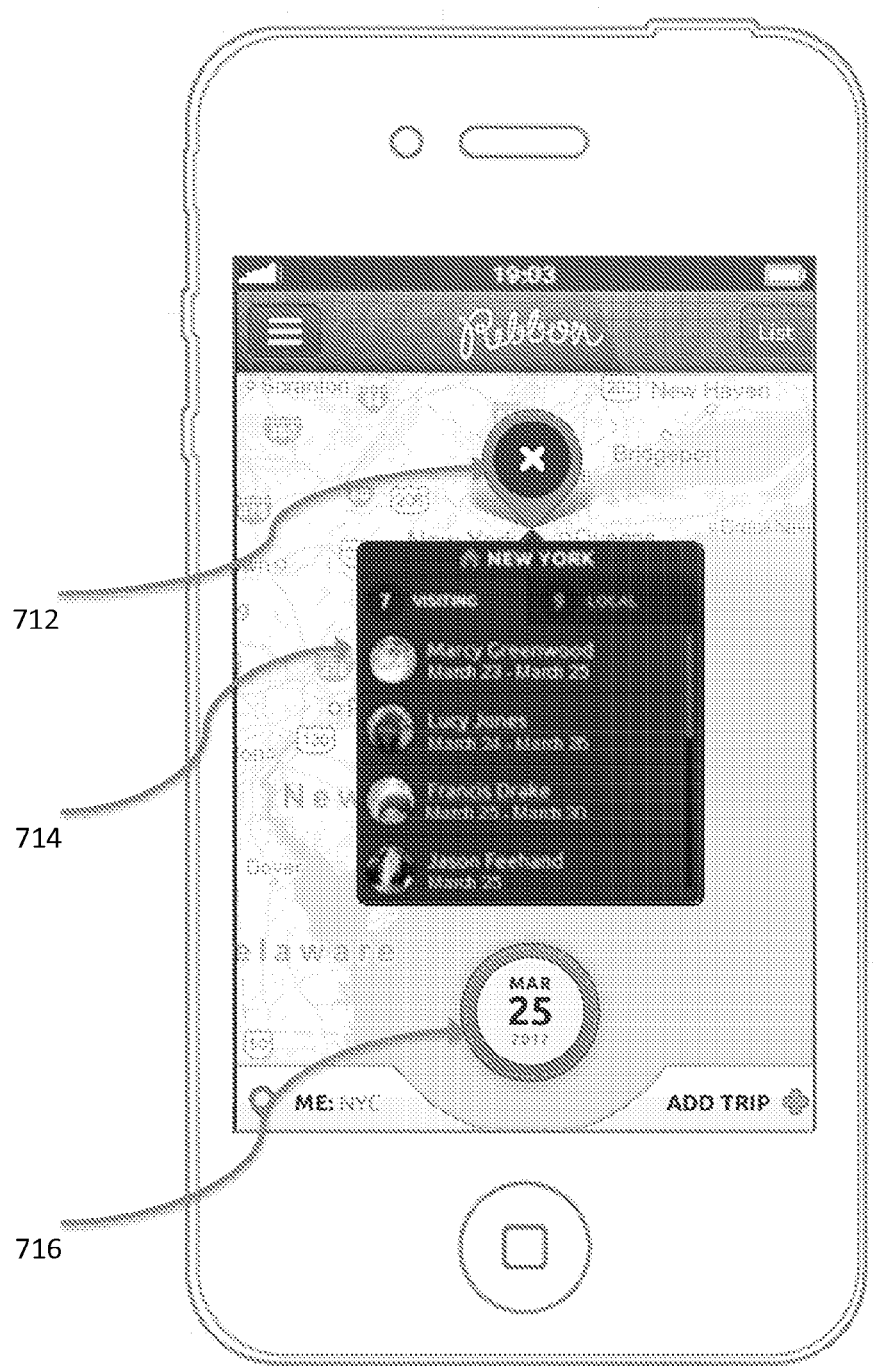

FIG. 7B illustrates example display view 710 after pin 712 has been selected. In an embodiment, when pin 712 is selected other pins that may be previously displayed fade out or are hidden from display and a list 714 may originate from pin 712. List 714 illustrates, for example, identities of users visiting a location (e.g., New York). Referring, to list 714, it can be seen that seven individuals are visiting New York and nine friends (hidden from display) are local to New York. In this way, list 714 may include tabs (e.g., Visiting, Local, etc.) to display, for example, visiting and local friends in their respective tabs. In an embodiment, user interface display operations, such as fading or hiding pins from display, may be performed by location display manager 204.

Figure 7C:

FIG. 7C illustrates example display view 720 according to an embodiment where one or more events (e.g., Coachella) are determined to exist at a future date at a location (e.g., Philadelphia) and an "Events" tab 724 is generated to display these events when the events are determined.

Figure 7D:
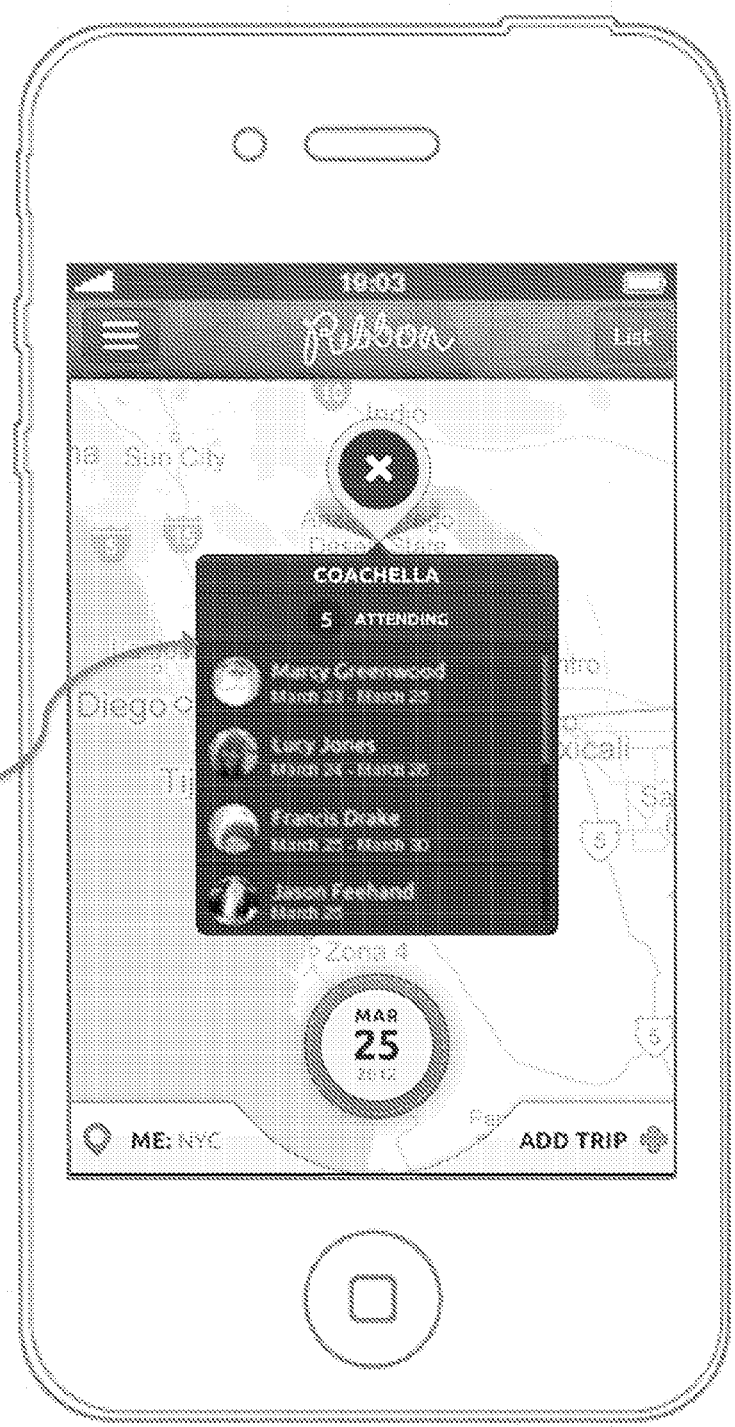

FIG. 7D illustrates example display view 730. In an embodiment, selecting a pin associated with a specific event (e.g., Coachella) reveals identities of one or more friends attending that event. For example, referring to display view 730, list 734 reveals identities of friends attending the Coachella event.

Figure 7E:
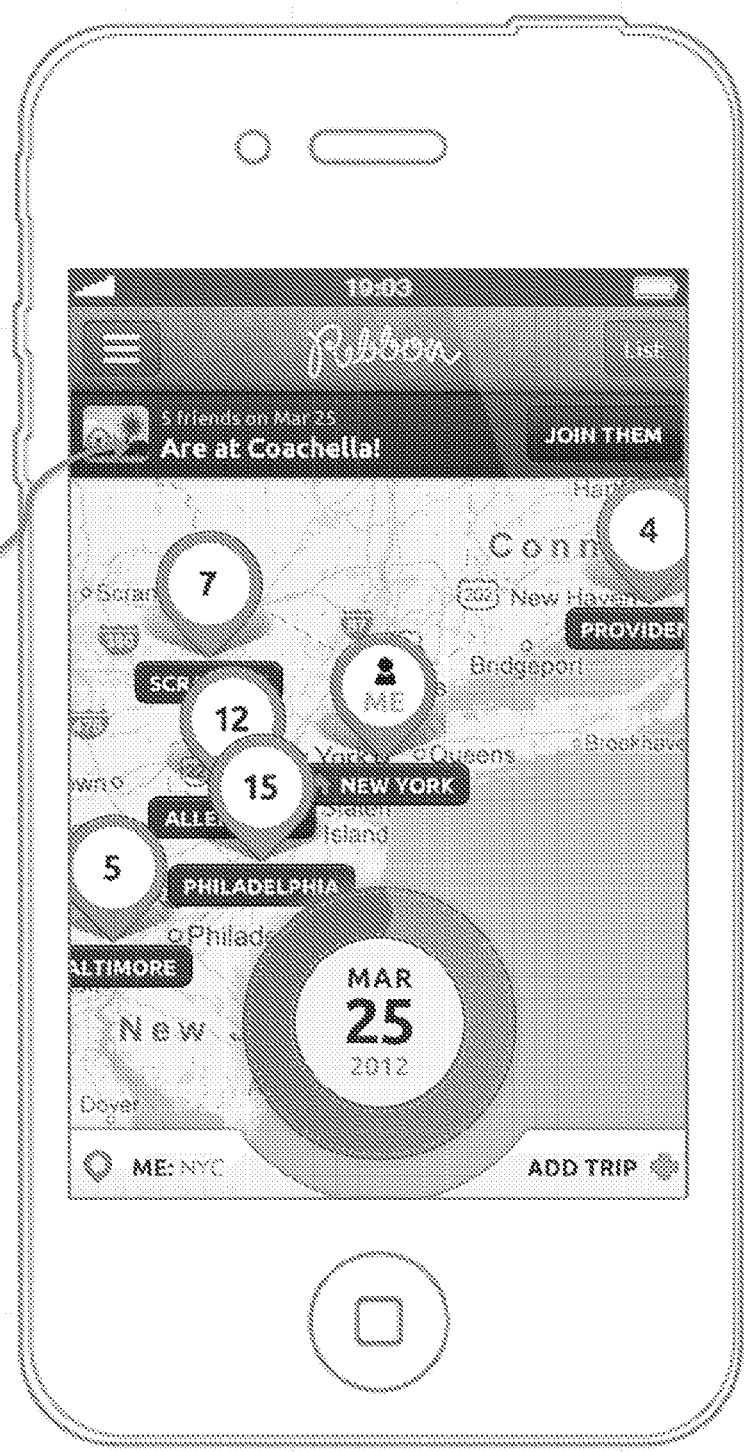

FIG. 7E illustrates example display view 740 according to an embodiment. In an embodiment, when a user selects a date, where one or more events are associated with the selected date, a notification of the one or more events is automatically displayed on a display view. For example, in display view 740, a notification 744 of the "Coachella" event and a number of friends attending the event is displayed on display view 744 when Mar. 25, 2012 is selected as a date. March 25 provides a Notification for one Event: Coachella. A notification appears that is the event that has the most of the users friends that are outside their home base for that day (or date range). In this example, the user has 5 friends that plan to be at Coachella on this day. If the user had 6 friends at a different event on this day, the event that had 6 friends would appear in the Notification and Coachella would not appear. In one embodiment, a full list of events the users friends will be at on that day can be displayed.

Figure 8A:
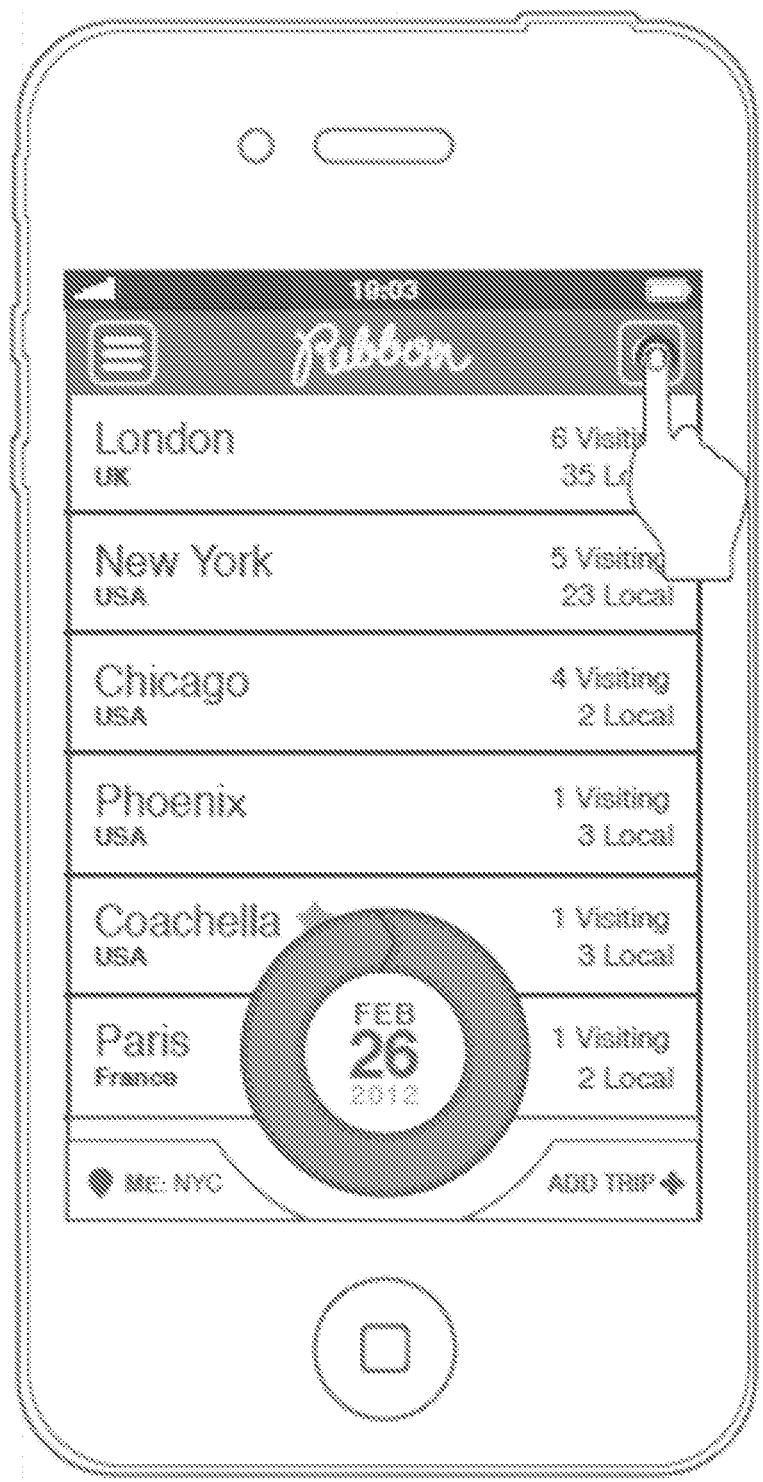

Display view 800 of FIG. 8A shows a list view of friend location information at multiple geographical locations on a given future date. Both cities and events may be shown. Friends visiting and friends local to a geographical location or event may be displayed. From the list view, a single city or event can be selected and further information identifying the visiting and local friends present in each city or event. The home base of the current user is displayed. This home base can be changed when the user plans to spend an extended time or season in a city. Trips based on a visit to a city may be easily created from the list view.

Figure 8B:
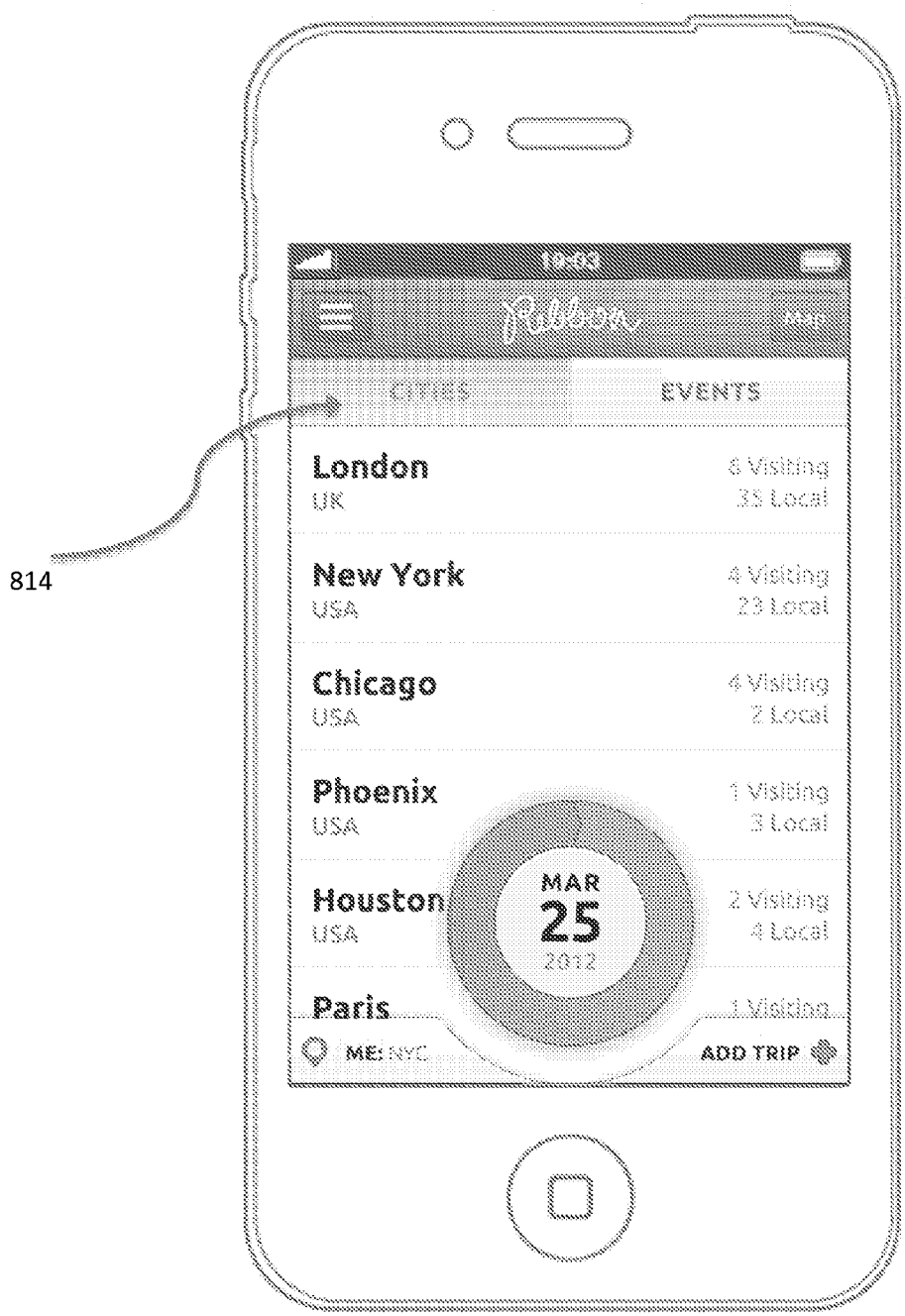

Display view 810 of FIG. 8B shows a list view of one or more cities where a user's friends are located on a given future. For example, selecting the cities tab 814 results in display of one or more cities where a user's friends are located on Mar. 25, 2012.

Figure 8C:
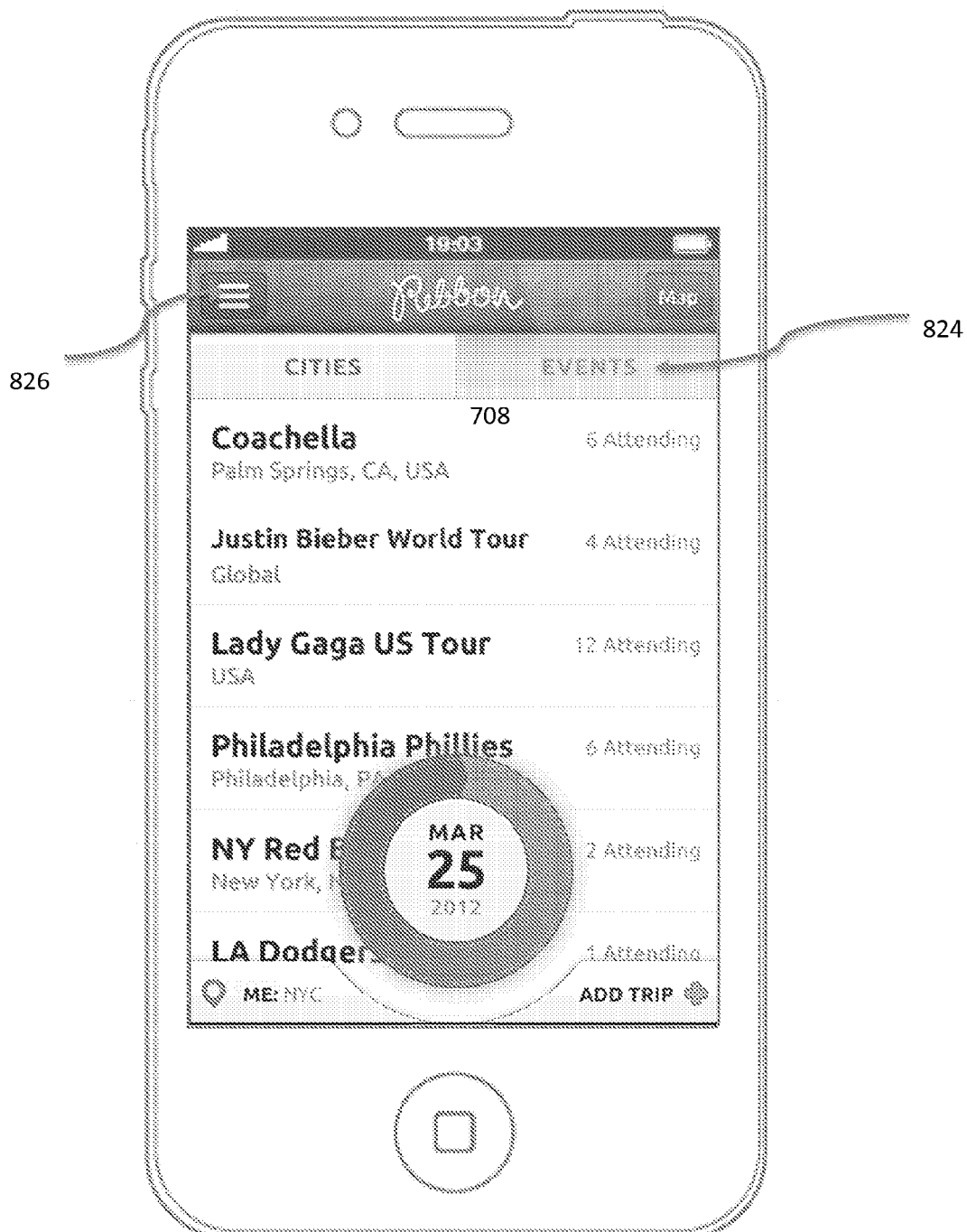

Display view 820 of FIG. 8C shows a list view of events that a user's friends may be attending on a given future date. For example, selecting the events tab 824 results in display of one or more events, which a user's friends may plan to attend on Mar. 25, 2012.

Figure 8D:
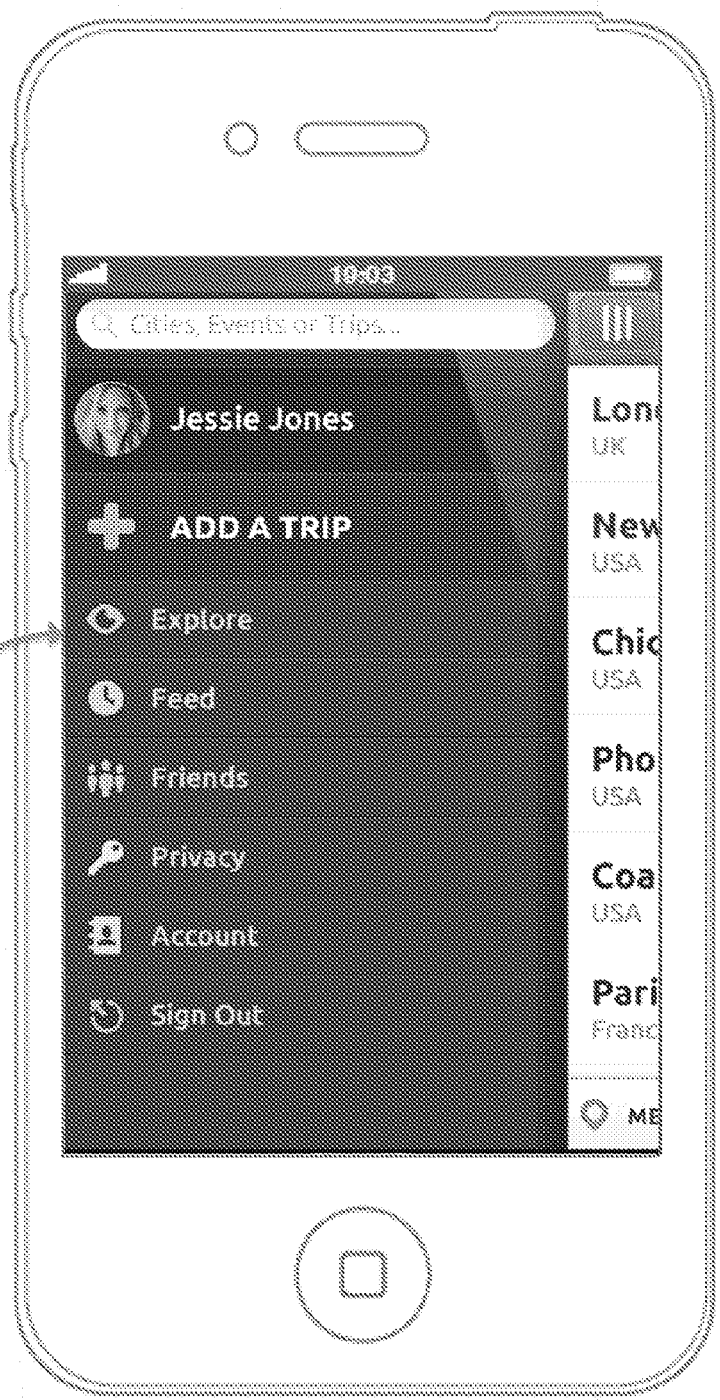

Display view 830 of FIG. 8D, illustrates display of navigation menu 834, when a user selects a home screen (or explore view) icon (e.g., icon 826 from FIG. 8C). Navigation menu 834 can enable a user to access one or more of navigational elements including, but not limited to, "Explore", "Feed", "Friends", "Privacy" and "Account" settings and features.

Figure 9A:

FIG. 9A shows display view 900. Display view 900 shows location information for friends at a geographical location on a given future date. Friend future location information may include dates that a friend will be in the area. For instance, some friends will be there one day while others will be there a week or more. Other information about the friends may be shown, including additional plans that a friend has scheduled and wants to share with others. Such information may include individual trips and travel information for other cities or events.

Figure 9B:

FIG. 9B shows display view 910. Display view 910 shows location information for friends at a geographical location on a given future date. As noted above, friend future location information may include dates on which a friend will be in the area. For instance, some friends will be there one day while others will be there a week or more. Other information about the friends may be shown, including additional plans that a friend has scheduled and wants to share with others. Such information may include individual trips and travel information for other cities or events. Also, referring to display view 910, display view 910 may be generated when a user selects a location (or city) from a list of cities appearing, for example, in FIG. 8B.

Trip and event manager 206 is configured to enable users to create, maintain and share future trip information. Trip manager 206 maintains trip information that has been collected or determined for the user. In some cases, location information manager 214 or location sharing manager 216 may also maintain trip and event information for trip manager 206. Trip information may include a location, a date or date range, friends attending, how long the friends will be there and other information about the trip location or an event at the location. In an embodiment, trip and event manager can communicate with one or more components of future location system 200 and management system 210.

Figure 10:
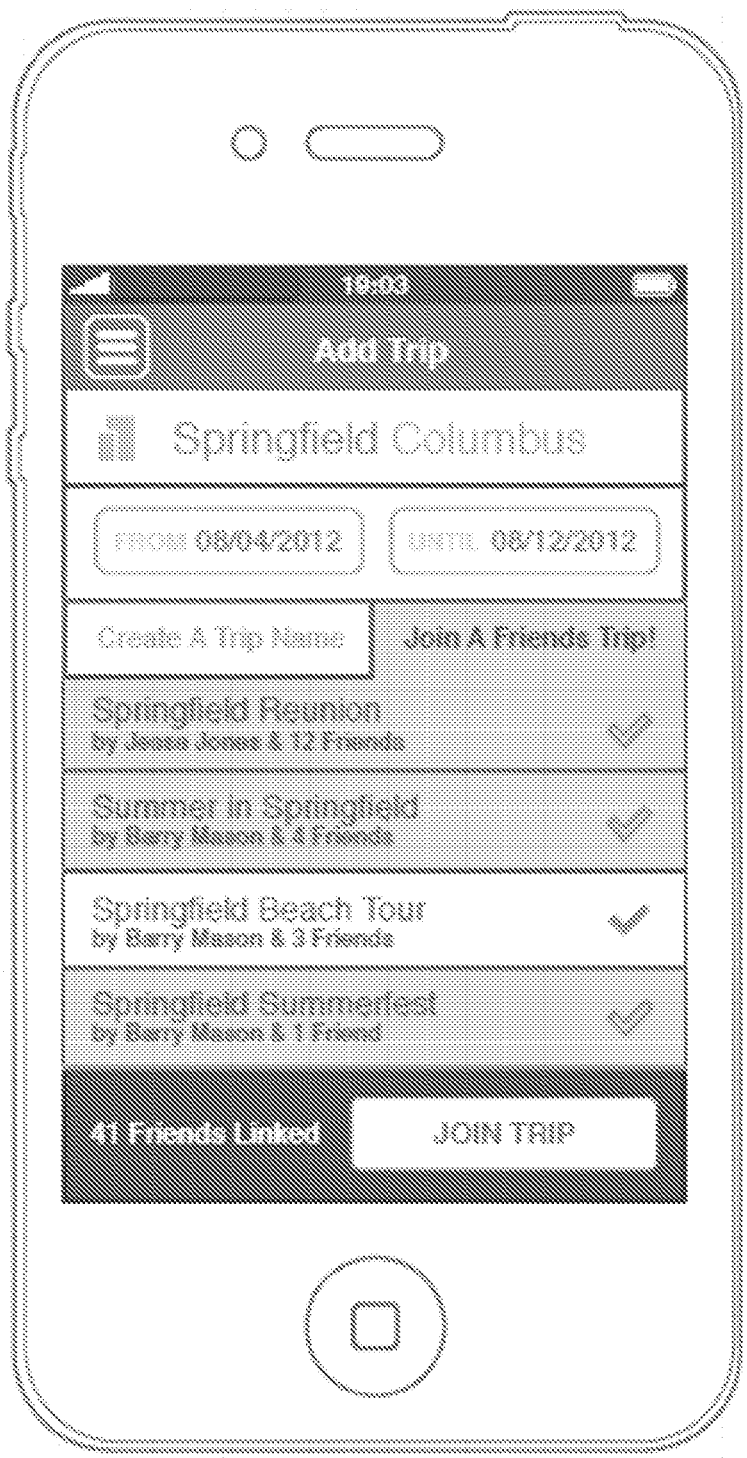
FIGS. 10-12 illustrate display views of trip information.
Figure 11:
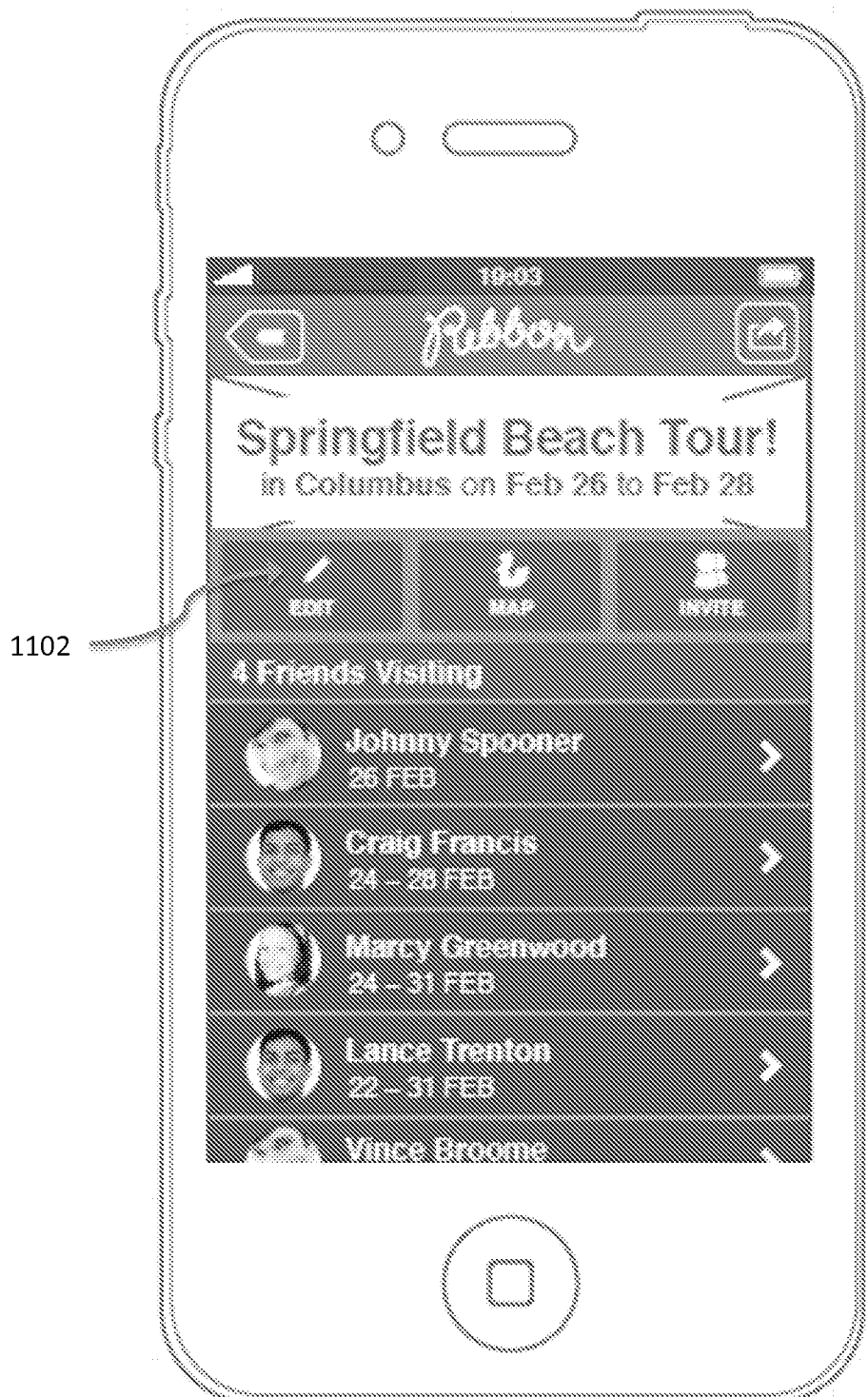

Display view 1000 of FIG. 10 shows a user interface for creating a trip based on a start date and an end date. A trip name can be created. A user that creates a trip may edit a trip, as shown by edit button 1102 in display view 1100 of FIG. 11. Named trips of friends may be displayed for a geographical location based on a future date or date range. The user may select a trip to join. In an embodiment, user interface display operations, such as displaying trip details, may be performed by location display manager 204.

As shown in display view 1000, multiple trips may be established for the same city at the same time by multiple users. Even though there are various friends in the same city, they are not necessarily part of the same event or trip. All of the trips available for view are shown for the date or date range. A user may wish to join a beach tour rather than a school reunion.

Friends visiting the city are shown with corresponding friend location information. Users may invite friends that are visiting the same city at the same time to join a trip or event. For example, the user could have created the beach tour trip.

Friends visiting the area are shown, as illustrated by display view 1100. Invites can be sent to these friends using location sharing manager 216.

Figure 12:
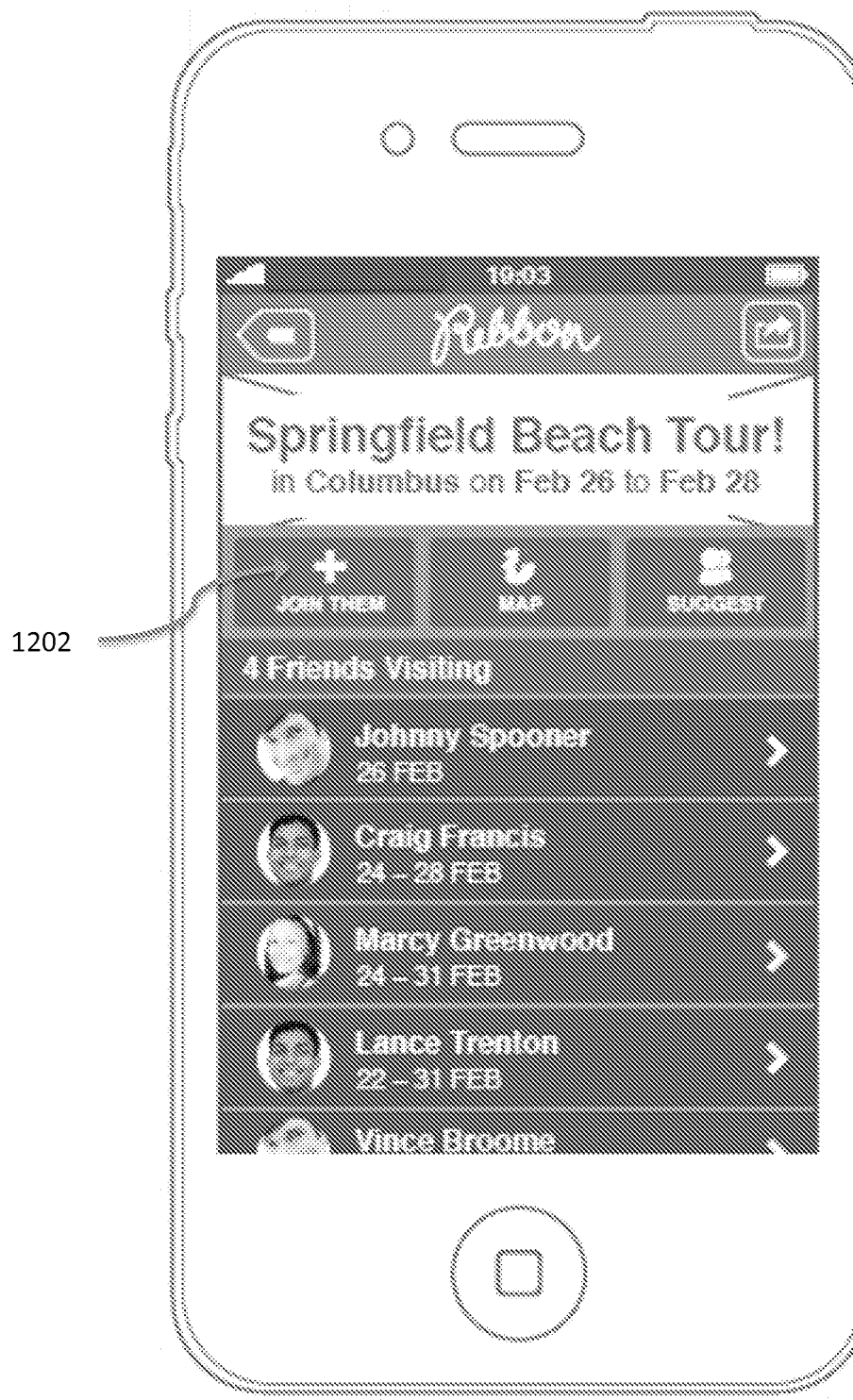

FIG. 12 shows display view 1200 for a trip created by a friend. The user may join the trip. For example, button 1202 may be used to join a trip after viewing friends that will be visiting the same city on those dates. Friends may be visiting the city but are not necessarily joining the trip. Friends not joining the trip and friends joining the trip may be viewed.

Figure 13:
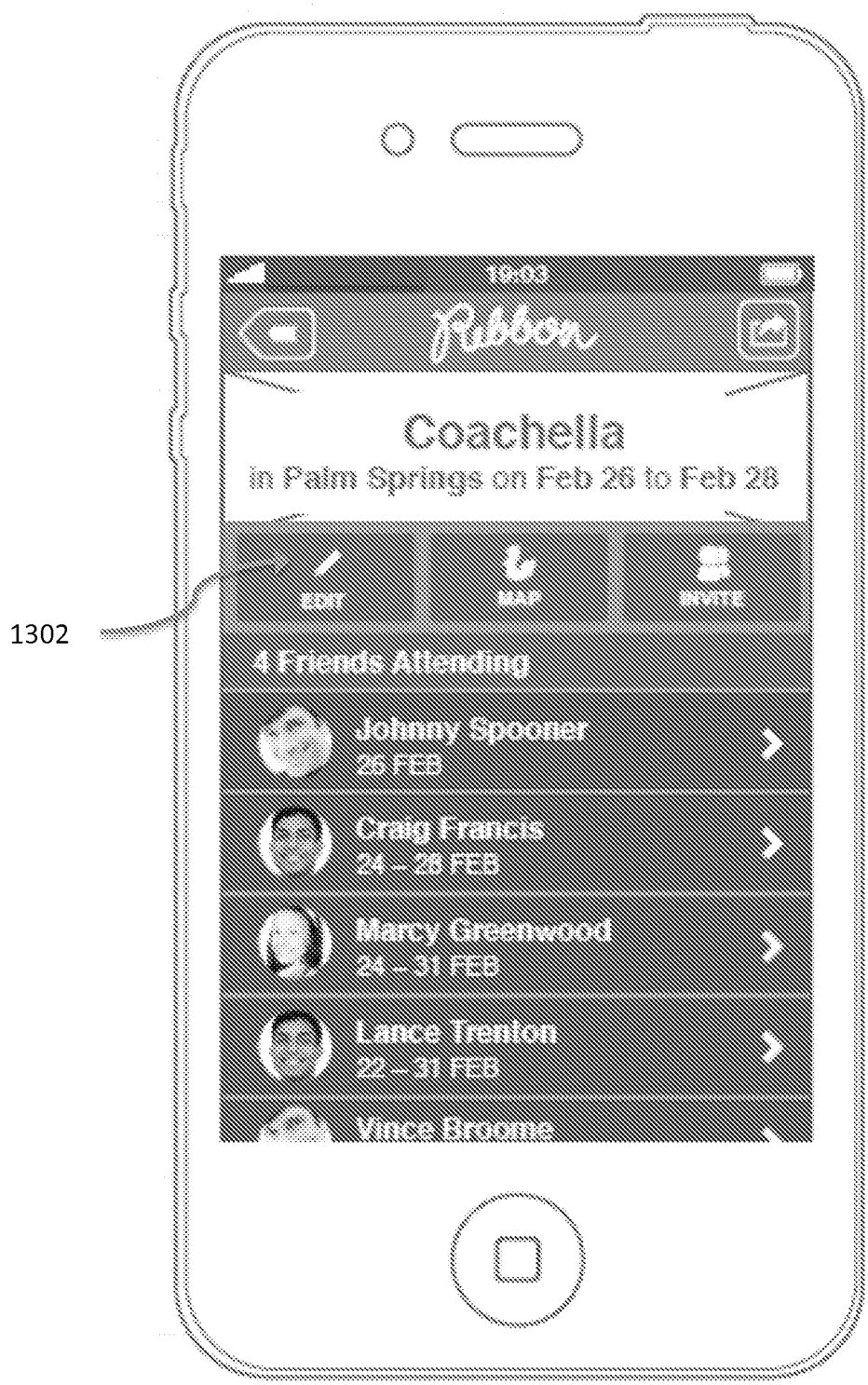
FIGS. 13-14 illustrate display views of event information.
Figure 14:

FIG. 13 shows display view 1300. Just as a trip may be created, edited or joined, an event may be created, edited or joined. For example, an event may be edited using user interface controls such as edit button 1302. An event may be joined using button 1402 shown in display view 1400 of FIG. 14.

Figure 15:
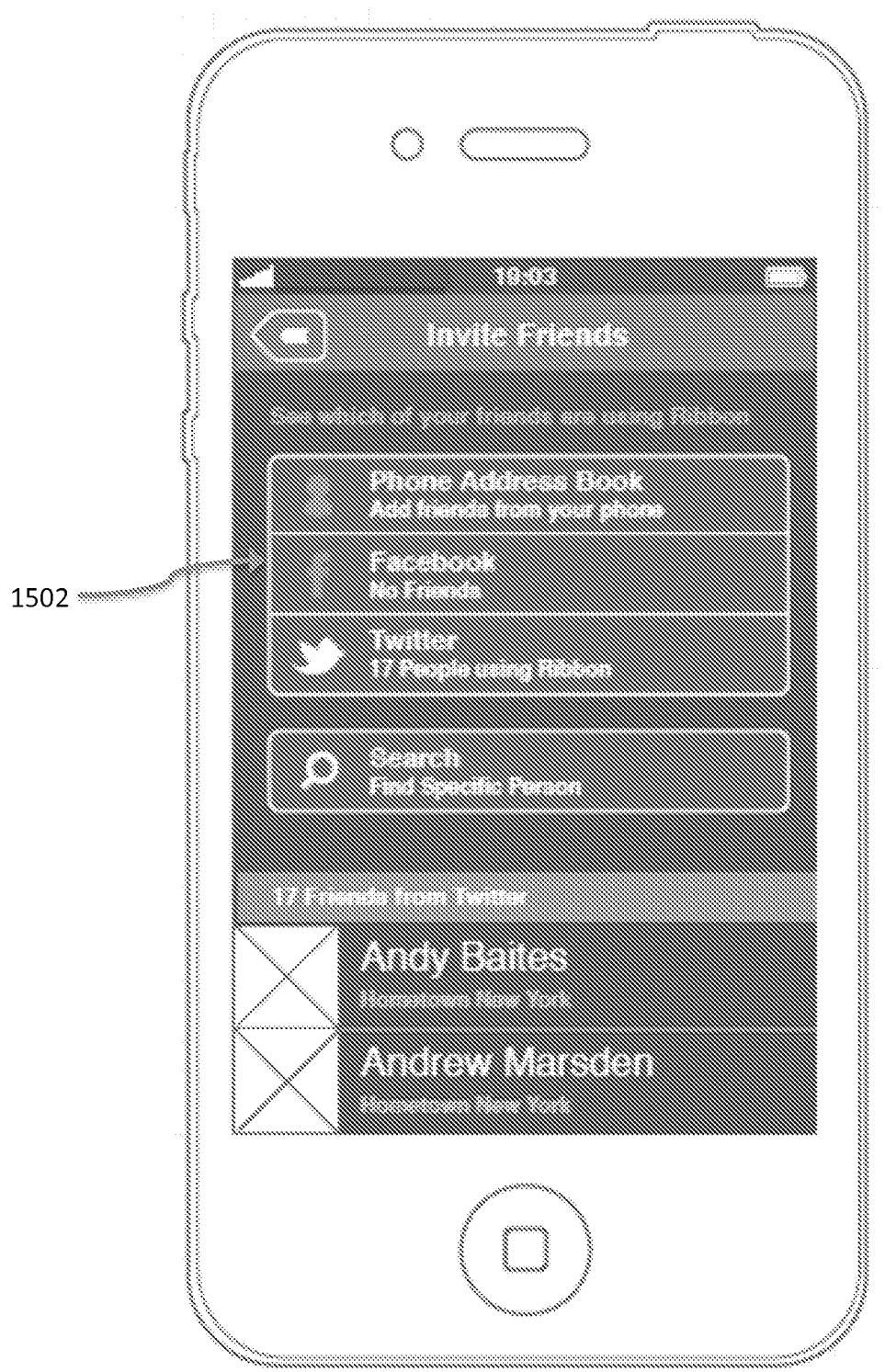
FIG. 15 illustrates a display view for inviting friends to join.

FIG. 15 shows display view 1500. Display view 1500 shows how friends may be notified by the user and invited to join a trip or event. A phone number may be provided. Links to social media 1502, such as a Facebook® link to a personal wall, timeline or page, trip wall, or event wall may be available. Twitter® content related to the trip may be available for view. Integration data can also be used from Google. In one embodiment, location data from a third party application, such as Foursquare®, can be used. In a non-limiting embodiment, a user would "allow" a third-party application to learn the user's own and friends location data, which enables the system described herein to retrieve such data and populate system data and displays accordingly. In a non-limiting embodiment, a user would also "allow" a third-party application to learn the users own and friend's interest and other data, which enables the system described herein to retrieve such data and populate system data and displays accordingly. In an embodiment, a user may choose to join an event that has been selected to appear for display. As an example, such an event may be retrieved from third-party application or social network. When a user indicates that the user wishes to join an event, trip event manager 206 creates a new trip for the user based on the event.

In an example embodiment, a "follow" button may be provided with respect to the application. The follow button may be related to, including but not limited to one or more individuals, brands, groups, events, etc (e.g., celebrities, artists, athletes, bands, teams, events, etc.). For promotional and marketing purposes, politicians, athletes, entertainers, etc. may provide a certain level of future location information such as when an athlete may be playing a team in a certain city or when an entertainer is scheduled to be on tour in a city. If the "follow" button is selected, the button will change to display "following" for the celebrity (or any other) "friend." If a user happens to be or is planning to be in the same city on a future date, either through remaining at home base or on a trip to the city or location, the user may receive such an indication or location match or alert in a feed, email or other means.

Figure 16:
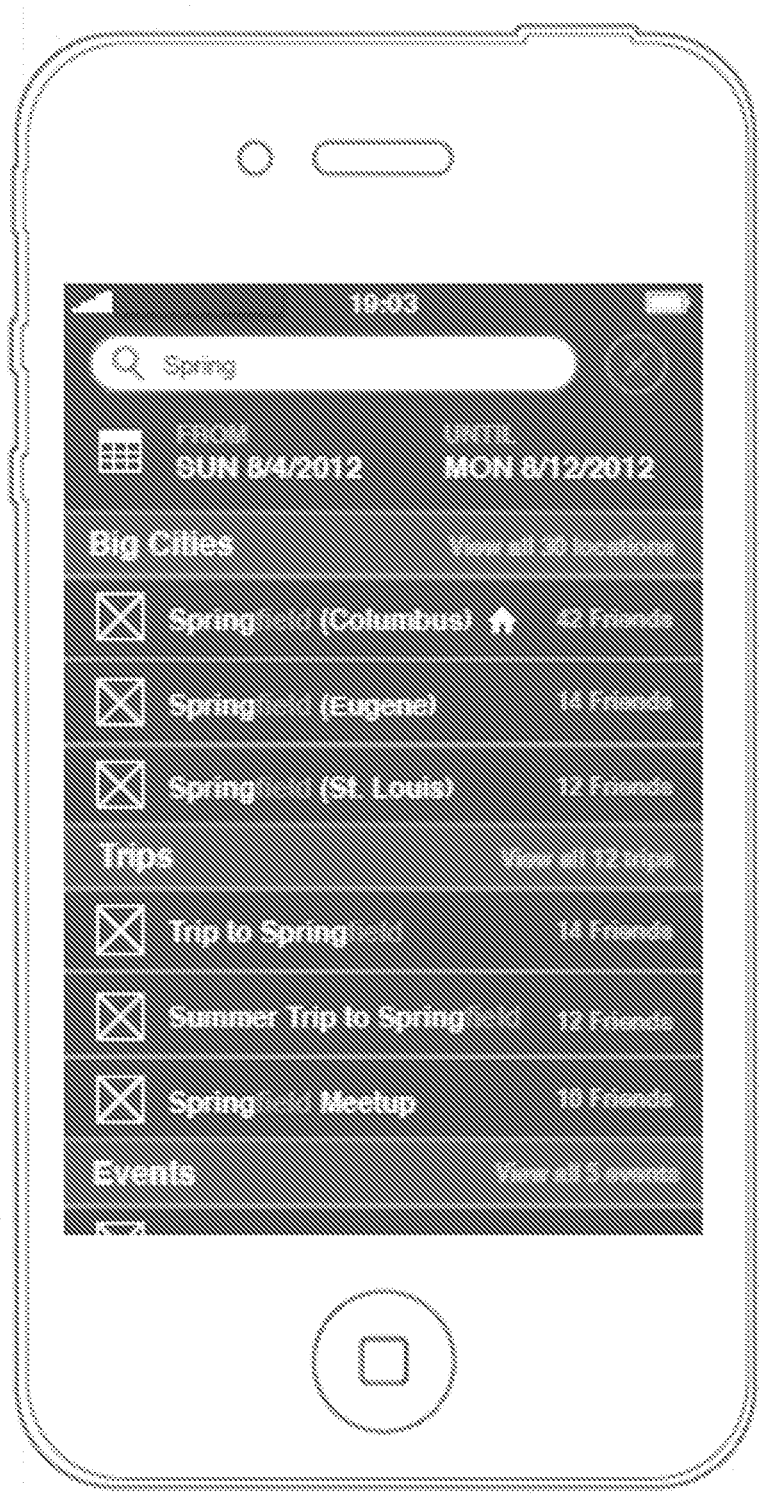
FIG. 16 illustrates a display view of the search function.

Other features are illustrated for showing how easy it is to communicate a status of future plans. Display view 1600 of FIG. 16 may show how geographical locations, trips and events may be searched. Big cities in the area, any named trips and any planned events can be shown in the same view based on a selection of a location and a date range. Each of these results may be grouped by result type. Further results may be expanded. Results may be filtered, hidden, removed or added.

Figure 17:
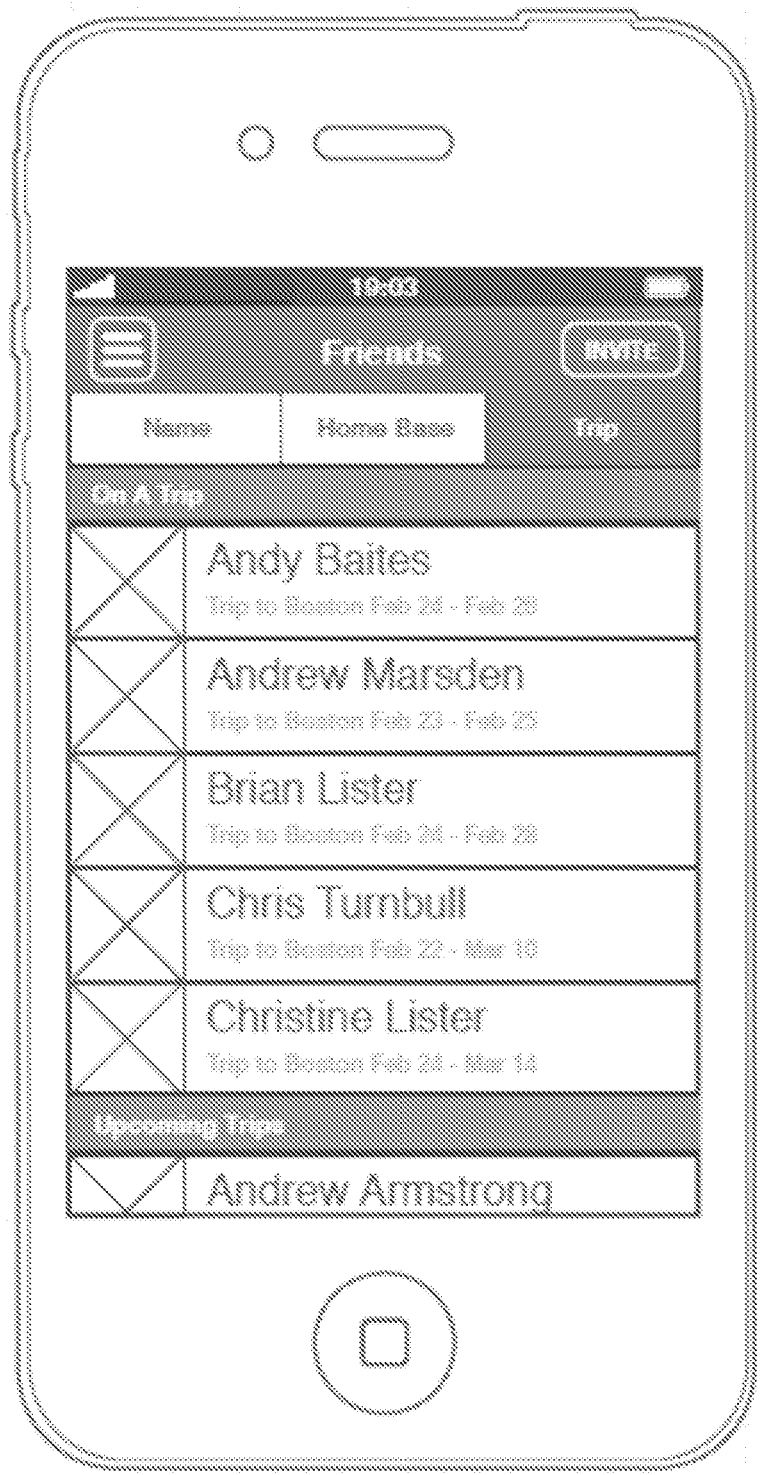
FIGS. 17-18 illustrate display views of trip information.

Display view 1700 of FIG. 17 shows friends currently on a trip as well as their upcoming trips. For example, friends on a trip may be listed, with trip name information and dates. Upcoming trips may be listed. The results view may be listed based on a home base selection of the friends.

Figure 18:
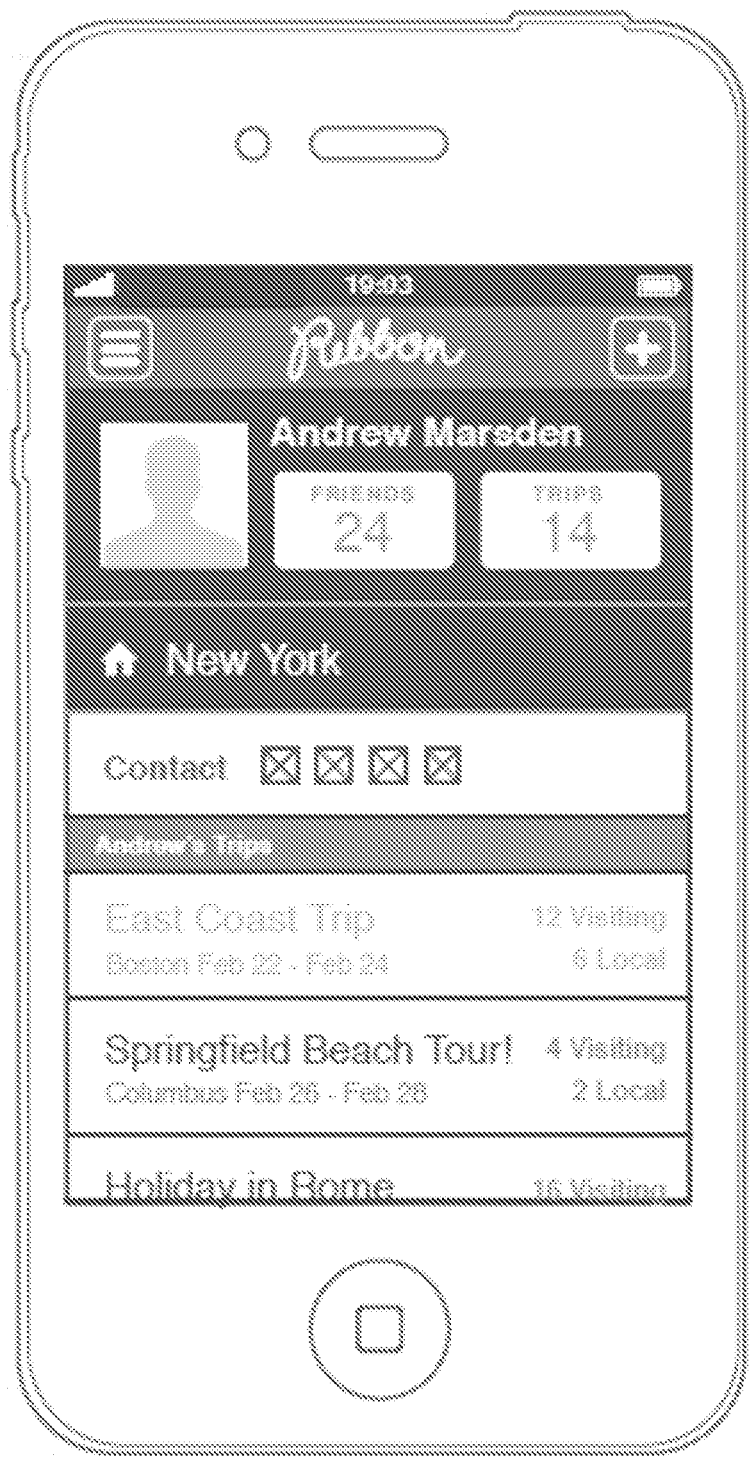

Display view 1800 of FIG. 18 shows further details about future plans of a friend. Such friend future location information may be very detailed for a select few or less detailed for a large group. Historical information of past trips may be shown. In some case, only a number of trips are shown. Display view 1800 shows an example of a number of trips, which can include only future trips or include all trips past, current and future. Contact information may be provided for easily sending invites to friends or prospective friends as desired. Privacy controls are used to control who may view such information or what information is received. Permission manager 208 may handle privacy and permissions settings that are friend, location and/or trip specific.

Such views provide future location status information so it is easier to plan future meetings or gatherings. It also saves friends the hassle of asking who is going, not receiving responses, asking again, remembering what a friend said or remembering what a friend said about another friend.

Figure 19:
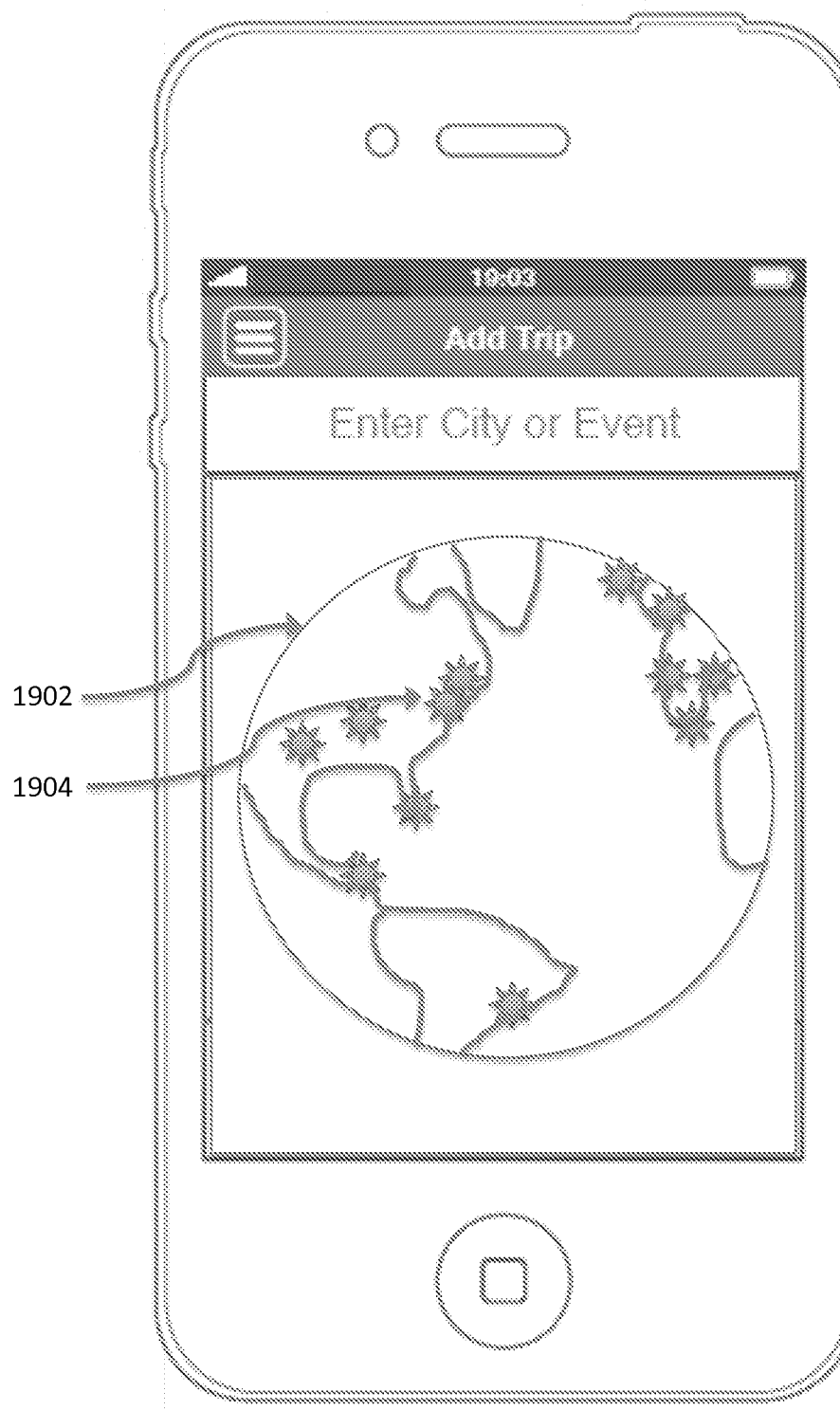
FIG. 19 illustrates a global display view of future location information.

Geographical locations, events, pins and friend location information may be maintained in a map format for each day or time increment into the future. Display view 1900 of FIG. 19 shows a globe 1902 with relevant geographical locations represented on the map. Pins may provide friend location information for each location. Globe views may be used in coordination with ribbon control 302.

In one implementation, a calendar can be displayed for a user with one or more cities in each day block corresponding to future locations of the user's friends. If more than one friend is in a future location on a given day, the block on the calendar can reflect this. For example, the block can include a city name with a number next to it. The number can represent the number of friends physically present in that location. Clicking on the city can expand to a view where you can see a number of friends visiting that location, a number of friends currently living at that location and a number of events at that location.

GIS mapper 212 may be used to help provide maps and accurate geographical locations and pins. It may obtain updated GIS information. GIS mapper 212 may determine which geographical areas and locations to display based on date information, friend future location information and/or event information.

Location information manager 214 may be used to obtain current friend location information from location entries submitted on user device 110 and friend devices 130-134. Location information manager 214 may be responsible for providing updates for location, trip and event information. Location information manager 214 may store location information. In some cases, future location information related to friends may be stored in secure location globe repository 220. As described above, location globe repository 220 may be used to provide a globe 1902 for display, indicating geographical locations, such as location 1904, having pins or indications of future presence in the geographical location.

In an embodiment, main (or major) geographical locations (or "big cities") can be established for globe 1902 (or any other geographical representation). Such establishment may include selecting which cities are big cities. As a non-limiting example, cities with populations over 250,000 may be considered to be big cities. Such establishment may also involve including surrounding cities or locations that are often associated with a big city, either through public records, online records, public information, social information or user recommendations. Once big cities are established, users or friends of a user may be assigned to these big cities. In an embodiment, such assignment may be automatically done by location, address or other information of a user and associated friends.

Location sharing manager 216 may be used to enable a user to share future location information. A user can share information generally. A user can also share information with specific individuals or groups. Sharing can include posts, email, invites or various methods available through social media. Information specific to a trip or event can be shared.

Implementations of future location system 200 may be provided through a mobile application stored in computer-readable media of user device 110 and executed by one or more processors on the device. The application can display a user interface that is operated by the user. In some implementations, management system 210 may provide the functionality of future location system 200. On other implementations, the functionality of systems 200 and 210 may be provided through a browser.

Figure 20:
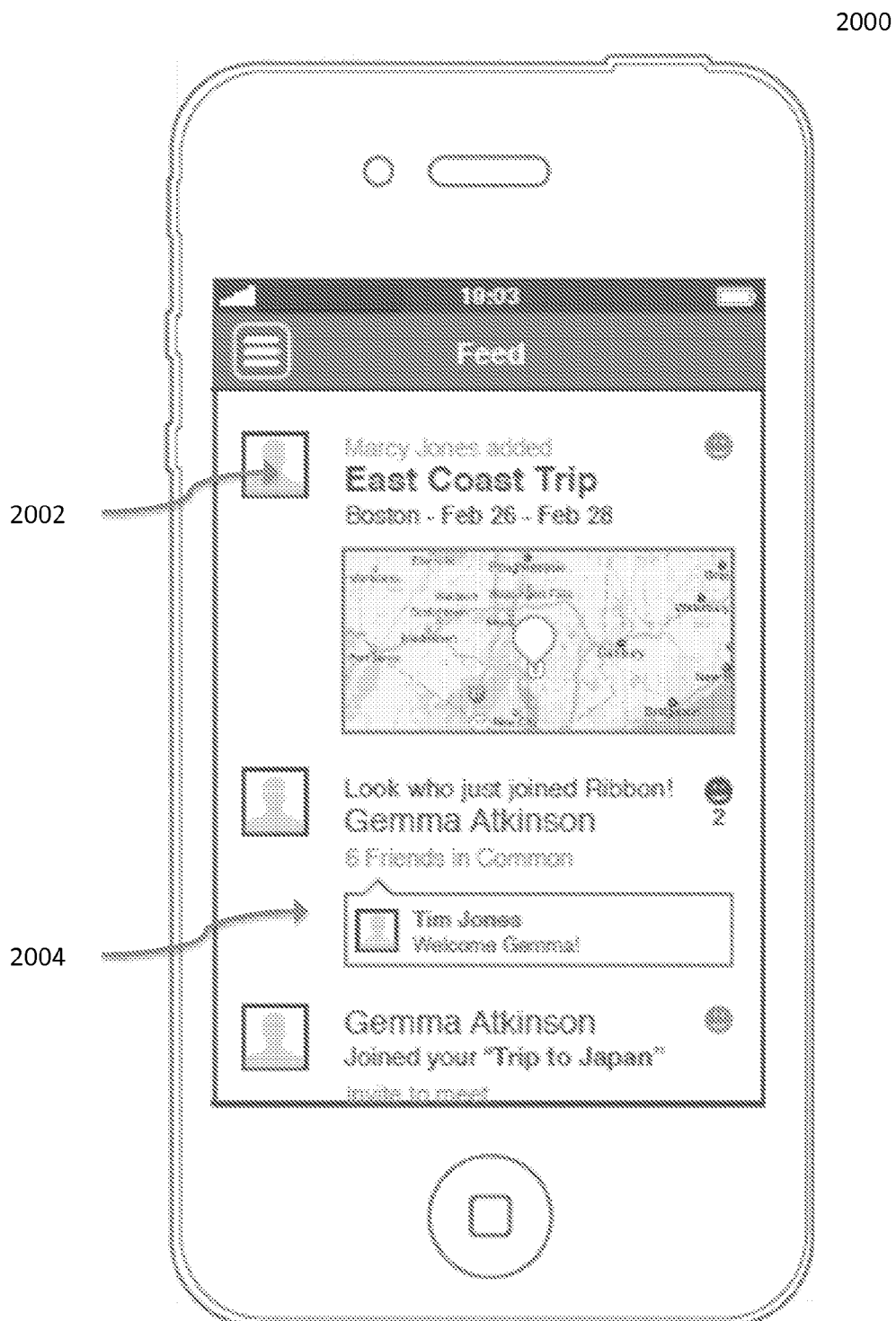

FIG. 20 shows display view 2000. Display view 2000 illustrates one or more messaging feeds specific to the application. Such feeds may be collected and scrolled in one feed. Each feed message may be joined or accompanied by trip information, such as trip information display 2002. Such information may include how many friends will be present, visiting or attending an event. Comments 2004 may also be provided for each message.

Figure 21A:
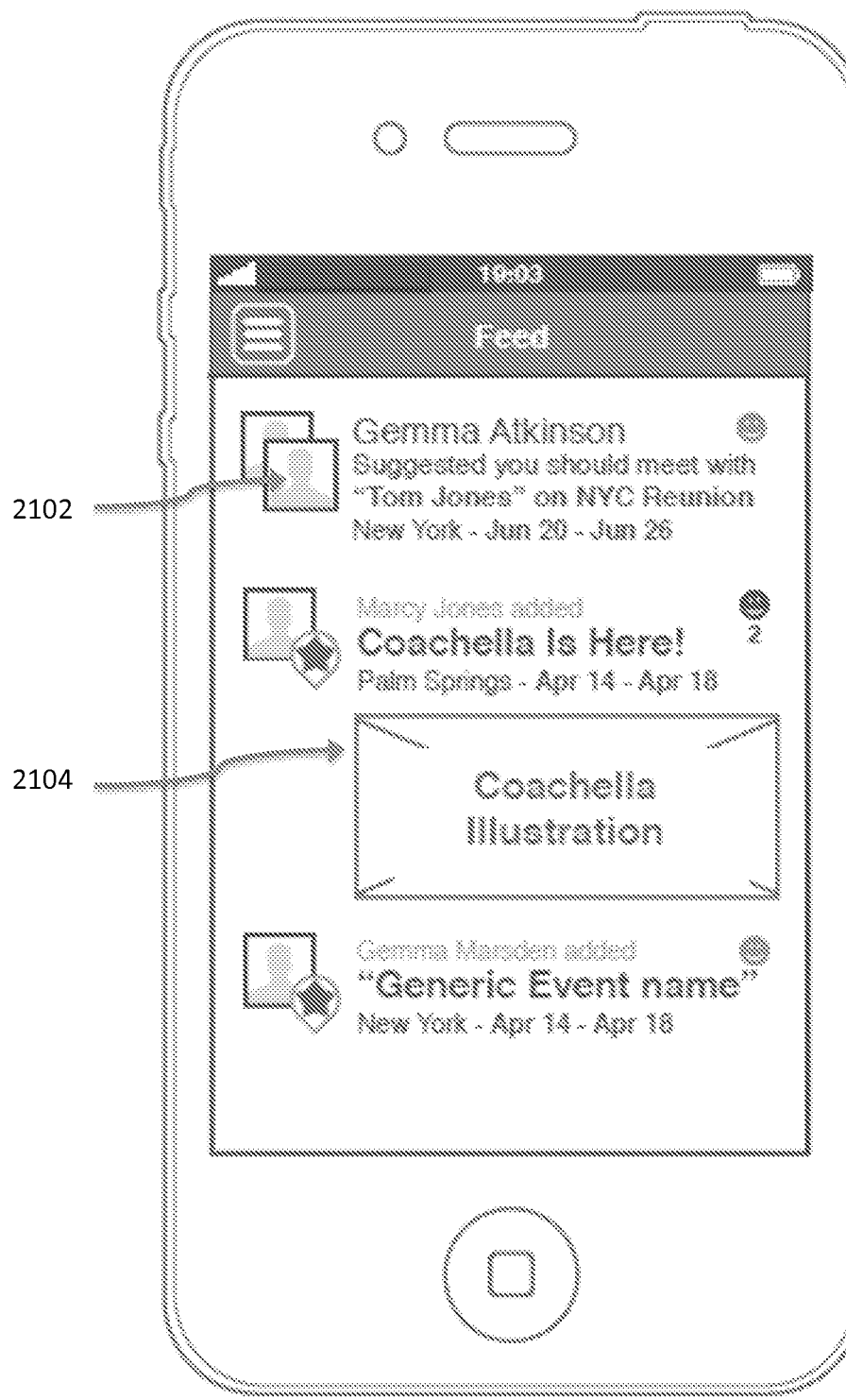
Figure 21B:
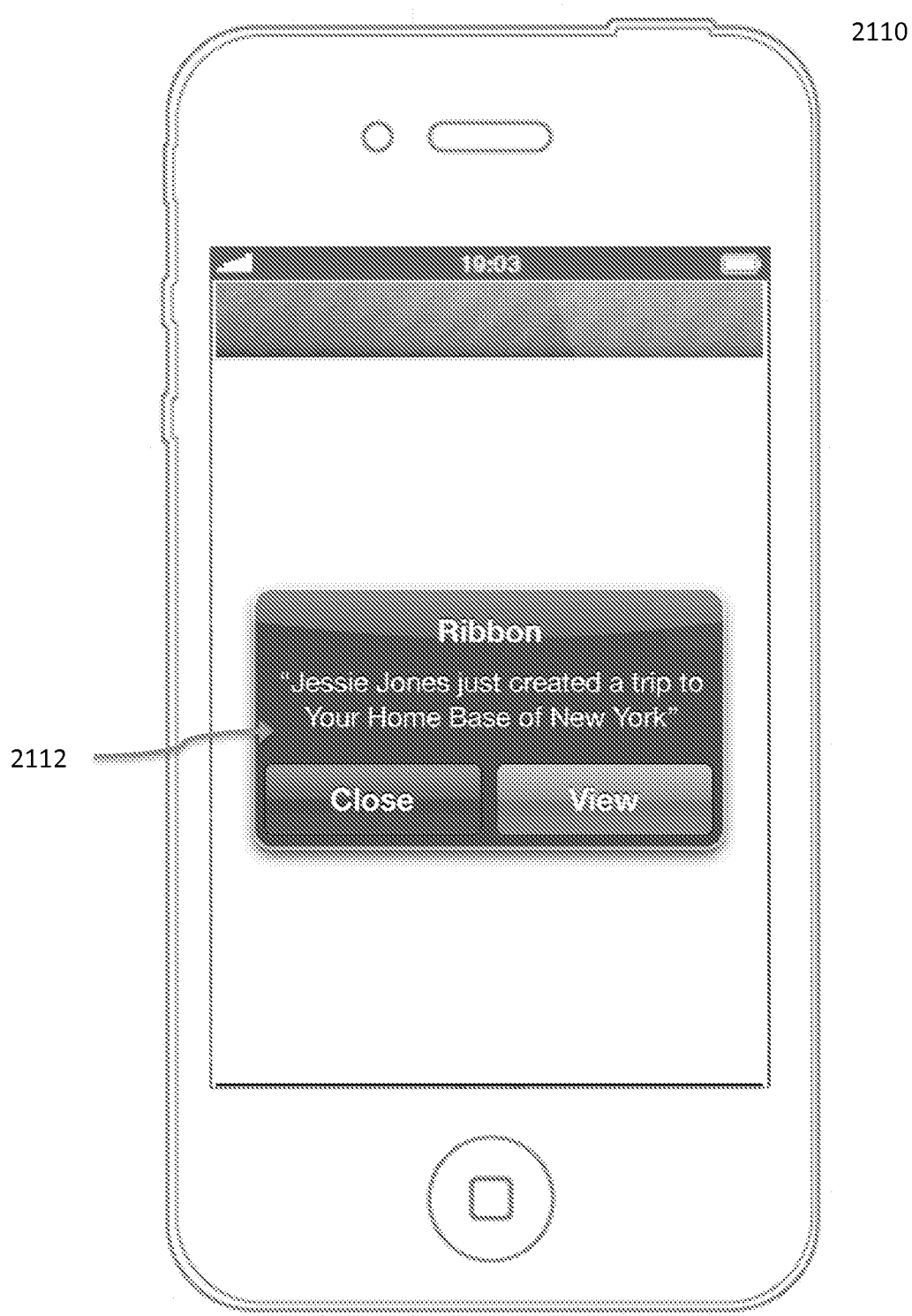
FIGS. 21B-E illustrate example notifications.
Figure 21C:
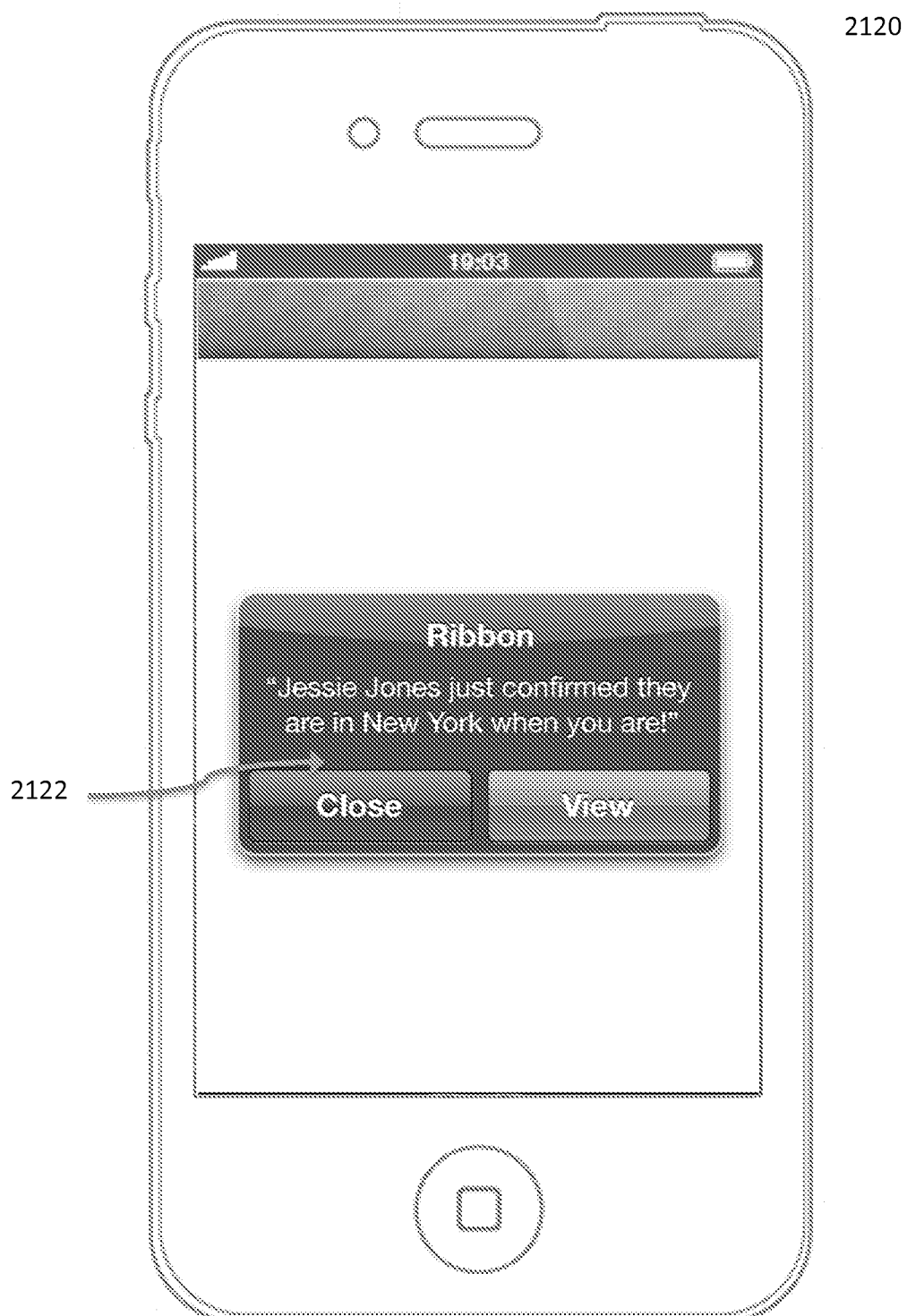
Figure 21D:
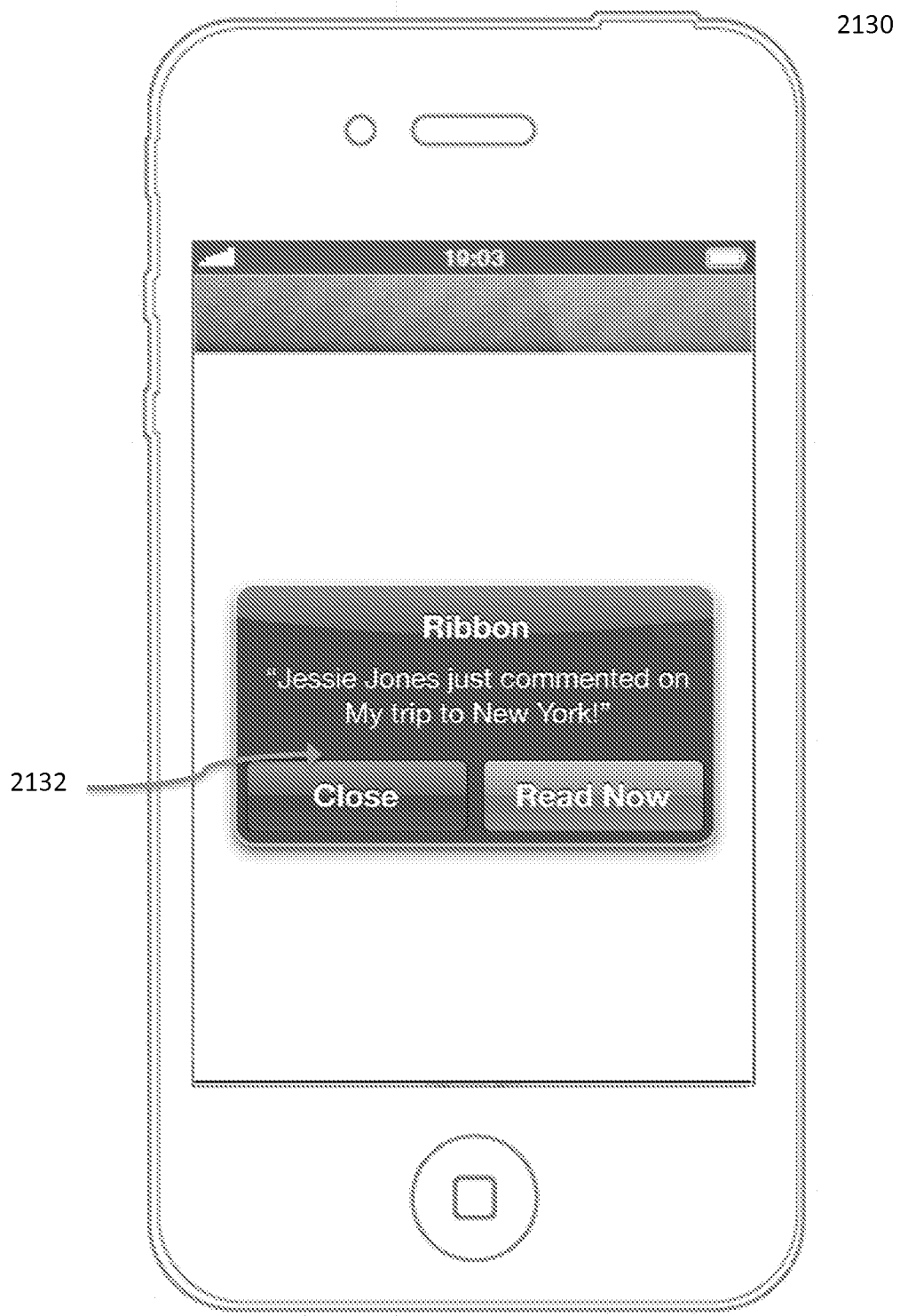
Figure 21E:
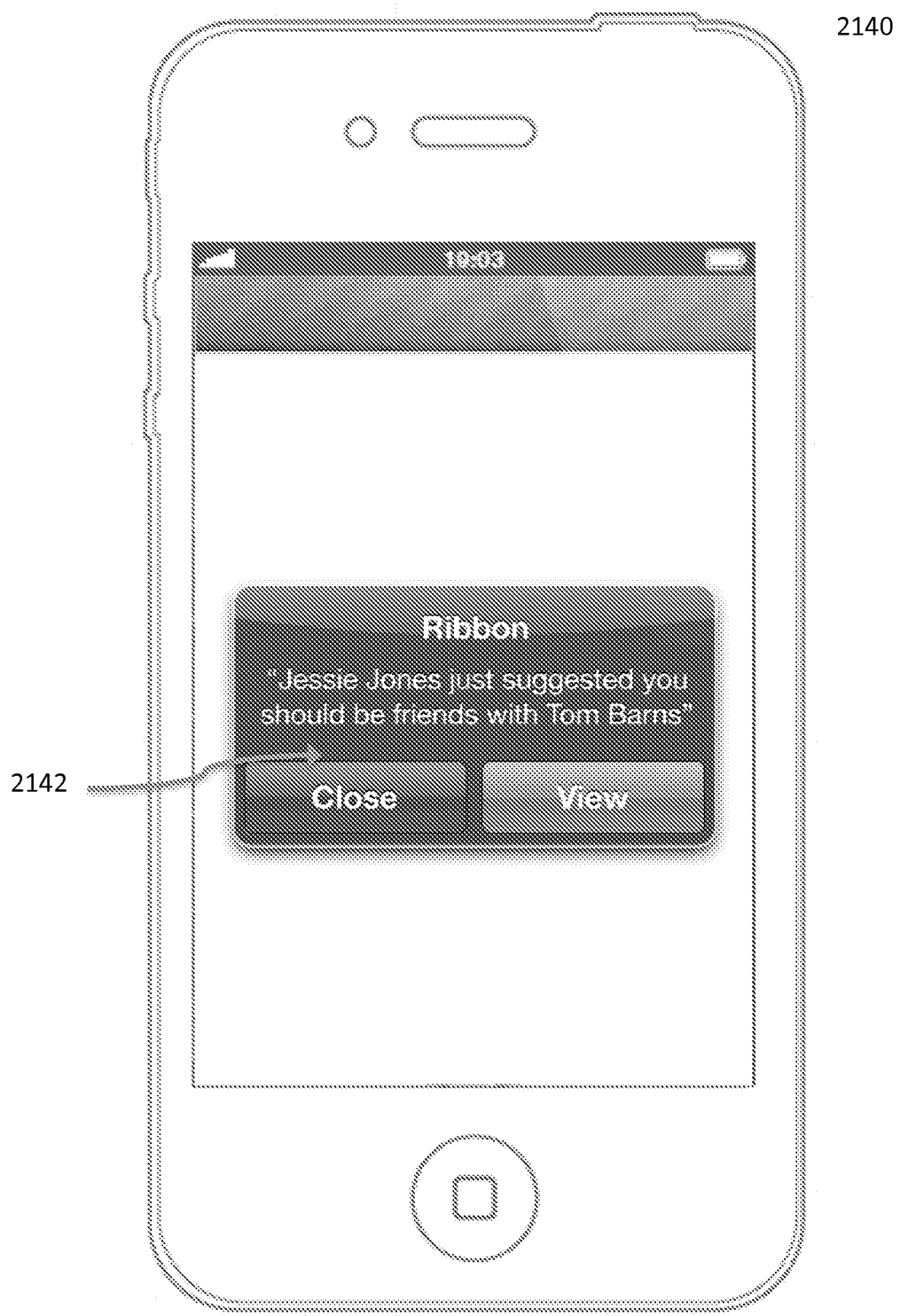

FIG. 21A shows display view 2100. Display view 2100 shows additional messages in the feed, including suggestion messages 2102 or event information and graphics 2104. Location sharing manager 216 may be used to coordinate or filter messages and generate a combined feed.

Suggestion messages 2102 may be used to suggest the user to meet another user that may not be digitally connected to the user through future location system 200. Such a suggestion may be received from a friend of the user (e.g., "Gemma Atkinson" in suggestion 2102). Also, in another example, consider that Bob is visiting New York in December. Another friend Chris, based in St. Louis, is visiting New York. Both Bob and Chris are separately connected to Leila. In other words, Leila is a connection between Bob and Chris. However, Bob and Chris do not know each other or may not be, for example, connected on one or more social networks. In this scenario, Leila can use future location system 200 to suggest they meet or suggest they become "Ribbon" friends.

In one embodiment, the feed can be used to foster new friendships. For example, suppose Jason Snyder and Linda Thompson are both friends with James Earl (James Earl is the mutual friend who added a NYC Reunion). Therefore, any of James Earl's friends can comment to this Trip within the Feed. Users commenting to James Earl's trip may or may not be friends. Jason Snyder may view Linda's comment and may wish to be friends with Linda and will send a friend request. Further, James can notice that Linda and Jason are not currently friends and can suggest they become friends.

Feeds may be searched or filtered based on topics, trips, or other criteria. Feeds may be gathered based on friends specific to or related to geographical locations. Areas surrounding or near to the geographical locations may be considered. Feeds may be formed based on ongoing or upcoming trips. Feeds may be formed based on groups.

Events may provide reasons for feeds. Each event or set of events may contribute to a feed. Events can have their own feeds and these feeds may be joined in the feed scroll of display view 2000.

Location display manager 204 may work with trip and event manager 206 to display the feed scroll on user device 110 and friend devices 130-134. In some aspects, the feed may dynamically change based on what future dates are selected or are being selected.

FIG. 21B-21E illustrate example display views 2110-2140 respectively. Display views 2110-2140 illustrate example friend notifications.

Notification 2112 in display view 2110 notifies a user that one or the user's friends ("Jessie Jones") has created a trip to the user's home base of New York. Jessie Jones may have created a new trip with trip details and once the trip is added, the feed of his friends is populated to include this information. Notification 2112 is sent to the user's friends. In this example, notification 2112 is sent to Jessie Jones' friends.

Notification 2122 in display view 2120 provides a notification confirming that the user's friend has confirmed that the friend ("Jessie Jones") is in a same location as the user at a future date.

Notification 2132 in display view 2130 provides notification that the user's friend has commented on a trip ("My Trip to New York") created previously by the user. Notification 2142 in display view 2140 provides notification that the user's has received a suggestion from the user's friend to be a friend with another user ("Tom Barns"). In this way, future location system 200 can provide instant notifications to a user whenever one or more events occur.

In an embodiment, system 100 may be used as a platform to integrate other social media platforms, applications and tools. Other applications or platforms may be allowed access, upon an allowing action by a user, to user-names, future dates and what locations or big cities are associated with future dates for a user. Targeted products and services may be developed based on future location information and locations associated with established big cities. It is to be appreciated that the embodiments discussed herein are not limited to big cities and can be utilized with any other types or categories of cities.

In a non-limiting embodiment, a third party application could have a button (e.g., a "Ribbon" button) that a user selects to simultaneously allow future location system 200 and any other social application, such as Facebook®, that may have associated friend network information for the user so that a user can quickly share his or her future location information and develop friend future location information for his or her friends. The third party application can then use such information to offer products or services corresponding to future locations, events and trips.

In this way, by maintaining one future location calendar using the presently disclosed embodiments, multiple parties and applications can utilize information from the future location calendar to provide opportunities for a user to maximize the user's enjoyment of a future trip or event.

Figure 22:
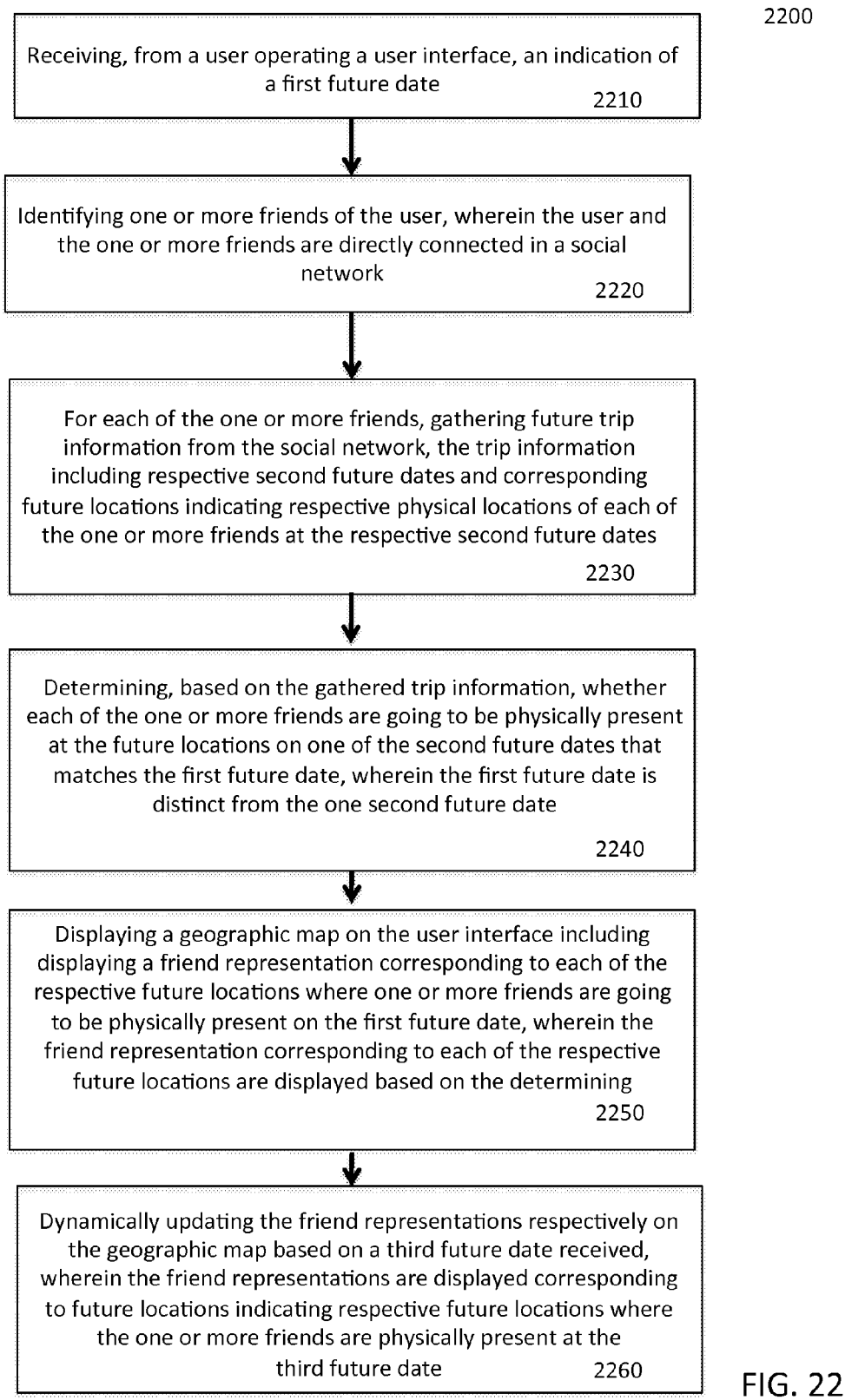
FIG. 22 illustrates a flowchart of an example process for communicating future location information.

FIG. 22 illustrates a flowchart of an example process 2200 for sharing future location information. The process may be implemented by future location system 200 or management system 210.

At stage 2210, an indication of a first future date is received. The indication of the first future date can be received through date selection controls on a user interface. The first future date may be a date of a planned trip.

At stage 2220, one or more friends of the user, who are directly connected to the user in a social network are identified. As an example, future location system 200 may review or parse social network data to identify direct connections between the user and the one or more friends.

At stage 2230, for each of the one or more friends, future trip information is gathered from the social network. The gathered trip information can include respective second future dates and corresponding future locations indicating respective physical locations of each of the one or more friends at the respective second future dates. The future dates can include a date range. As an example, future trip information can be based on future trip information submitted by friends on mobile devices, tablets or laptops. Such information may also have been submitted on desktops, set top boxes or other computing devices.

At stage 2240, based on the gathered trip information, it is determined whether each of the one or more friends are going to be physically present at the future locations on one of the second future dates that matches the first future date. The first future date is distinct from the one second future date. The determination may even involve requesting or obtaining information pertaining to future locations for those identified as "friends" of the user. This determination may involve analyzing or matching identified friend future location information based on a future date. The group matched or filtered may be limited to a targeted date range surrounding the future date. Friend locations may be determined for display. Event information may also be used to determine friend locations to display. For example, friend locations in or near an event on a future date, such as a festival, conference or concert, may be considered in determining friend locations. Stage 2240 can be performed by location determiner 202. In most cases, friend future location information may be stored at user device 110 or at any other network location. It may be cached or stored in a simple form such as in an array. Periodic or asynchronous updates may be performed. Location information manager 214 may assist these stages.

At stage 2250, a geographic map is displayed on the user interface including displaying a friend representation corresponding to each of the respective future locations where one or more friends are going to be physically present on the first future date. The friend representations corresponding to each of the respective future locations are displayed based on the determining. As a non-limiting example, a friend representation is displayed on or pointing to each of one or more geographical location representations. Friend representations indicate friend location information. This information may include how many friends are local and how many friends are visiting on the date or within a date range that includes the first future date. It may also indicate how many friends are attending an event at the location or joining a shared trip to the location. In some cases, a geographic map may be displayed in an explore view, such as explore view 300. Location determiner 202 may only identify information for friends at geographical locations within the map of display view 300. There may be a great amount of information associated with a friend and, in a non-limiting example, location determiner 202 may only identify the information that is relevant to future locations. Friends not having information related to the geographical area may be filtered out or not selected. An appropriate, geographic map can be selected by location determiner 202 based on friend locations on the future date. Future event information may be considered when selecting locations to display or how much of a surrounding geographical area to display.

At stage 2260, the friend representations are respectively dynamically updated on the geographic map based on a third future date received, where the friend representations are displayed corresponding to future locations indicating respective future locations where the one or more friends are physically present at the third future date. In this way, for example, as the future date changes, friend representations and corresponding information will dynamically change to be accurate for each date that is selected.

FIG. 23 illustrates a flowchart illustrating an example process 2300 for operating ribbon 304. For example, ribbon 304 is used to explore future location information. The process may be implemented by with future location system 200 and/or management system 210.

At stage 2310, a first slide position on a timeline circle is received. The timeline circle may surround a date display, such as ribbon 304 around date display 306. The slide position may indicate a first date.

At stage 2320, geographical location representations, such as major cities, are displayed. Information associated with the location and first future date may be displayed.

At stage 2330, a user may slide from the first position to a second position. There may be one or more dates between the first date and a second date indicated by the second position. For example, display view 300 shows Feb. 26, 2012 while display view 400 shows February 28. The user, in sliding from February 26 to February 28, will pass February 27. Any geographical location representations associated with February 27 will be displayed, along with any friend location information, pins, event or trip information for that date. It will be displayed only briefly en route to February 28. However, this may provide enough of a glance for the user to make a decision based on the future dates.

When arriving at the second slide position, for instance February 28, geographical location representations and corresponding information will be displayed until the user slides to a different position or navigates away from the display. This is shown by stage 2340. Stages 2310-2340 may be performed with future location system 200. Management system 210 may also provide assistance in some implementations.

FIG. 24 illustrates a flowchart of an example process 2400 for enabling a user to operate friendar 602/606 or friendar 702. The process may be implemented by with future location system 200 and/or management system 210.

At stage 2410, a friend representation is selected. An example friend representation is shown as pin 308 in display view 300. At stage 2420, the pin is expanded into one or more concentric circles with images and/or friend information. Display view 600 illustrates this expansion. At least two concentric rings appear. The concentric rings indicate friends visiting the location on the future date and friends that consider the location home. These displays take place at stages 2420 and 2430. Display view 700 shows images and information about friends attending an event or trip associated with the pinned location. Stages 2410-2430 may be performed with future location system 200. Management system 210 provides assistance in some implementations.

FIG. 25 illustrates a flowchart illustrating an example process 2500 for providing a message feed for an event or trip. The process may be implemented by with future location system 200 and/or management system 210.

At stage 2510, a first message related to a trip or event is received. The message may be sent from a friend. The friend may be associated with the trip or event. The user or the friend may have created the trip or pointed out an event. Others may have joined.

At stage 2520, a second message is received, either from the same friend or from another friend. It is also related to the trip or event. At stage 2530, the first and second messages are filtered and/or combined into a feed view specific to the trip or event. That is, only friends who have joined or can join the trip or event can view the feed. Comments and graphics associated with a trip or event can be inserted into the feed. Stages 2510-2530 may be performed with future location system 200.

Management system 210 provides assistance in some implementations. In some cases, location sharing manager 216 collects and filters feed information into one feed scroll. The single feed scroll is then provided to user device 110 and friend devices 130-134 simultaneously. Each scroll may be adjusted or customized based on which user or friend is associated with a device. For example, friends attending an event will receive more event posts. Others invited to an event may receive promotional event material.

Figure 26:
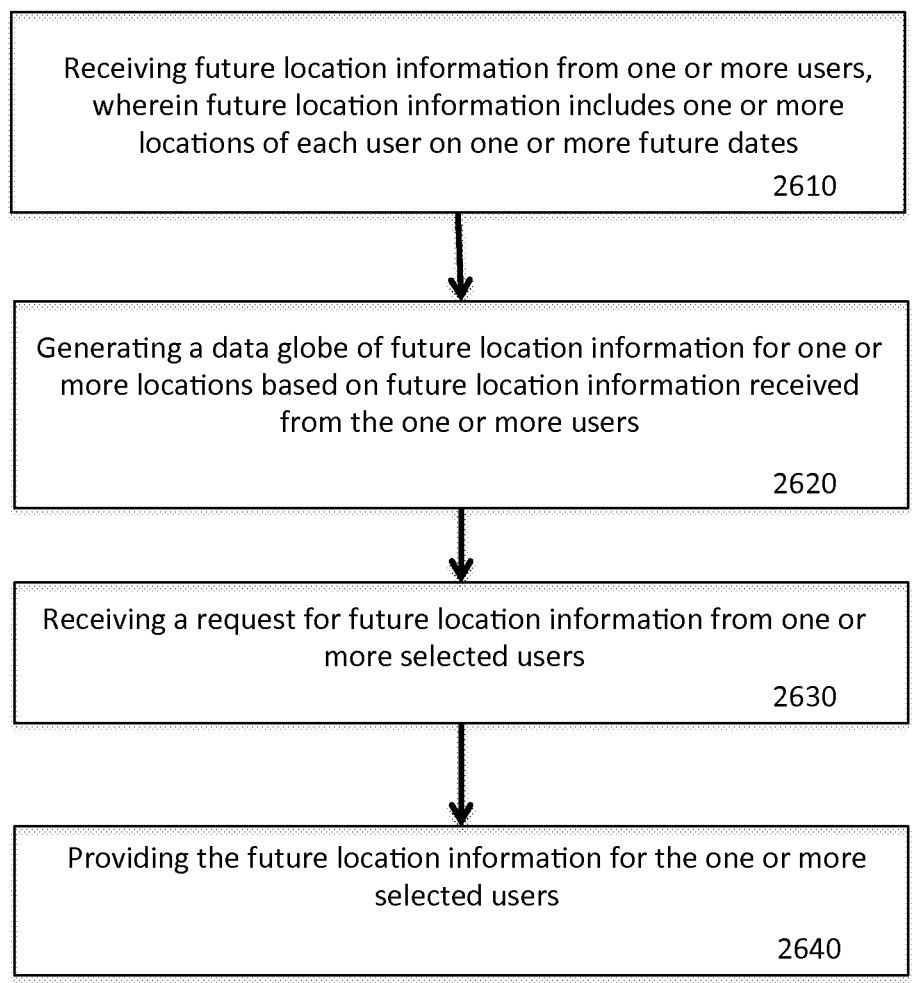
FIG. 26 illustrates a flowchart of an example process for providing future location information.

FIG. 26 illustrates a flowchart of an example process 2600 for providing future location information. The process may be implemented by with future location system 200 and/or management system 210.

At stage 2610, future location information is received from application users. The users are signed up for or associated with an application for sharing future location information. The application may be administered by management system 210 and coordinate with future location system 200 on individual devices. Users provide a home base location and any trips away from home.

At stage 2620, a data globe of future location information is generated. The globe corresponds to a GIS map and records the offered future locations of users on specific dates in the future. This information can be used to generate displays of geographical location representations, either in a city view (display view 300) or in a globe view (display view 1900), on computing devices 110 of the user or devices 103-134 of his or her friends.

At stage 2630, a request for future location information is received from a device of a user. The future location information that is requested may be information specific to certain users selected by the user. The information may also be specific to a future date range.

At stage 2640, future location information of the selected users is provided to the user device in response to the request. Future location information is provided only for users considered to be friends of the requesting user. Also, privacy settings may exclude non-friends or specified friends. Management system 210 manages the information that can be provided to each user. Management system 210 coordinates with permission manager 208. System 210 can also provide the functionality of permission manager 208.

In some cases, a friend future location map be can be generated at user device 110 by system 200. The globe may be generated based on received information in real time. This may be applicable for cases where the globe is customized to a user or friend so that only relevant or selected data is shown in a map.

Figure 27:
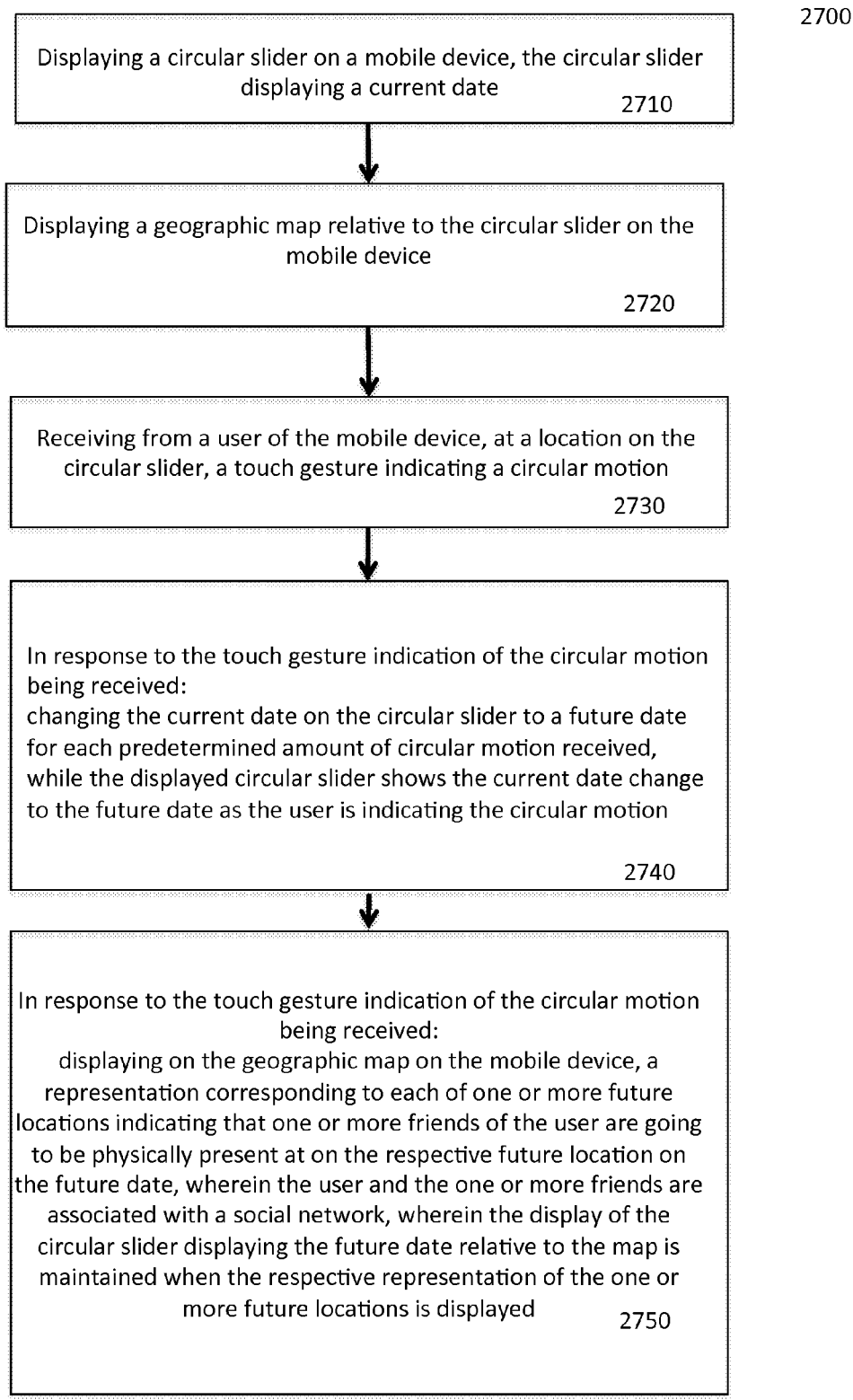
FIG. 27 illustrates a flowchart illustrating an example process of actions associated with a circular slider.

FIG. 27 illustrates a flowchart illustrating an example process 2700 of actions associated with a circular slider. The process can be implemented by future location system 200 and/or management system 210.

At stage 2710, a circular slider is displayed on a mobile device. The circular slider can include a round shape display and an outer portion that a user can use a touch gesture to rotate to the right or to the left. In one implementation, any portion of the circular slider can be touched and rotated to the left or the right. The circular slider can display a current date. For example, the circular slider can display Aug. 2, 2012 if it is the current date, or any abbreviation of the current date.

At stage 2720, a geographic map can be displayed relative to the circular slider on the mobile device. For example, the geographic map may be displayed behind the circular slider, or the circular slider may be displayed on a portion of the geographic map. In one implementation, the circular slider and the map can be displayed simultaneously on the mobile device.

At stage 2730, a touch gesture indicating a circular motion is received from a user of the mobile device, at a location on the circular slider. The user can touch any part of the circular slider and move his finger in a circular motion on the circular slider.

At stage 2740, in response to the touch gesture indication of the circular motion being received, current date on the circular slider is changed to a future date for each predetermined amount of circular motion received. The displayed circular slider shows the current date change to the future date as the user is performing the circular motion.

Moving the circular slider in a clockwise motion moves the current date to a future date. Moving the circular slider in a counterclockwise motion moves the current date to a previous date. A predetermined amount of movement can be determined to increase or decrease the date by one day. For example, a 1 cm circular clockwise motion can be correlated to moving the current date to one day in the future.

At stage 2750, in response to the touch gesture indication of the circular motion being received a geographic map is displayed on the mobile device. A representation corresponding to each of one or more future locations indicating that one or more friends of the user are going to be physically present at on the respective future location located on the future date is also displayed on the map. The representation, or friend representation, may be a pushpin image or any other image.

The representation can show a number of friends that live or consider home base at that location on the future date, a number of friends that are visiting the future location on the future date, or a number of events that are occurring at the future location on the map on the future date including the number of friends and related friend information for those attending such events. In one embodiment, the representation or friend representation can include a sum total of all three of these.

To determine the number to display on the representation, trip information as well as location information for one or more friends can be analyzed. The trip information can indicate a date or a date range that each friend is going to be physically present at the respective location. The future date on the circular slider can be received and compared against the date or date ranges associated with the trip information to determine which friends will be at the respective location corresponding to the representation on the future date selected on the circular slider. As long as one date of the trip information overlaps with the future date, the friend is associated with that location on the date of overlap.

In an embodiment, the representation or friend representation may include an image of a person (or friend) that is associated with a location corresponding to the friend representation and presented by the friend representation. In an embodiment, the image included in the friend representation may dynamically update based on the location of the friend representation relative to a geographic map or based on any other parameter. In an embodiment, the friend representation may be any other representation or marker that includes a dynamic content area surrounded by a static border. The dynamic content area may include, for example, an image of a person (or friend) that is associated with a location represented by the marker. In an embodiment, when a user selects a friend representation that may display the image of a friend, future location system 200 provides a display of the friends profile with future location system 200 and may also display profiles of the friend at other third party social networks. Contact details of the friend can also be displayed along with any other information or parameter that may be associated with the friend.

The user and the one or more friends can be associated with a social network. The display of the circular slider displaying the future date relative to the map is maintained when the respective representation of the one or more future locations is displayed.

In one embodiment, the representation can dynamically change to indicate respective future locations on the map at which one or more friends will be physically present, for each touch gesture indication of the circular motion being received from the circular slider. Therefore each time the circular slider is moved clockwise or counterclockwise, the representations or friend representations can change on the map to indicate the locations at which users will be physically present. A user continuously using a touch gesture to move the circular slider to the right thereby increasing the date from the current date will see as the slider shows a new date, the corresponding locations on the map at which his friends will be physically present.

In one embodiment, on the web, a user can engage with time by moving a slider (or horizontal or vertical or other ruler or linear design). The slider can be moved forward or backward, or up or down, to move time forward and/or backwards.

In one embodiment, an indication of a selection of a representation of a respective future location can be received. Fore example, a user can select one of the representations, for example one of the friend representations or pushpins on the map. In response to receiving the indication of the selection, a list can be displayed. The list can correspond to the representation. The list can show the one or more friends that live at location on the future date, one or more friends that are visiting the location on the future date, or one or more events occurring at the location on the future date.

Figure 28:
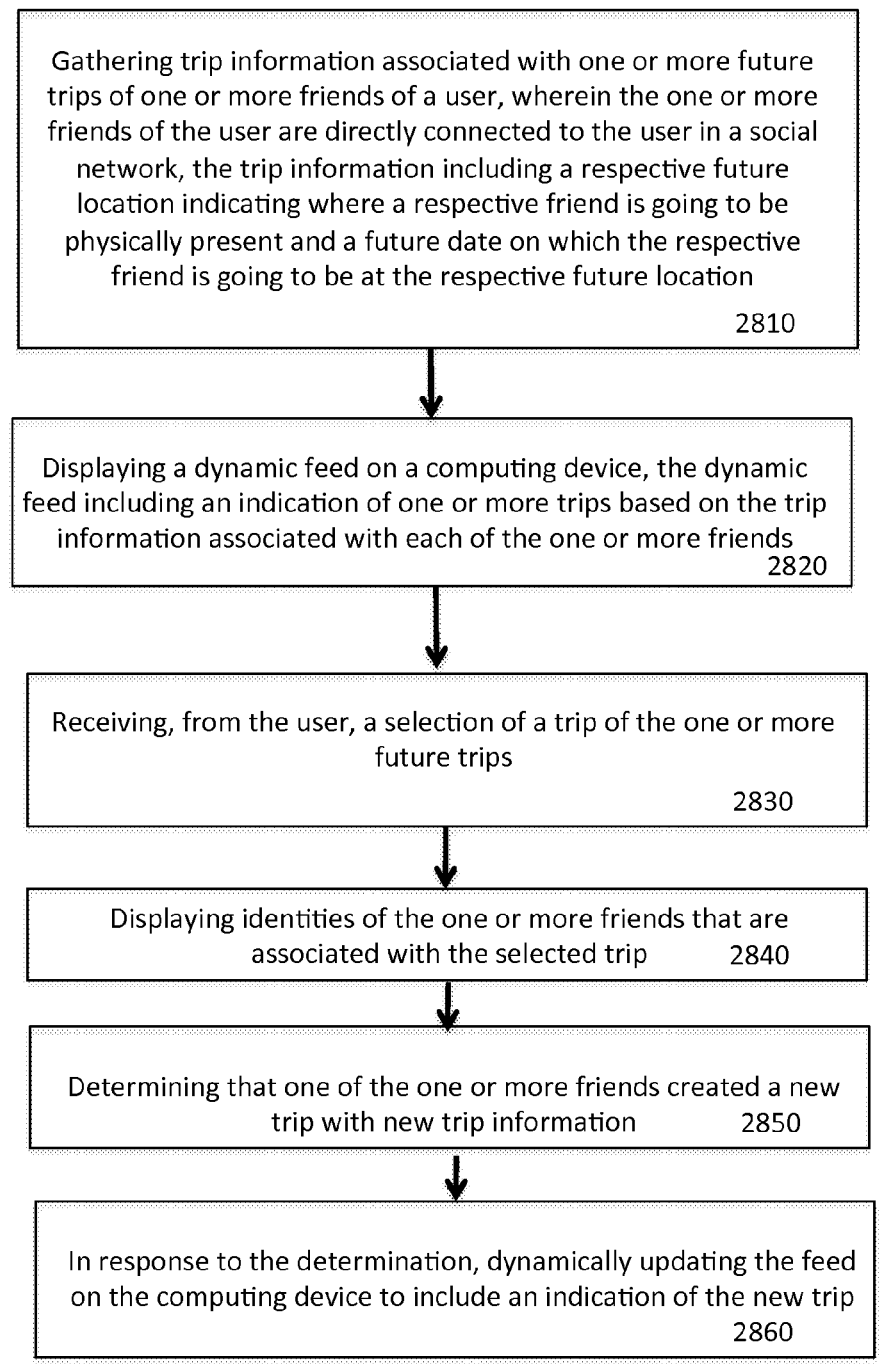
FIG. 28 illustrates a flowchart of an example process for sharing future location information.

FIG. 28 illustrates a flowchart of an example process 2800 for sharing future location information. The process can be implemented by future location system 200 and/or management system 210.

At stage 2810, trip information associated with one or more future trips of one or more friends of a user are gathered. The one or more friends of the user can be directly connected to the user in a social network. The trip information can include a future location where a friend is going to be physically present as well as a future date or date range where the friend is going to be physically present.

In one implementation, each friend can provide the trip information. For example, each friend can create a new trip and indicate the location and dates associated with that trip.

In another implementation, the trip information can be gathered from the friend's emails or other social networks.

At stage 2820, a dynamic feed is displayed on a computing device. The dynamic feed can include a list of all the trips of the friends of the user. The feed can include the trips in chronological order, with the most recent trip at the top.

At stage 2830, a selection of a trip of the one or more future trips is received. The user can select one of the trips that his friend has created. In one implementation, the user can indicate to join the selected trip. Upon receipt of the indication, the list including the one or more friends that are associated with the selected trip is updated to also include the user.

At stage 2840, identities of the one or more friends that are associated with the selected trip are displayed. The identities can include names of the friends. In one implementation, an indication can be presented next to each identify of the friends that displays whether or not the user is connected to that person in a social network.

At stage 2850, a determination is made that one of the one or more friends created a new trip with new trip information. For example, one of the user's friends may have just indicated that they are going to be attending an event in another city.

At stage 2860, in response to the determination, the feed is dynamically updated on the computing device to include an indication of the new trip. Once the friend indicates this by either creating a new trip or by joining an existing trip the current' user's feed is updated to include this information.

In one implementation, when a user has indicated where he will be physically present on future dates. For example, by creating a number of trips, his physical presence in the future is known. When trip information is received from one of the friends of the user, and it is determined that at least one of the dates of the friend's trip is the same as one of the dates of the current user's new trip, a location match is identified and a notification(s) is sent to the user letting the user know that his friend is also going to be in the same city or location or event as the user on the future date.

Figure 29A:
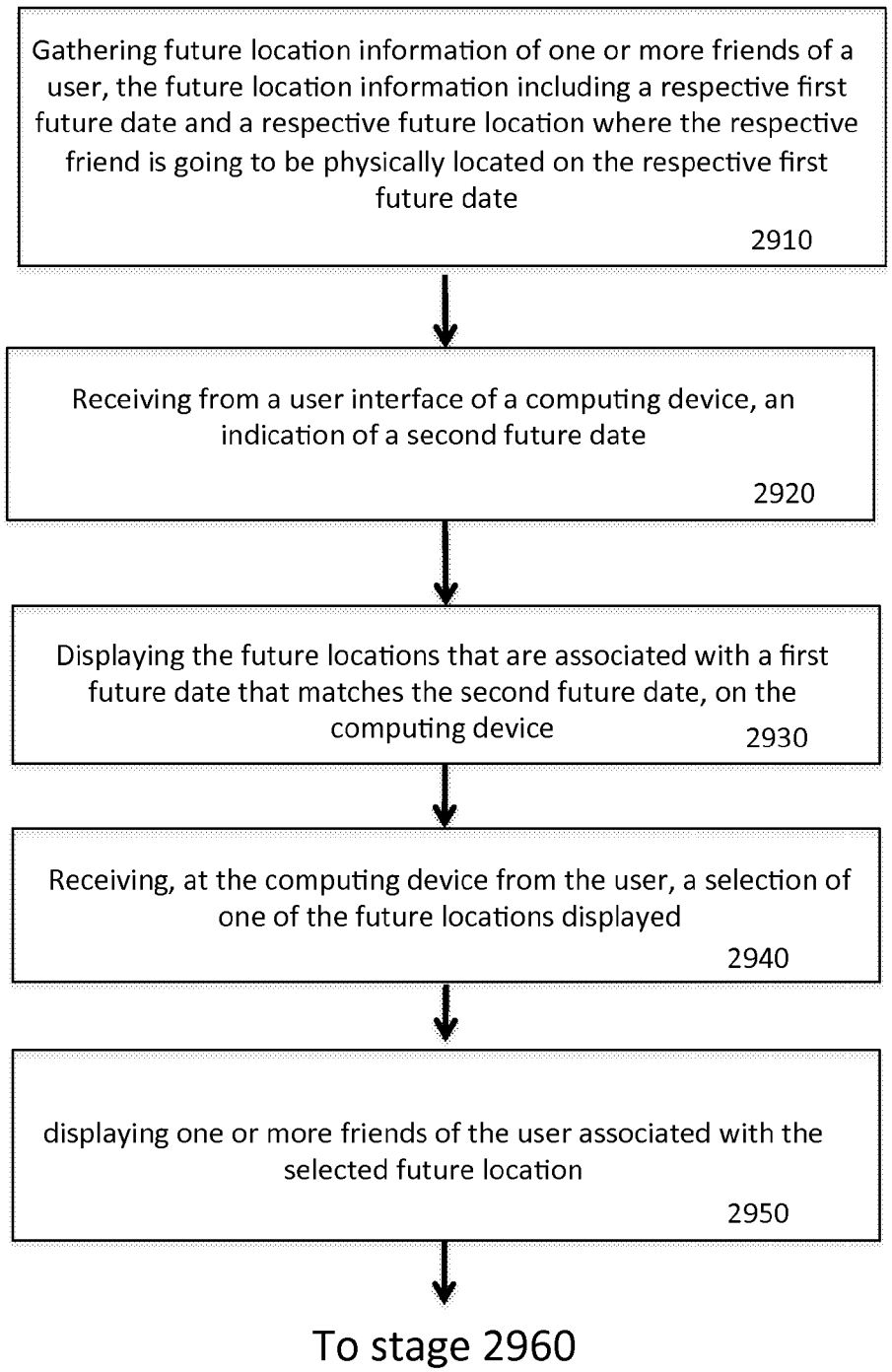
FIGS. 29A and 29B are flowcharts illustrating an example process for providing suggestions based on future location information.
Figure 29B:
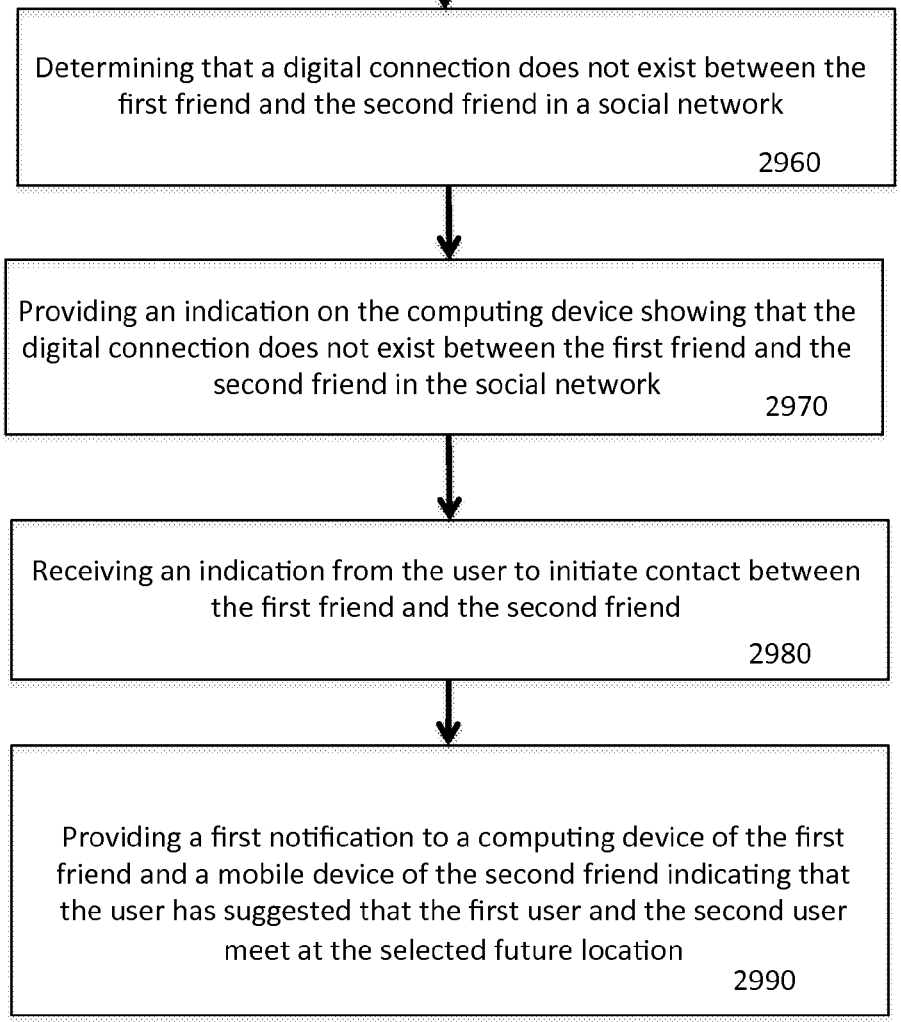

FIGS. 29A and 29B are flowcharts of an example process 2900 for providing suggestions based on future location information. FIG. 29B is a continuation of process 2900 beginning in FIG. 29A. Process 2900 can be implemented by future location system 200 and/or management system 210.

At stage 2910, future location information of one or more friends of a user is gathered. The future location information includes a respective first future date and a respective future location where the respective friend is going to be physically located on the respective first future date. As an example, the future location information may be gathered based on future trip information. Future trip information may be retrieved from one or more social networks. Future location information may also be directly provided by respective friends.

Figure 4:
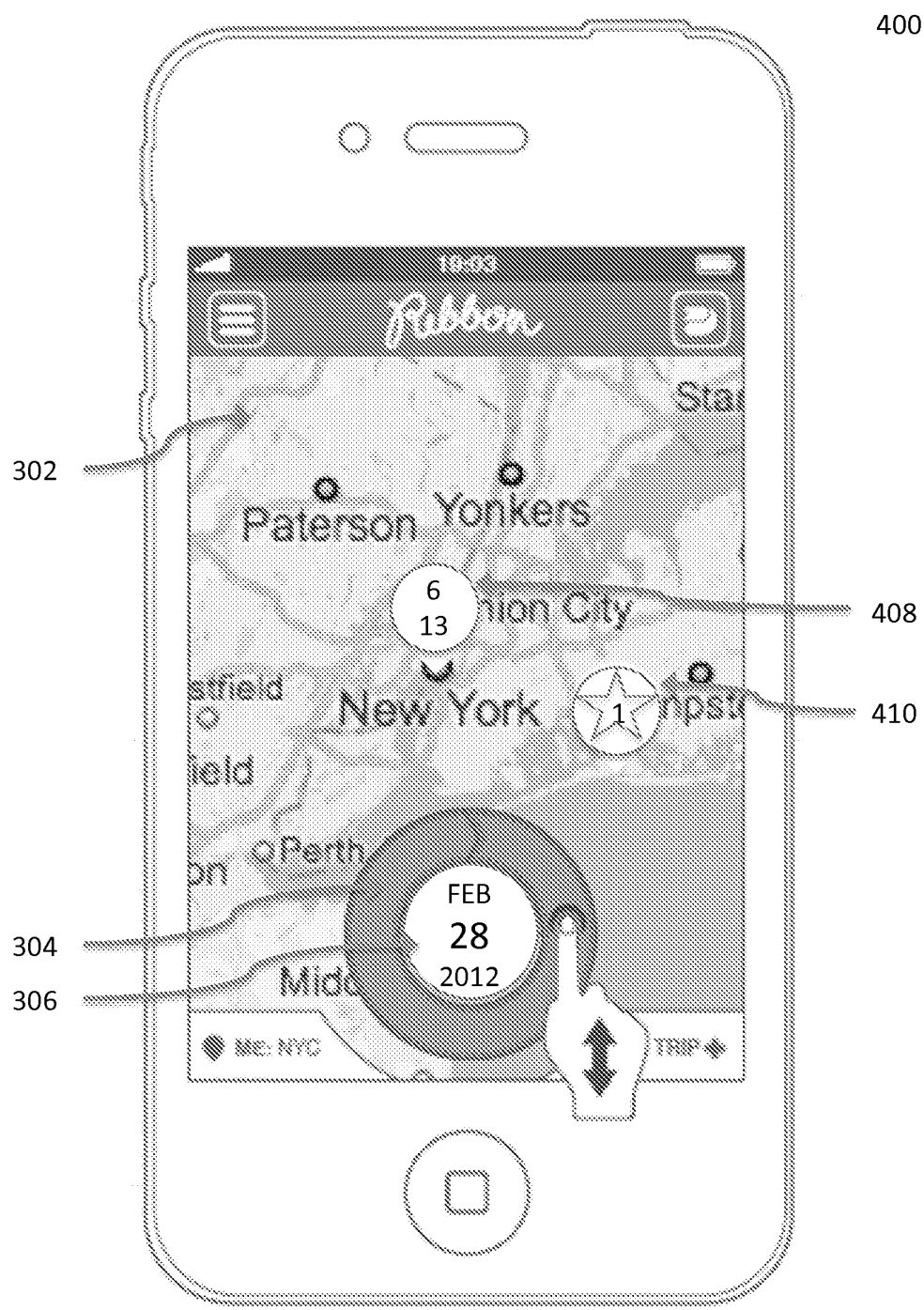
FIG. 4 illustrates another display view communicating future location information.

At stage 2920, an indication of a second future date is received from a computing device. As an example, and with reference to FIG. 4, different future dates are selected by sliding a finger around a circular ribbon 304. The date in date display 306 will change as the finger slides around date display 306 on ribbon 304. One direction will go forward in time, while the other direction will go backward in time. For example, a clockwise slide on the ribbon will cause the date in date display 306 to advance to Feb. 28, 2012, as partially shown in the transition from display view 300 to display view 400. In a non-limiting embodiment, when a sliding gesture is performed along ribbon 304, location determiner 202 utilizes the date selected in date display 306 as a future date. Location determiner 202 determines locations for display based on the future date and determines geographical locations to display based on the future date and friend future location information.

At stage 2930, future locations that are associated with a first future date that matches the second future date are displayed on the computing device. As an example, a representation corresponding to each of one or more future locations indicating that one or more friends of the user are going to be physically present at on the respective future location located on the future date is also displayed on the map. The representation may be a pushpin image or any other image. The representation can show a number of friends that live at location on the future date, a number of friends that are visiting the future location on the future date, or a number of events that are occurring at the future location on the map on the future date. In one embodiment the representation or friend representation can include a sum total of all three of these.

At stage 2940, a selection of one of the future locations displayed is received, at the computing device from the user. For example, a user may provide a touch gesture to select one or more displayed future locations on the computing device. In another embodiment, a mouse click can be used to select one of the future locations.

At stage 2950, one or more friends of the user associated with the selected future location are displayed. The friends can be displayed in a list.

At stage 2960, it is determined that a digital connection does not exist between the first friend and the second friend in a social network. The digital connections of each friend can be checked to determine if the two friends are connected.

At stage 2970, an indication on the computing device is provided showing that the digital connection does not exist between the first friend and the second friend in the social network. The list displayed may include an indication of the friends within the list that are already friends with each other. The list may also include an indication of the friends within the list that are not friends with each other.

At stage 2980, an indication is received from the user to initiate contact between the first friend and the second friend. The user can indicate that he wants the two friends to meet or to become friends.

At stage 2990, a first notification is provided to a computing device of the first friend and a computing device of the second friend indicating that the user has suggested that the first user and the second user meet at the selected future location. The first notification can indicate that the user, the mutual friend between the two users, has indicated that the first friend and the second friend should meet at the future location that is shared between them. The notification can also indicate in one embodiment that the first friend and the second friend should become friends in the social network.

Figure 30:
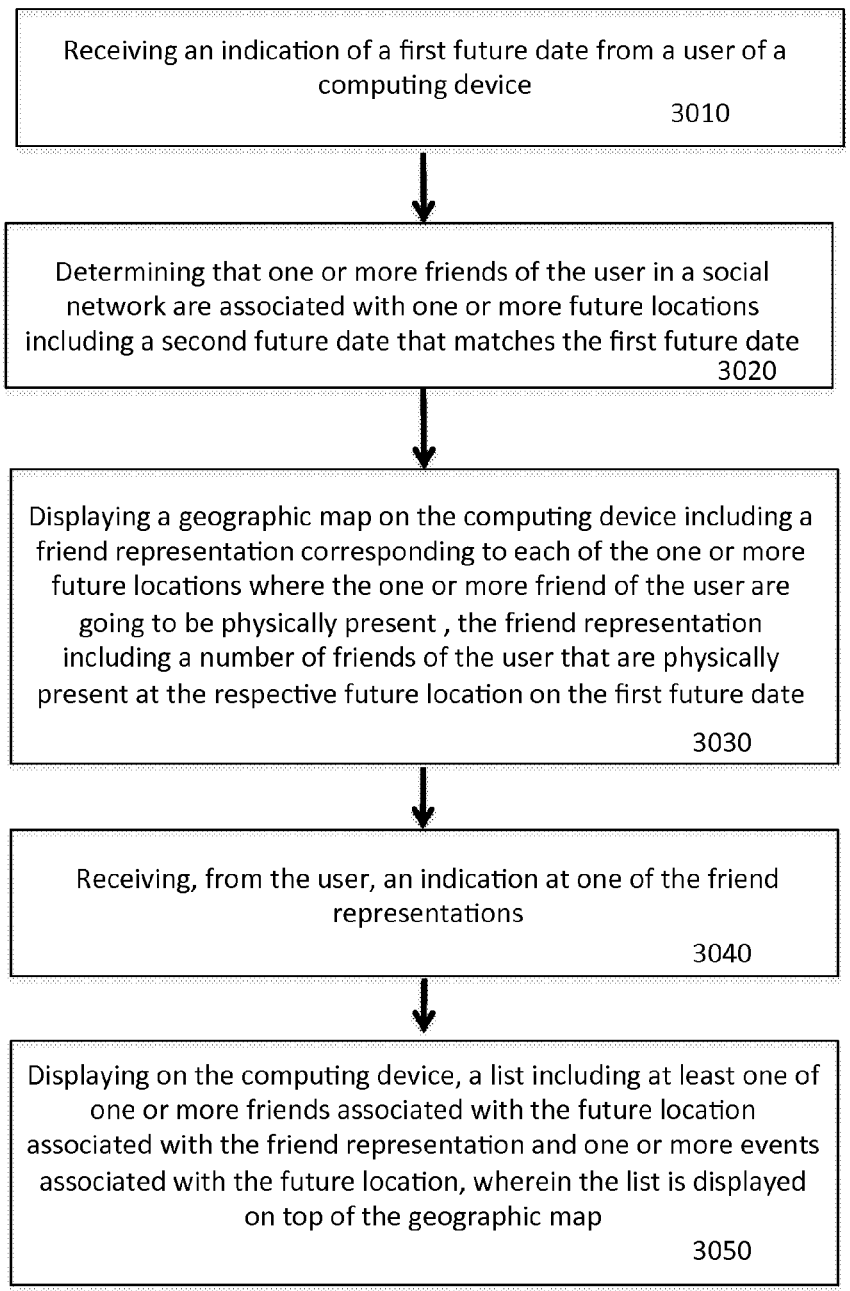
FIG. 30 illustrates a flowchart of an example process for graphical display of future location information.

FIG. 30 illustrates a flowchart of an example process 3000 for graphical display of future location information. Process 3000 can be implemented by future location system 200 and/or management system 210.

At stage 3010, an indication of a first future date is received from a user of a computing device. The user can input a future date into a display area on the computing device. In another embodiment, the user can use a timeline reel as descried above to select a future date. In another embodiment, on the web, a user can engage with time by moving a slider (or horizontal or vertical or other ruler or linear design). The slider can be moved forward or backward, or up or down, to move time forward and/or backwards.

At stage 3020, one or more friends of the user in a social network are determined that are associated with one or more future locations including a second future date that matches the first future date. A social network associated with the user can be identified and friends of the user in the social network can be identified. A determination can be made as to which of these friends are going to be physically present at the future location on a future date or date range.

At stage 3030, a geographic map is displayed on the computing device including a friend representation corresponding to each of the one or more future locations where the one or more friend of the user are going to be physically present. The friend representation can include a number of friends of the user that are physically present at the respective future location on the first future date. In one implementation, the friend representation can include an image of a friend, or an image corresponding to multiple friends that are physically present at the respective future location.

At stage 3040, an indication at one of the friend representations is received from the user. The user can select the friend representation by touching or selecting the friend representation, or by clicking on it with a mouse click.

At stage 3050, a list including at least one of one or more friends associated with the future location associated with the friend representation and one or more events associated with the future location is displayed on the computing device. When a user touches or clicks on the friend representation, the list can be displayed. The list can include a number of friends that are local or live at the future location, a number of friends visiting the future location, or a number of events occurring at the future location. The list can be split up so each group is displayed in its own column. The list can be displayed on top of the geographic map.

In one embodiment, the number on the friend representation can include a total number of friends associated with the corresponding future location. In one embodiment, the number can be a sum of the number of friends local and the number of friends visiting the location. For example if the representation shows "10" it can indicate that "5" people live at the location and "5" are visiting. The number can be inclusive of the number of friends attending an event. For example, if "3" of the "10" people are attending the event, and "2" of the "3" are visiting the event from another city, the number on the representation still displays "10." In one embodiment, clicking on the representation displaying the number will expand the display area relative to the representation and show a breakdown of the total number. For example, clicking on the representation displaying "10" will then show a breakdown of "5" friends local and "5" friends visiting the future location associated with the representation clicked on. This breakdown or total number represented within the representation can also include a number of events that are associated with the location.

In one embodiment, the list can display a list of names of friends of the user that are local to the future location in the dynamic content area associated with the one friend representation, a list of names of friends of the user that are visiting the future location in the dynamic content area associated with the one friend representation, and/or a list of names of events at the future location that one or more friends are attending corresponding to the future location in the dynamic content area associated with the one friend representation. Each list can be displayed in its own column or its own tap in the dynamic display area.

In one embodiment, clicking on a name in one of the lists displays a profile associated with the user. The profile can indicate specifics regarding the user for example, where they live, their future trips and dates associated with each future trip.

In one embodiment, clicking on the name of an event will display an event profile. The event profile can include a date or dates associated with the event as well as one or more people attending the event. If one of the people attending is a friend of the user, an indication can be displayed relative to each friend that indicates that the particular friend is a friend of the user.

In an embodiment, the functionality of future location system 200 and/or management system 210 may be provided through a browser on computing devices, such as user device 110. Management system 210 on server 120 may host the service and serve it to device 110 and any other computing devices. Any combination of implementations may provide, through a browser, the functionality represented by the example implementations of systems 200 and 210 shown in FIG. 2 and in the display views and flowcharts of FIGS. 3-33. Any stages shown in flowcharts 2200-2600 that involve displaying content may be considered to provide the content for display in a browser.

Figure 31:
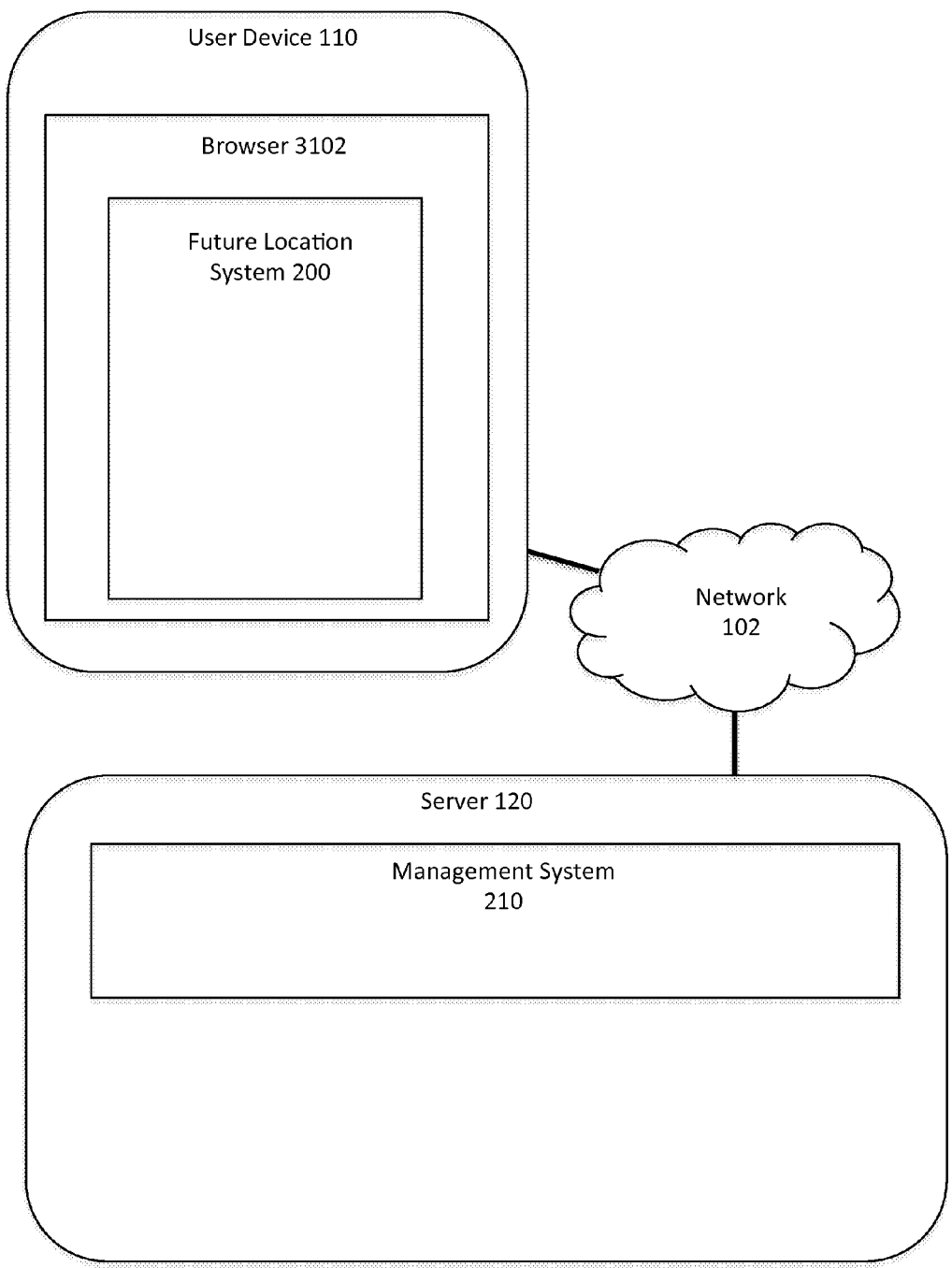
FIG. 31 illustrates an example user device including a browser.

For example, FIG. 31 shows user device 110 executing browser 3102. Browser 3102 may be any commonly used browser, including any multi-threaded or multi-process browser. In an embodiment, the functionality of future location system 200 can be provided through browser 3102.

Future dates are received or displayed in browser 3102. Friend future location information is shown using geographical representations through browser 3102.

Figure 32:
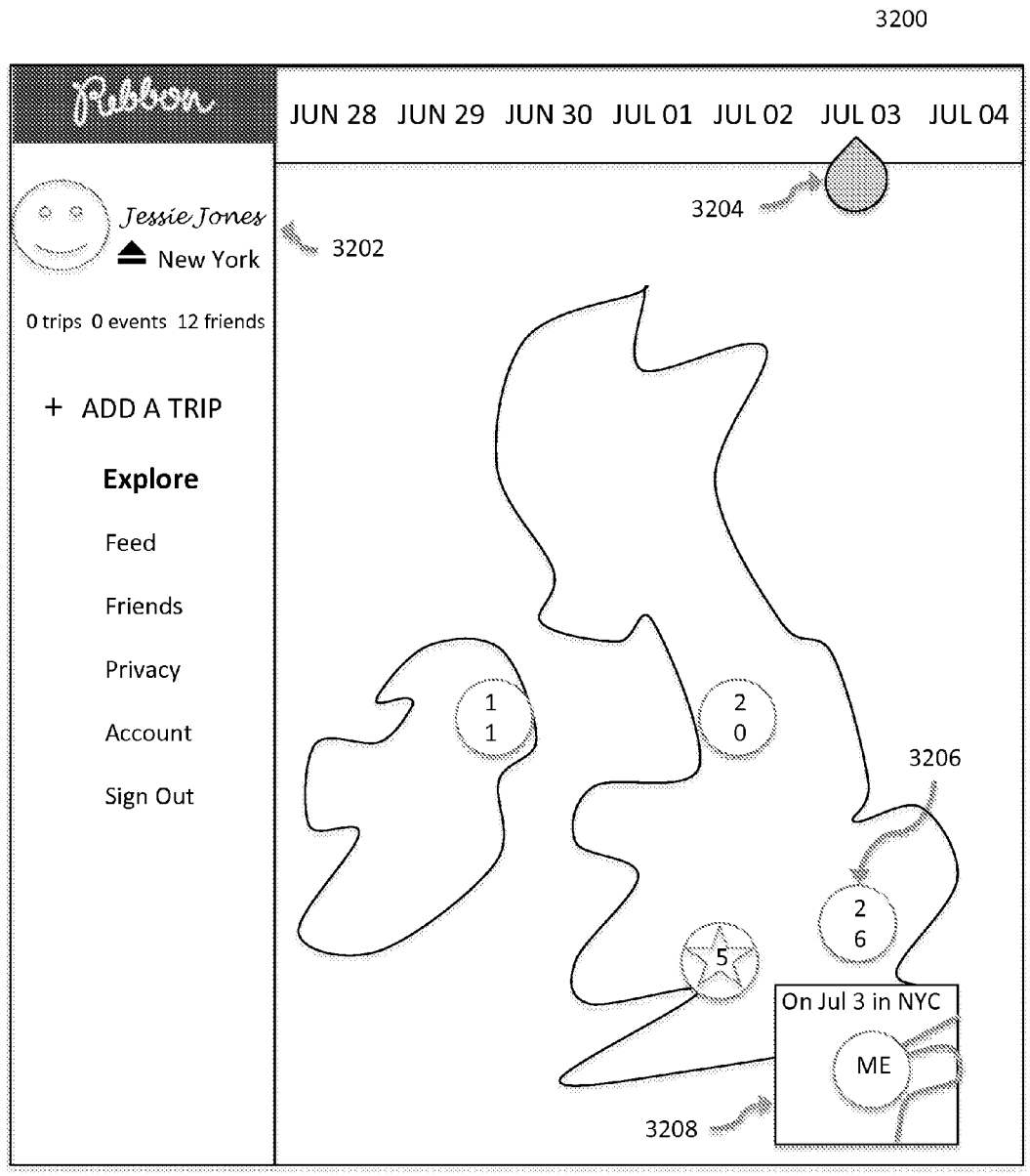
FIG. 32 illustrates an example display view including user information and menu items.

For example, FIG. 32 shows display view 3200. User information and menu items are displayed, as shown in menu bar 3202. A future date or date range is selected using any user interface tool for date selection, such as date slider 3204. Geographical representations of locations are shown in display view 3200. Pins with future friend location information, such as pin 3206, are shown at geographical representations. This information may be used to create or join a trip as described earlier.

In another implementation, the current location of the user is shown in box 3208 on the map. This may include a map of a geographical location of the user on the selected date. A pin may be shown, with or without future friend location information. Box 3208 may enable a user to find himself or herself on a particular date. This allows a user to explore future locations of friends while simultaneously showing the future location calendar of the user.

Browser view 3200 may show other information, such as feed information, friend information, future trip information and any other information illustrated in display views 300-2100. Menu bar 3202 may be used to show this information. Other menu or tool bars may be added to show this information. Trips may be searched, created, modified and joined.

Figure 33:
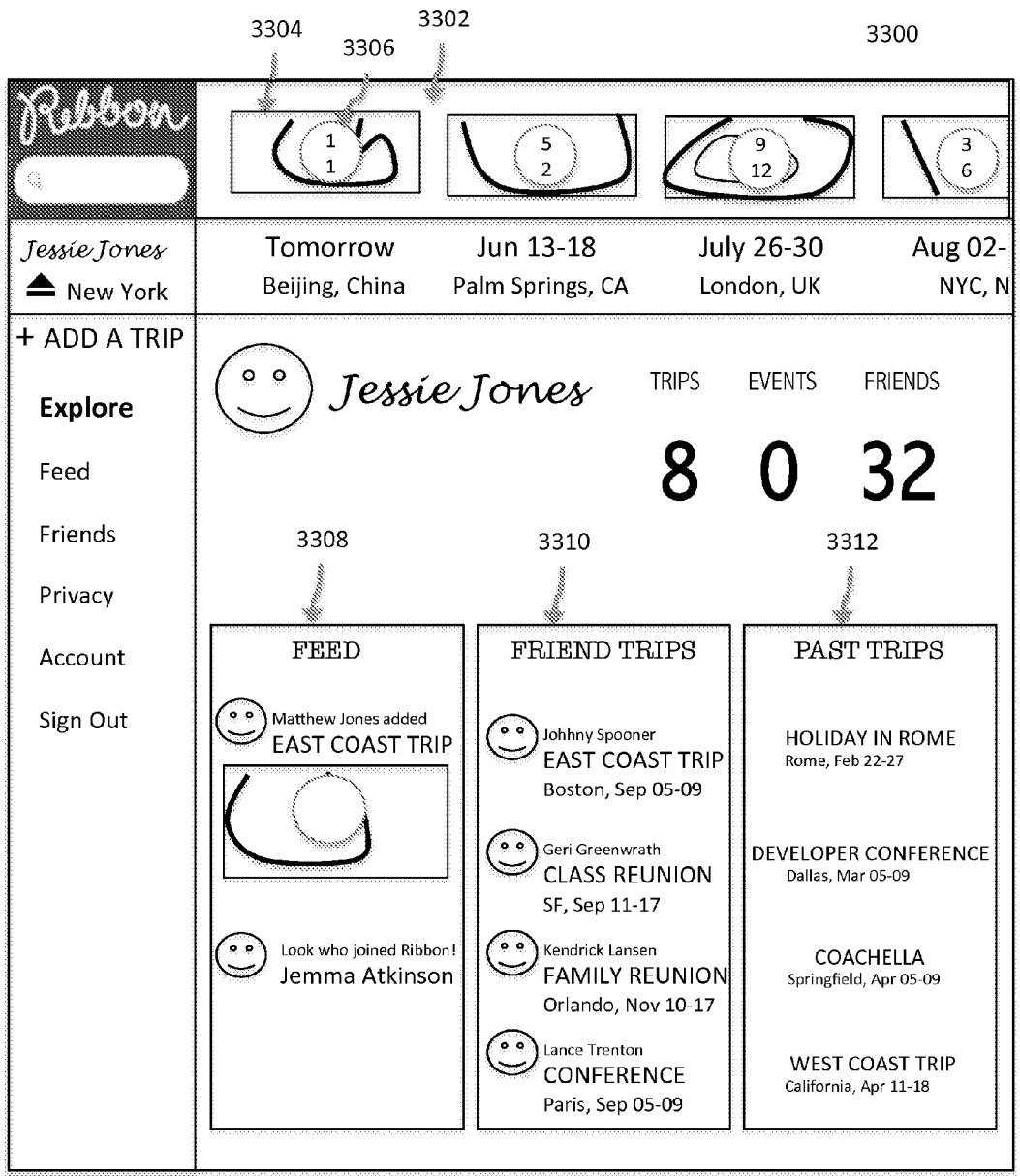
FIG. 33 illustrates an example user profile view.

FIG. 33 illustrates a user profile view 3300. This view collects various types of information such as feed view 3308, friend trip view 3310 and past trip view 3312. A future location calendar may be shown. For example, future location carousel 3302 shows future dates or future trips for the user. Each trip is described and a little map 3304 of the corresponding geographical location may be shown for each trip or date range. The maps 3304 of carousel 3302 may also show friend representations in appropriate geographical locations with real time friend future location information. Any updates to the information may be illustrated in carousel 3302.

The functionality of any of the components or flowcharts shown in FIGS. 1-33 may be provided through a browser executed on device 110, server 120 or any other computing device. The web pages or application provided through the browser may be served from server 120, device 110, or any other computing device. Different windows or views may be shown through browser 3102. Different permissions or filters may be established based on the identity or roles of the individual logging into a website view.

Implementations of the system provide a way for friends to communicate a future location status. Friends can plan trips and know where friends will be. Instead of having to call, email or text multiple friends about their future plans on a regular basis, friends can check the future location information of their friends and plan accordingly. Discussions can ensue based on proposed or planned attendance of a future trip or event.

In an embodiment, future location system 200 or server 120 utilizes a location based methodology (or algorithm) that organizes people and locations into areas whereby people can "reasonably" visit each other while in that same location. Extensive factors are included within an algorithm determining location groups, including, but not limited to, various weightings of population, geographical data such as metropolitan, rural, and city data; transportation infrastructure, community data, education data, social data, commerce data, airport presence, and political data. Such geographical location groupings may be known as "Big Cities." In an embodiment, future location system 200 creates such groupings of location commensurate with how future location system 200 groups people and friends.

As discussed above, future location system 200 enables people to share where they are going or plan to be in the future. Users can see where their friends are going, and users need not be present where their friends are located. For example, a user can see from a display of future location system 200 that the user's friend is New York. Based upon this knowledge, the user can suggest another friend of the user to the friend located in New York. The users friend in New York can then be "Ribbon" friends. As discussed herein, Ribbon users may refer to users who have signed up to use future location system 200 or have a user account with future location system 100. Similarly, Ribbon friends refer to Ribbon users who may be digitally connected to each other using future location system 200.

In an embodiment, future location system 200 enables users to block the ability to view a their future location on a case by case basis (e.g., friend by friend basis; or person to person basis). Furthermore, future location system 200 enables a user to block friends ability to see the user's future locations before those friends become socially connected to the user though future location system 200 (or become Ribbon users or "Ribbon Friends". In other words, for example, a user can preempt privacy by "blocking" other individuals immediately once the other individuals become Ribbon users. Furthermore, because a user signing into future location system 200 may usually sign up through third party sites such as Facebook®, future location system 200 can review the user's entire friend network on Facebook® and will organize all of these friends into respective locations on a user interface associated with future location system 200 based at least on locations of those friends. The user can preempt privacy by using the user interface to block, which friends the user wants to block. When those blocked friends eventually become Ribbon users, they are automatically blocked from seeing the users future locations because they have previously been blocked.

In an embodiment, future location system 200 may enable a user to denote or mark their location as a "big city." As discussed above, and in a non-limiting embodiment, various weightings of population, geographical data such as metropolitan, rural, and city data; transportation infrastructure, community data, education data, social data, commerce data, airport presence, and political data may be used to create geographical location groupings known as "big cities." In this way, by sharing their location as a big city, users need not share a more specific location such as a county, event or even address with other users. This improves user privacy.

In an embodiment, a "Follow" button can be created that retrieves location and future date information using future location system 200, when the Follow button is selected. Selection of the Follow button enables a user to better follow friends, artists, celebrities, politicians, brands, events, etc. For example, a celebrity may have a public "Ribbon page" that includes a Follow button. When a user selects the Follow button on the page, future location system 200 provides future connection information based on location connection matches in the future. By way of example, if a user is "Following" the Metallica page on Ribbon (e.g., at www.Ribbon.Me/Metallica), when that user and Metallica will both be in the same location (or big city) during the same date(s) or during dates that are reasonably distant from each other, the user will be notified (e.g., via Ribbon emails, the Ribbon Feed, etc) of such location match, near match, and interest.

System 100 including future location system 200 can act as a platform connecting people, brands, services, events, etc in both. time and place. Furthermore, third party applications, including, but not limited to, Groupon, Living Social, Kayak, Expedia, and others would be able to deliver their users deals, services, and information with knowledge of where their users, fans, and followers would be in the future based on information provided by future location system 200.

In an embodiment, future location system 200 and/or management system 210 can parse emails and other user communication upon user approval to scrape information relating to location, events, etc from user communication. In this way, future location system 200 can further suggest location matches, event matches, and other relevant action to users. In an embodiment, future location system 200 can be configured for integration with web or network crawlers. Future location system 200 can also be configured to scrape where a user is travelling and a date(s) on which the user is traveling. Future location system 200 may also be integrated with third party applications, including, but not limited to, Foursquare. Furthermore, future travel plans that are determined from scraping of a user content's (upon user approval) may be used to provide suggestions to the user to update their event and travel plans using future location system 200.

In one embodiment, user email or other communications is parsed for location data of where they will be or might be in the future. This can include alerting them to action such information such as suggesting they update their location within the Ribbon application accordingly.

In another embodiment, user email or communications is parsed for friend location data (where their friends may or will be in the future) and using this information to suggest to the user or their friends to update their Ribbon or other information.

In another embodiment, user communication can be parsed for information that is non-location information such as interests, etc. and suggesting the user or their friends update their Ribbon or other information accordingly.

In an embodiment, future location system 200 also enables simultaneous authorization at two or more sites. For example, when a user clicks on a "Ribbon" button in a third party application, future location system 200 may allow authorization (or an allow) with both future location system 200 (e.g., Ribbon application) and also with a third party application (e.g., Facebook), so that that at least two allow or authorizing actions occur with one click of the button. This greatly improves user experience.

System 200 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop, or any other user carried device), game console, set-top box, kiosk, embedded system or other device having at least one processor and memory. A computing device may include a communication port or I/O device for communicating over wired or wireless communication link(s).

Computing devices such as a monitor, all-in-one computer, smart phone, tablet computer, remote control, etc., may include a touch screen display that accepts user input via touching operations performed by a user's fingers or other instrument. For example purposes, a touch sensor grid may overlay the display area. The touch sensor grid contains many touch sensitive areas or cells that may be used to locate the area closest to the input of a user's touch.

Example touch operations using a touch screen display may include (but are not limited to) pinching, finger (or other stylus or object) touches, finger releases, and finger slides. Finger slides may be circular or any other shape, direction or pattern. The touch screen display may include a screen or monitor that may render text and/or images.

Figure 34:
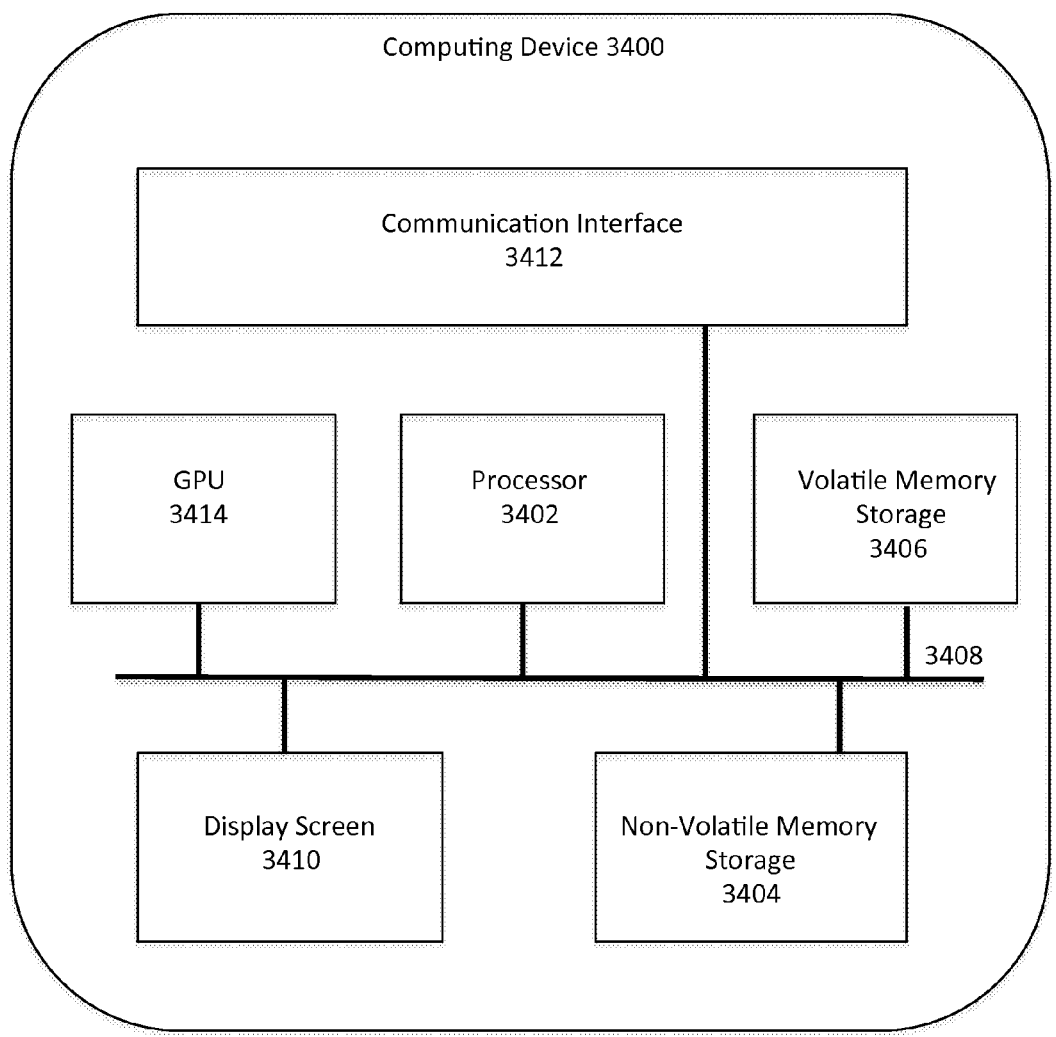
FIG. 34 is a diagram of an example computer device used to implement the system.

FIG. 34 is an example computer system 3400 in which embodiments of the present invention, or portions thereof, may be implemented as computer-readable code. For example, the components of systems 200 and 210 may be implemented in one or more computer systems 3400 using hardware, software implemented with hardware, firmware, tangible computer-readable media having instructions stored thereon, or a combination thereof and may be implemented in one or more computer systems or other processing systems. Components in FIGS. 1-33 may be embodied in any combination of hardware and software.

Computing devices, such as devices 110 and 130-134 or server 120, may include one or more processors 3402, one or more non-volatile storage mediums 3404, one or more memory devices 3406, a communication infrastructure 3408, a display screen 3410 and a communication interface 3412.

Processors 3402 may include any conventional or special purpose processor, including, but not limited to, digital signal processor (DSP), field programmable gate array (FPGA), application specific integrated circuit (ASIC), and multi-core processors.

GPU 3414 is a specialized processor that executes instructions and programs, selected for complex graphics and mathematical operations, in parallel.

Non-volatile storage 3404 may include one or more of a hard disk drive, flash memory, and like devices that may store computer program instructions and data on computer-readable media. One or more of non-volatile storage device 3404 may be a removable storage device.

Memory devices 3406 may include one or more volatile memory devices such as but not limited to, random access memory. Communication infrastructure 3408 may include one or more device interconnection buses such as Ethernet, Peripheral Component Interconnect (PCI), and the like.

Typically, computer instructions are executed using one or more processors 3402 and can be stored in non-volatile storage medium 3404 or memory devices 3406.

Display screen 3410 allows results of the computer operations to be displayed to a user or an application developer.

Communication interface 3412 allows software and data to be transferred between computer system 3400 and external devices. Communication interface 3412 may include a modem, a network interface (such as an Ethernet card), a communications port, a PCMCIA slot and card, or the like. Software and data transferred via communication interface 3412 may be in the form of signals, which may be electronic, electromagnetic, optical, or other signals capable of being received by communication interface 3412. These signals may be provided to communication interface 3412 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein.

Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments or any actual software code with the specialized control of hardware to implement such embodiments, but should be defined only in accordance with the following claims and their equivalents.

What is claimed is:

1. A computer-implemented method, comprising:
    gathering future location information of one or more friends of a user, the future location information including a respective first future date and a respective future location where a respective friend is going to be physically located on the respective first future date;
    receiving from a user, an indication of a second future date;
    determining that one or more friends are going to be physically present at the one or more future locations on the second future date that matches the first future date;
    displaying a geographic map on the user interface including one or more friend representations, each friend representation corresponding to respective future locations where one or more friends are going to be physically present on the second future date;
    receiving, at the computing device from the user, a selection of one of the one or more friend representations displayed on the geographic map;
    displaying one or more friends of the user associated with the selected friend representation;
    receiving a selection from the user of a first friend, from the one of the friends displayed;
    receiving an indication from the user to initiate contact between the first friend and a second friend selected by the user from a user's list of friends; and
    providing a first notification to a computing device of the first friend and a computing device of the second friend indicating that the user has suggested that the first friend and the second friend meet at the selected future location corresponding to the selected friend representation on the second future date.

2. The method of claim 1, wherein each future location is one of a city, an event, or a place.

3. The method of claim 1, further comprising:
    receiving an indication of the first notification from either of the first friend or the second friend;
    providing a first profile screen associated with the first friend to the second friend when an indication of receipt of the first notification is received from the second friend; and
    providing a second profile screen associated with the second friend to the first friend when an indication of receipt of the first notification is received from the first friend, wherein the first profile screen and the second profile screen enable addition of a user as a friend.

4. The method of claim 1, further comprising:
    providing a second notification to the first friend and the second friend indicating that the user has suggested that the first user and the second user establish a digital connection in a social network, wherein the digital connection is established when the first friend sends the second friend a digital invitation and the invention is accepted.

5. The method of claim 1, further comprising:
    reviewing one or more digital connections of at least one of the first friend and the second friend in the social network to identify whether a direct digital connection exists between the first friend and the second friend in a social network, wherein the digital connection exists when the first friend sends the second friend a digital invitation and the invitation is accepted.

6. The method of claim 1, wherein the first future date and the second future date can each be a future date range.

7. A system comprising: one or more computers and one or more storage devices storing instructions that are operable, when executed by the one or more computers, to cause the one or more computers to perform operations comprising:
    gathering future location information of one or more friends of a user, the future location information including a respective first future date and a respective future location where a respective friend is going to be physically located on the respective first future date;
    receiving from a user, an indication of a second future date;
    determining that one or more friends are going to be physically present at the one or more future locations on the second future date that matches the first future date;
    displaying a geographic map on the user interface including one or more friend representations, each friend representation corresponding to respective future locations where one or more friends are going to be physically present on the second future date;
    receiving, at the computing device from the user, a selection of one of the one or more friend representations displayed on the geographic map;
    displaying one or more friends of the user associated with the selected friend representation;
    receiving a selection from the user of a first friend, from the one of the friends displayed;
    receiving an indication from the user to initiate contact between the first friend and a second friend selected by the user from a user's list of friends; and
    providing a first notification to a computing device of the first friend and a computing device of the second friend indicating that the user has suggested that the first friend and the second friend meet at the selected future location corresponding to the selected friend representation on the second future date.

8. The system of claim 7, wherein each future location is one of a city, an event, or a place.

9. The system of claim 7, wherein the operations further comprise:
    receiving an indication of the first notification from either of the first friend or the second friend;
    providing a first profile screen associated with the first friend to the second friend when an indication of receipt of the first notification is received from the second friend; and
    providing a second profile screen associated with the second friend to the first friend when an indication of receipt of the first notification is received from the first friend, wherein the first profile screen and the second profile screen enable addition of a user as a friend.

10. The system of claim 7, wherein the operations further comprise:
  providing a second notification to the first friend and the second friend indicating that the user has suggested that the first user and the second user establish a digital connection in a social network, wherein the digital connection is established when the first friend sends the second friend a digital invitation and the invitation is accented.

11. The system of claim 7, further comprising:
  reviewing one or more digital connections of at least one of the first friend and the second friend in the social network to identify whether a direct digital connection exists between the first friend and the second friend in a social network, wherein the digital connection exists when the first friend sends the second friend a digital invitation and the invitation is accepted.

12. The system of claim 7, wherein the first future date and the second future date can each be a future date range.

13. A non-transitory computer-readable medium storing software comprising instructions executable by one or more computers which, upon said execution, cause the one or more computers to perform operations comprising:
  gathering future location information of one or more friends of a user, the future location information including a respective first future date and a respective future location where a respective friend is going to be physically located on the respective first future date;
  receiving from a user, an indication of a second future date;
  determining that one or more friends are going to be physically present at the one or more future locations on the second future date that matches the first future date;
  displaying a geographic map on the user interface including one or more friend representations, each friend representation corresponding to respective future locations where one or more friends are going to be physically present on the second future date;
  receiving, at the computing device from the user, a selection of one of the one or more friend representations displayed on the geographic map;
  displaying one or more friends of the user associated with the selected friend representation;
  receiving a selection from the user of a first friend, from the one of the friends displayed;
  receiving an indication from the user to initiate contact between the first friend and a second friend selected by the user from a user's list of friends; and
  providing a first notification to a computing device of the first friend and a computing device of the second friend indicating that the user has suggested that the first friend and the second friend meet at the selected future location corresponding to the selected fiend representation on the second future date.

14. The non-transitory computer-readable medium of claim 13, wherein each future location is one of a city, an event, or a place.

15. The non-transitory computer-readable medium of claim 13, wherein the operations further comprise:
  receiving an indication of the first notification from either of the first friend or the second friend;
  providing a first profile screen associated with the first friend to the second friend when an indication of receipt of the first notification is received from the second friend; and
  providing a second profile screen associated with the second friend to the first friend when an indication of receipt of the first notification is received from the first friend, wherein the first profile screen and the second profile screen enable addition of a user as a friend.

16. The non-transitory computer-readable medium of claim 13, wherein the operations further comprise:
  providing a second notification to the first friend and the second friend indicating that the user has suggested that the first user and the second user establish connection in a social network, wherein the digital connection is established when the first friend sends the second friend a digital invitation and the invitation is accepted.

17. The non-transitory computer-readable medium of claim 13, further comprising:
  reviewing one or more digital connections of at least one of the first friend and the second friend in the social network to identify whether a direct digital connection exists between the first friend and the second friend in a social network, wherein the digital connection exists when the first friend sends the second friend a digital invitation and the invitation is accepted.

18. The non-transitory computer-readable medium of claim 13, wherein the first future date and the second future date can each be a future date range.

* * * * *